US012734453B2

(12) United States Patent
Thompson et al.

(10) Patent No.: US 12,734,453 B2
(45) Date of Patent: *Sep. 15, 2026

(54) INTERACTION INTERLEAVER

(71) Applicant: ADEIA MEDIA HOLDINGS INC., San Jose, CA (US)

(72) Inventors: David S. Thompson, Spokane, WA (US); David A. Divine, Nine Mile Falls, WA (US)

(73) Assignee: ADEIA MEDIA HOLDINGS INC., San Jose, CA (US)

( * ) Notice: Subject to any disclaimer, the term of this patent is extended or adjusted under 35 U.S.C. 154(b) by 110 days.

This patent is subject to a terminal disclaimer.

(21) Appl. No.: 18/795,040

(22) Filed: Aug. 5, 2024

(65) Prior Publication Data

US 2024/0390805 A1 Nov. 28, 2024

Related U.S. Application Data

(63) Continuation of application No. 17/712,291, filed on Apr. 4, 2022, now Pat. No. 12,083,439, which is a (Continued)

(51) Int. Cl.
*A63F 13/828* (2014.01)
*A63F 13/35* (2014.01)
(Continued)

(52) U.S. Cl.
CPC ............ *A63F 13/828* (2014.09); *A63F 13/35* (2014.09); *A63F 13/46* (2014.09); *A63F 13/537* (2014.09);
(Continued)

(58) Field of Classification Search
CPC ........ A63F 13/828; A63F 13/35; A63F 13/46; A63F 13/537; A63F 13/67; A63F 13/79;
(Continued)

(56) References Cited

U.S. PATENT DOCUMENTS 8,176,518 B1 * 5/2012 Junkin .................... A63F 13/46 725/9
8,177,644 B2 5/2012 Anderson et al.
(Continued)

OTHER PUBLICATIONS

Digital Trends, The 6 Best Fantasy Football Websites Compared, Jul. 18, 2014, http://www.digitaltrends.com/computing/best-fantasy-football-sites/, retrieved Sep. 20, 2015, 15 pages.
(Continued)

*Primary Examiner* — Kunal Langhnoja
(74) *Attorney, Agent, or Firm* — HG LAW LLP

(57) ABSTRACT

A fantasy sports interleaver may include a video segmenting device to create a plurality of video clips, a clip annotator to associate each of the plurality of video clips with at least one of achievement of an athlete, and an interleaver to associate and transmit at least some of the plurality of video clips to each of a plurality of users. The interleaver may interface with a fantasy sports platform hosting the fantasy team of the user, as well as incoming audio/video feeds from content providers, and content feeds from advertisers. Users may be prompted to predict an outcome of an event, such as a number of fantasy points that an athlete will earn in a sporting event.

20 Claims, 45 Drawing Sheets

Related U.S. Application Data continuation of application No. 16/190,136, filed on Nov. 13, 2018, now Pat. No. 11,291,920, which is a continuation-in-part of application No. 15/356,661, filed on Nov. 20, 2016, now abandoned, which is a continuation-in-part of application No. 15/261,973, filed on Sep. 11, 2016, now Pat. No. 9,889,382, which is a continuation of application No. 14/846,886, filed on Sep. 7, 2015, now Pat. No. 9,440,152, said application No. 16/190,136 is a continuation-in-part of application No. 14/828,519, filed on Aug. 18, 2015, now Pat. No. 10,158,925, said application No. 14/846,886 is a continuation-in-part of application No. 14/550,906, filed on Nov. 21, 2014, now Pat. No. 9,138,652, which is a continuation-in-part of application No. 14/285,607, filed on May 22, 2014, now Pat. No. 9,056,253.

(60) Provisional application No. 62/258,461, filed on Nov. 21, 2015, provisional application No. 62/180,606, filed on Jun. 17, 2015, provisional application No. 62/116,801, filed on Feb. 16, 2015, provisional application No. 61/862,089, filed on Aug. 5, 2013, provisional application No. 61/826,485, filed on May 22, 2013.

(51) Int. Cl.

| | |
|---|---|
| ***A63F 13/46*** | (2014.01) |
| ***A63F 13/537*** | (2014.01) |
| ***A63F 13/67*** | (2014.01) |
| ***A63F 13/79*** | (2014.01) |
| ***H04L 67/02*** | (2022.01) |
| ***H04L 67/06*** | (2022.01) |
| ***H04N 21/218*** | (2011.01) |
| ***H04N 21/234*** | (2011.01) |
| ***H04N 21/235*** | (2011.01) |
| ***H04N 21/254*** | (2011.01) |
| ***H04N 21/258*** | (2011.01) |
| ***H04N 21/2668*** | (2011.01) |
| ***H04N 21/431*** | (2011.01) |
| ***H04N 21/472*** | (2011.01) |
| ***H04N 21/475*** | (2011.01) |
| ***H04N 21/478*** | (2011.01) |
| ***H04N 21/81*** | (2011.01) |

(52) U.S. Cl.

CPC .............. *A63F 13/67* (2014.09); *A63F 13/79* (2014.09); *H04N 21/21805* (2013.01); *H04N 21/23418* (2013.01); *H04N 21/23424* (2013.01); *H04N 21/2358* (2013.01); *H04N 21/25891* (2013.01); *H04N 21/2668* (2013.01); *H04N 21/4316* (2013.01); *H04N 21/47205* (2013.01); *H04N 21/4758* (2013.01); *H04N 21/4781* (2013.01); *H04N 21/812* (2013.01); *H04N 21/8126* (2013.01); *H04N 21/8133* (2013.01); *H04N 21/8146* (2013.01); *H04L 67/02* (2013.01); *H04L 67/06* (2013.01); *H04N 21/254* (2013.01)

(58) Field of Classification Search

CPC ....... H04N 21/21805; H04N 21/23418; H04N 21/23424; H04N 21/2358; H04N 21/25891; H04N 21/2668; H04N 21/4316; H04N 21/47205; H04N 21/4758; H04N 21/4781; H04N 21/812; H04N 21/8126; H04N 21/8133; H04N 21/8146; H04N 21/254; H04L 67/02; H04L 67/06

See application file for complete search history.

(56) References Cited

U.S. PATENT DOCUMENTS

| | | | | |
|---|---|---|---|---|
| 8,292,125 | B2 | 10/2012 | Venugopalan | |
| 8,631,431 | B2 | 1/2014 | Berberet et al. | |
| 9,463,388 | B2 | 10/2016 | Thompson et al. | |
| 10,158,925 | B2 | 12/2018 | Thompson et al. | |
| 10,293,263 | B2 | 5/2019 | Thompson et al. | |
| 2002/0194595 | A1 | 12/2002 | Miller et al. | |
| 2003/0115595 | A1 | 6/2003 | Stevens et al. | |
| 2006/0183548 | A1 | 8/2006 | Morris et al. | |
| 2007/0113250 | A1 | 5/2007 | Logan et al. | |
| 2008/0064490 | A1 | 3/2008 | Ellis | |
| 2008/0201289 | A1 | 8/2008 | Koponen et al. | |
| 2008/0297669 | A1 | 12/2008 | Zalewski et al. | |
| 2009/0144785 | A1 * | 6/2009 | Walker | H04N 5/262 725/105 |
| 2010/0179867 | A1 | 7/2010 | Hughes et al. | |
| 2010/0211465 | A1 | 8/2010 | Hughes et al. | |
| 2010/0252998 | A1 | 10/2010 | Guidroz | |
| 2013/0014171 | A1 | 1/2013 | Sansom et al. | |
| 2013/0185198 | A1 | 7/2013 | Lorch | |
| 2013/0325779 | A1 | 12/2013 | Shahshahani et al. | |
| 2014/0068662 | A1 | 3/2014 | Kumar | |
| 2014/0115631 | A1 | 4/2014 | Mak | |
| 2014/0149596 | A1 | 5/2014 | Emerson, III | |
| 2014/0282656 | A1 | 9/2014 | Belyaev et al. | |
| 2014/0373054 | A1 | 12/2014 | Edwards | |
| 2015/0245110 | A1 | 8/2015 | Alsina et al. | |
| 2015/0326901 | A1 | 11/2015 | Tiraspolsky et al. | |
| 2015/0358690 | A1 | 12/2015 | Thompson et al. | |
| 2016/0008723 | A1 | 1/2016 | Thompson et al. | |
| 2017/0064240 | A1 * | 3/2017 | Mangat | G06F 16/9535 |
| 2017/0201779 | A1 * | 7/2017 | Publicover | G06Q 30/0269 |
| 2018/0161680 | A1 | 6/2018 | Thompson et al. | |

OTHER PUBLICATIONS

Office Action dated May 24, 2017, from U.S. Appl. No. 15/261,973, filed Sep. 11, 2016, entitled "Scraping Fantasy Sports Data," 11 pages.

Yahoo! Help, Help Central—Projected points in Fantasy Football, https://help.yahoo.com/kb/SLN6625.html, retrieved Sep. 20, 2015, 1 page.

* cited by examiner

1002

CLIP ENGINE

Watch Now | Fantasy Scores | Manage Content | Preferences

Search for Clip

1028

Fantasy Score Update: Dragons 138 vs. Lightning 101

Marshawn Lynch – 8 yard rushing touchdown

1006

1008

You earned
6
Fantasy points
for this play

1004

1010

1012

1016

1014

1018

Why am I seeing this clip?

1020

View Comments-
Add Comment-

1022

Clip Queue

Next clip: Drew Breeze – 15 yard completion X

2nd clip: Marcus Trufaant – Interception X

1026

3rd clip: Seattle Defense – Sack of the quarterback X

1024

½ Slow | Replay | REW | Pause | FFW | Full 1030 1032 1034 1036 1038 1040

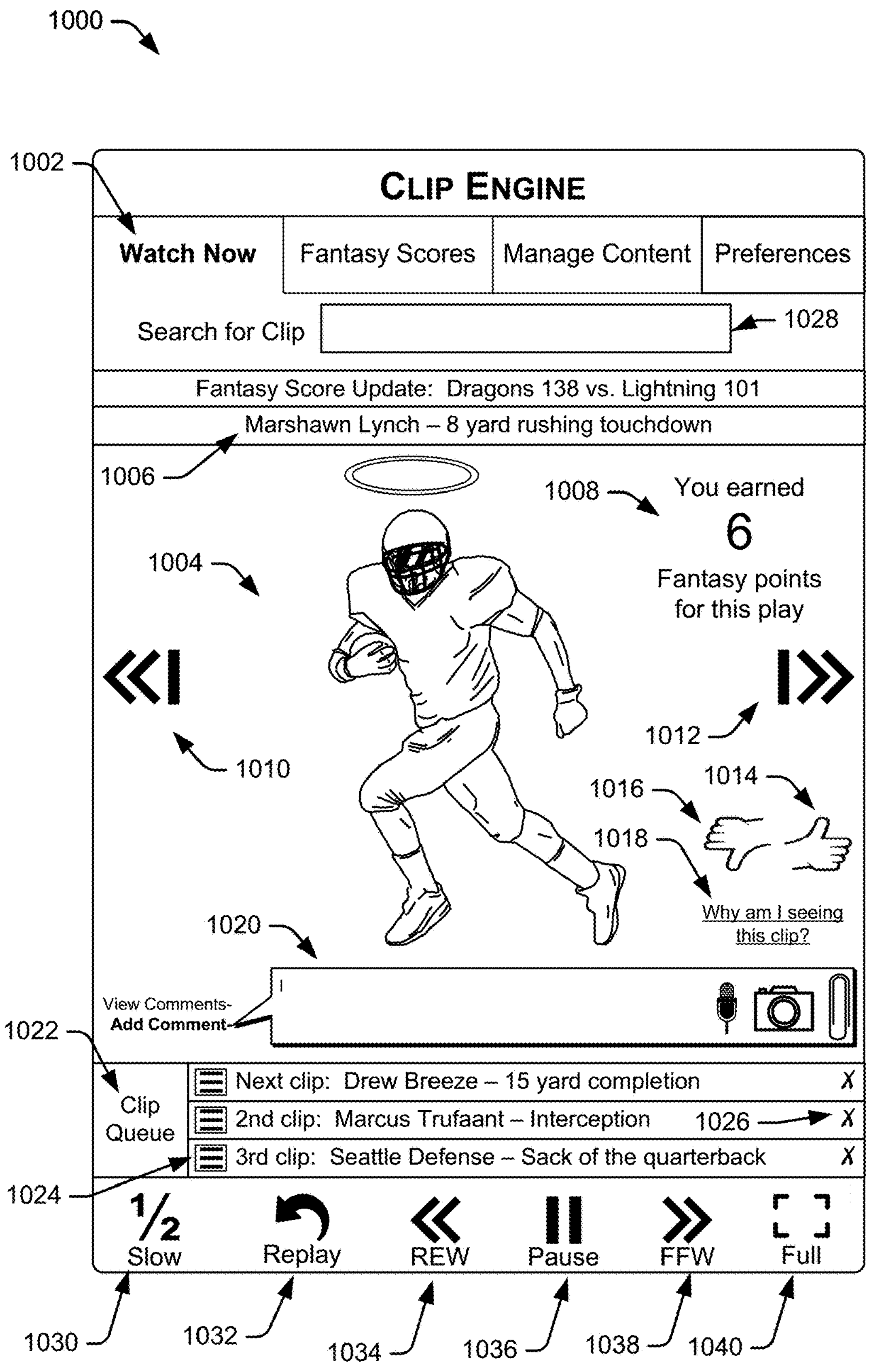

CLIP ENGINE

| Watch Now | **Fantasy Scores** | Manage Content | Preferences |
|---|---|---|---|

1106 1104

THIS WEEK'S GAMES

IN PROGRESS

Shock Racing – Brickyard 400 — 1110

1112 — The Shredders 11 vs. Green Guys 15

1126 1130 1132 1114

Dragons 135 vs. Lightning 128

| Projected Score | Athlete | Pos | Actual Score |
|---|---|---|---|
| ~~45~~ 40 | P. Manning | QB | 40F |
| ~~26~~ 20 | M. Lynch | RB | 20F |
| ~~47~~ 31 | S. Moss | WR | 22 |
| ~~46~~ 21 | R. Wayne | WR | 15 |
| ~~45~~ 10 | D. Thompson | RB | 2 |
| ~~44~~ 13 | D. Thomas | WR | 13F |
| 14 | T. Gonzalez | TE | -- |
| 14 | S. Holmes | W/T | 11 |
| ~~40~~ 4 | D. McFadden | W/R | 0 |
| 10 | A. Barnes | LB | -- |
| 10 | M. Trufant | DB | -- |
| ~~9~~ 7 | P. Dawson | K | 2 |
| ~~8~~ 10 | Seattle | DEF | 10F |

1128 1124

Click to see bench athletes

1134

Original Projected Score 208
Current Projected Score 204
Current Actual Score 135

| Projected Score | Athlete | Pos | Actual Score |
|---|---|---|---|
| ~~51~~ 40 | D. Breeze | QB | 13 |
| ~~30~~ 41 | R. Rice | RB | 41F |
| ~~18~~ 28 | F. Gore | RB | 14 |
| ~~45~~ 9 | D. Divine | WR | 0 |
| 15 | M. Crabtree | WR | -- |
| ~~44~~ 17 | W. Welker | WR | 17F |
| 12 | M. Forte | W/R | 8 |
| 12 | B. Myers | W/T | 12F |
| 11 | B. Spikes | LB | -- |
| 11 | J. Finley | TE | -- |
| ~~10~~ 12 | W. Allen | DB | 6 |
| 9 | J. Scobee | K | -- |
| ~~9~~ 7 | Baltimore | DEF | 7F |

Click to see bench athletes

Original Projected Score 217
Current Projected Score 224
Current Actual Score 128

1136

1138

Message Opponent

SCHEDULED GAMES — 1108

Sasquatch vs. Yeti – begins in 2 days — 1116

League Play Manage Rosters Refresh 1118 1120 1122

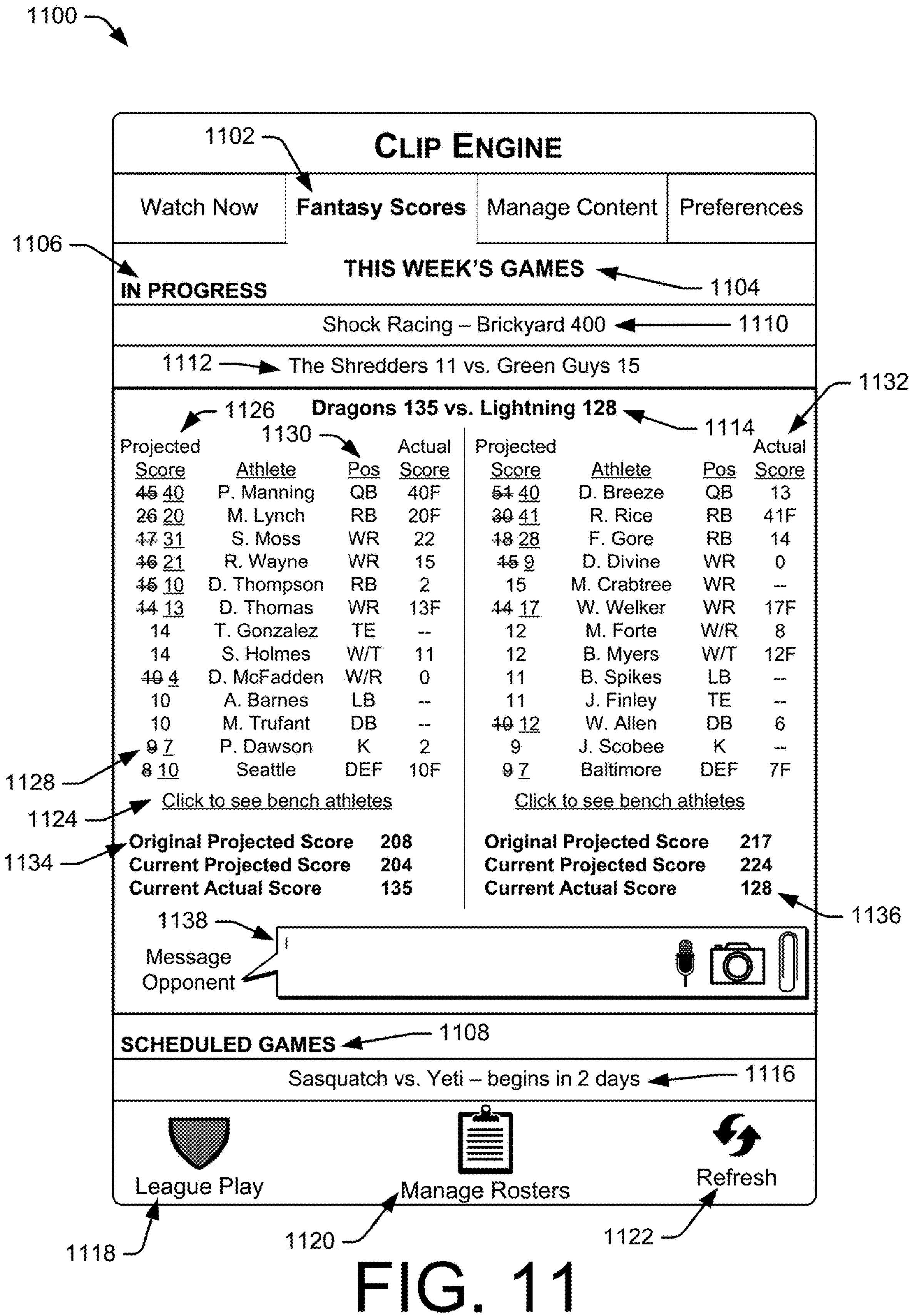

FIG. 11

CLIP ENGINE 1202

Watch Now | Fantasy Scores | Manage Content | Preferences

Search 1204

1206 1208

FANTASY SPORTS
ACME Fantasy Sports
Auto Racing
Shock Racing
Baseball
The Shredders
Basketball
Sasquatch
Football
Dragons
Gladiators
Soccer
The Deacons
Add More Fantasy Accounts
CBS Fantasy Sports
ESPN Fantasy Sports
FOX Fantasy Sports
RealTime Fantasy Sports
Yahoo Fantasy Sports
More Options BY TOPIC
Entertainment
Events
Sports
Auto Racing
Baseball
Basketball
Boxing
Football
Teams
Seahawks
Athletes
Payton Manning
Cheerleaders
Locations
Commentators
Golf
Hockey
Soccer
More Topics SOCIAL MEDIA
Facebook
Twitter/Vine
YouTube
More Options GAMING
My Bets
Odds
Events
More Options 1210 1212

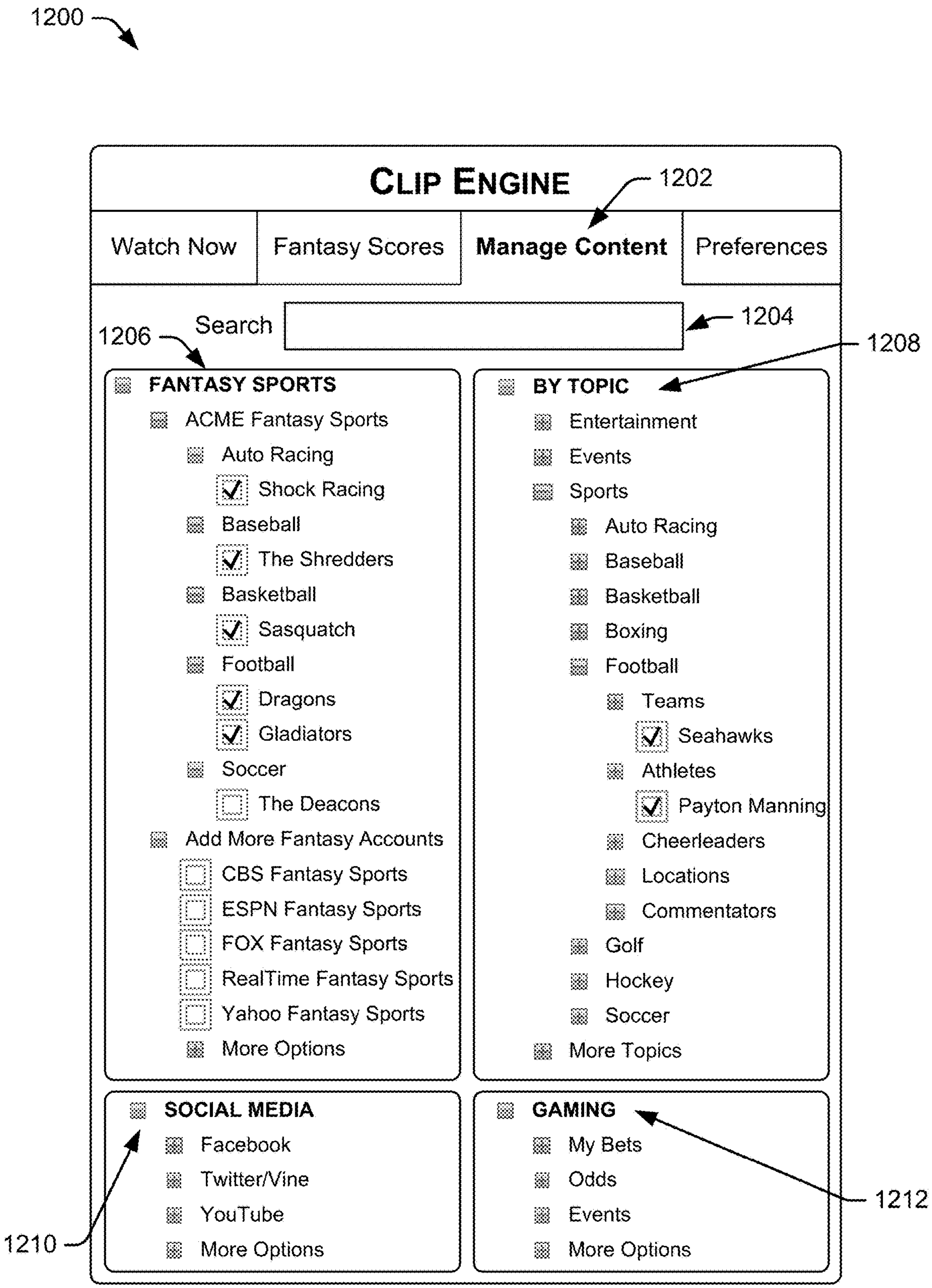

SEND AN ESTIMATED SCORE FOR A FANTASY GAME TO A USER INTERFACE
2102

TRANSITION THE ESTIMATED SCORE INTO A REAL SCORE OF THE FANTASY GAME
2104

UPDATE AN ESTIMATED FANTASY SCORE OF AN ATHLETE BASED ON THE ATHLETE'S PERFORMANCE WITHIN A PORTION OF THE UNDERLYING REAL GAME
2106

UPDATE AN ESTIMATED FANTASY SCORE OF AN ATHLETE BASED ON A FANTASY POINTS EARNED BY THE ATHLETE
2108

UPDATE AN ESTIMATED FANTASY SCORE OF AN ATHLETE BASED ON LACK OF FANTASY POINTS EARNED BY THE ATHLETE
2110

CHANGE AN ESTIMATED SCORE OF THE FANTASY GAME AS INDICATED BY FANTASY POINTS EARNED BY A PLURALITY OF ATHLETES
2112

SEND A FINAL SCORE OF THE FANTASY GAME, UPON CONCLUSION OF PARTICIPATION OF ALL ATHLETES OF THE FANTASY SPORTS GAME
2114

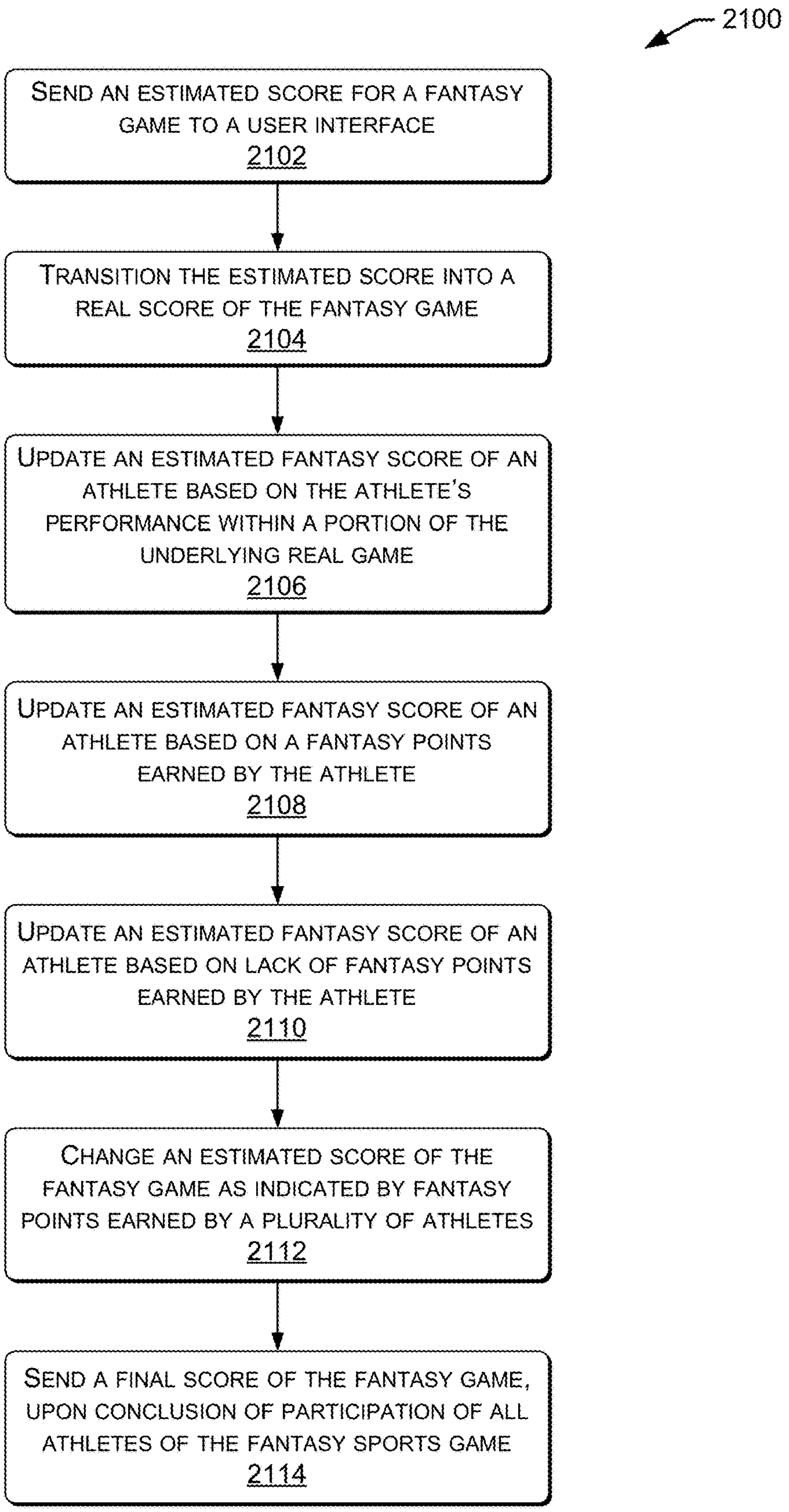

RECEIVE VIDEO CONTENT OF GAME OR SPORTING EVENT
2902

DETERMINE ATHLETES ON ROSTER OF FANTASY TEAM OF USER
2904

QUERY FANTASY SPORTS SERVICE WITH WHICH USER HAS ACCOUNT; AND

RECEIVE INDICATION OF ATHLETES ON ROSTER OF FANTASY SPORTS TEAM OF USER FROM FANTASY SPORTS SERVICE

2906

AND/OR

PROMPT USER TO ENTER ATHLETES ON ROSTER OF FANTASY SPORTS TEAM OF USER; AND

RECEIVE USER INPUT (E.G., BY TEXT, VOICE, SELECTION, GESTURE, ETC.) INDICATING ATHLETES ON ROSTER OF FANTASY SPORTS TEAM OF USER

2908

ID ATHLETE(S) OF INTEREST ON FANTASY ROSTER OF USER AND DEPICTED IN VIDEO CONTENT
2910

ANNOTATE VIDEO CONTENT TO INCLUDE VISUAL INDICATOR OF ATHLETE(S) OF INTEREST
2912

MODIFY VIDEO CONTENT, SUCH THAT VISUAL INDICATOR WILL BE DISPLAYED AT OR PROXIMATE A LOCATION ON A DISPLAY AT WHICH ATHLETE OF INTEREST IS PRESENTED ON DISPLAY
2914

AND/OR

MODIFY VIDEO CONTENT, SUCH THAT VISUAL INDICATOR TRACKS MOTION OF ATHLETE OF INTEREST, SUCH THAT WHEN ATHLETE OF INTEREST MOVES ON DISPLAY, VISUAL INDICATOR MOVES WITH ATHLETE OF INTEREST

2916

PROVIDE THE ANNOTATED VIDEO CONTENT TO A CLIENT DEVICE OF THE USER
2918

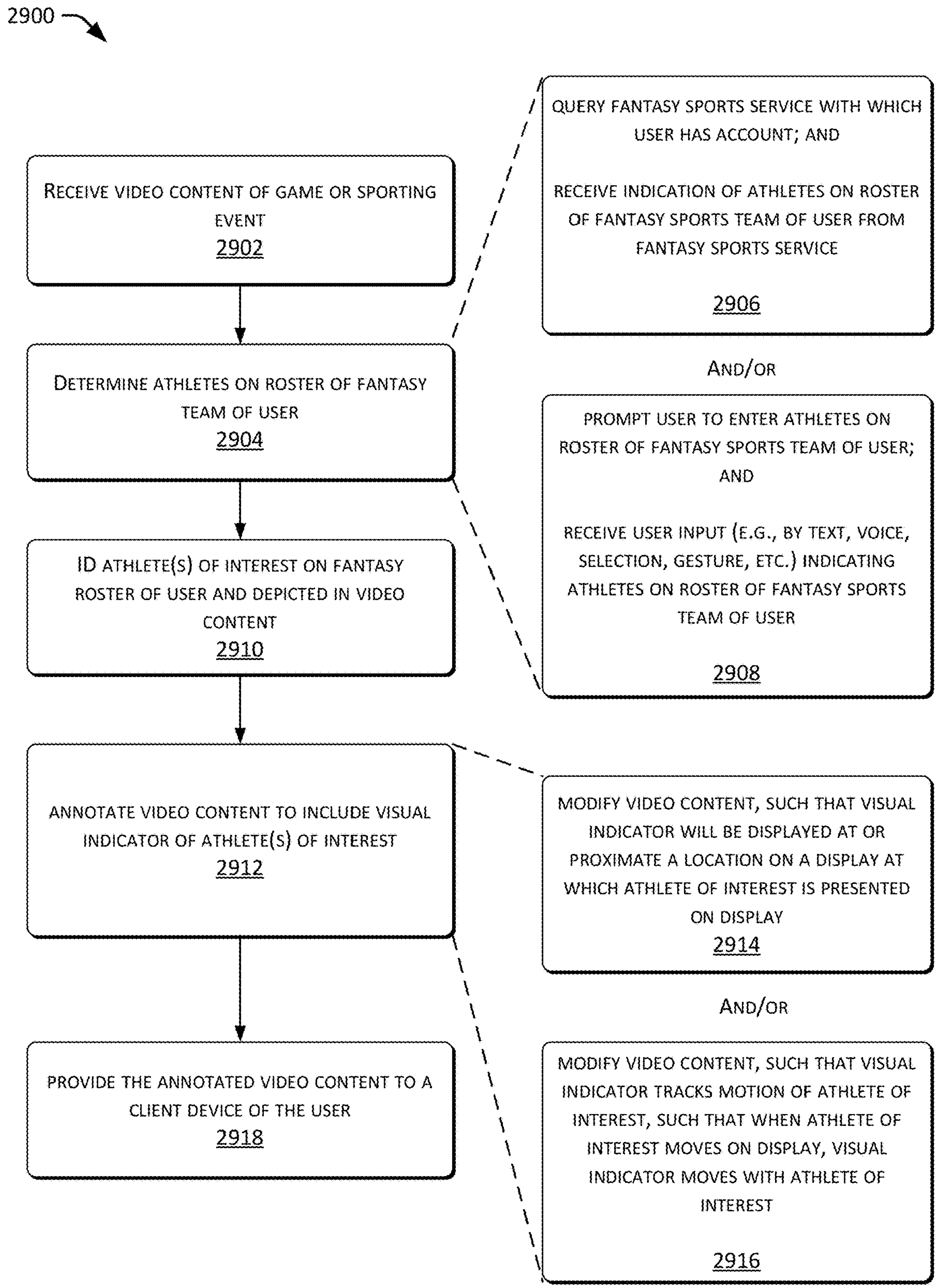

FIG. 29

Camera 3004

Camera 3006

Camera 3008

Camera 3010

Camera 3012

Field of Play 3002

3014A

3014B

3014C

FEED "A"

| $A_1$ | $A_2$ | $A_3$ | ... | $A_L$ |
|---|---|---|---|---|

3016

FEED "B"

| ... | $B_{23}$ | $B_{24}$ | ... | $B_M$ |
|---|---|---|---|---|

3018

FEED "N"

| ... | $N_{17}$ | $N_{18}$ | $N_{19}$ | ... |
|---|---|---|---|---|

3020

SEGMENT CONTENT INTO A PLURALITY OF SEGMENTS, WHEREIN THE CONTENT COMPRISES A PLURALITY OF FEEDS ASSOCIATED WITH A PLURALITY OF VIDEO CAMERAS THAT SHOW DIFFERENT VIEWS OF A SAME SPORTING EVENT
3202

CONCATENATE SEGMENTS FROM AMONG THE PLURALITY OF SEGMENTS THAT SHOW A PERFORMANCE BY AN ATHLETE SUFFICIENT FOR AWARD OF FANTASY POINTS
3204

TRANSMIT THE CONCATENATED SEGMENTS TO PARTICULAR USERS BASED AT LEAST IN PART ON THE ATHLETE BEING ON FANTASY TEAMS OF INTEREST TO THE PARTICULAR USERS
3206

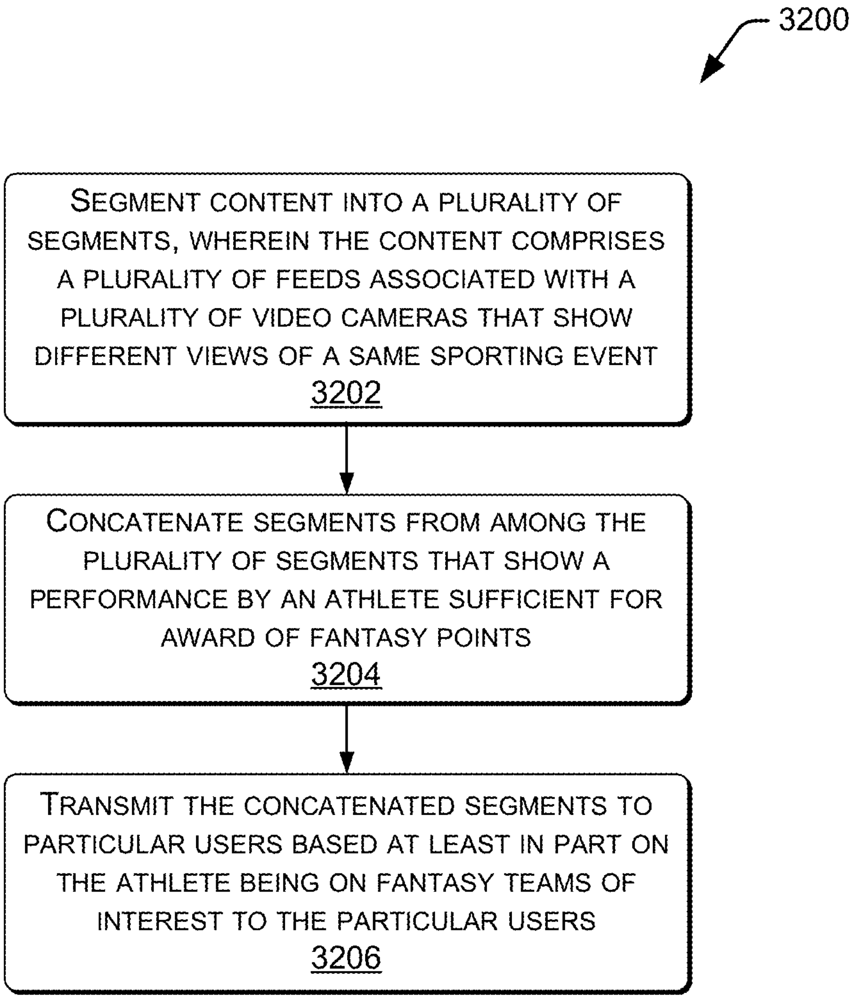

FIG. 32

CLIP ENGINE

Watch Now | Fantasy Scores | Manage Content | Preferences

Search for Clip

1028

Fantasy Score Update: Dragons 138 vs. Lightning 101

Marshawn Lynch – 8 yard rushing touchdown

You earned
6
Fantasy points
for this play

MARSHAWN LYNCH JUST RUSHED FOR 8 YARDS. WITH THAT RUN, HE HAS 74 RUSHING YARDS ON 9 ATTEMPTS. 10:35 REMAIN IN THE GAME. WILL MARSHAWN RUSH FOR MORE THAN 100 YARDS IN THE GAME?

YES NO

27
SECONDS
REMAINING

WANNA BET? $5

3702

View Comments-
Add Comment-

Clip Queue
Next clip: Drew Breeze – 15 yard completion X
2nd clip: Marcus Trufaant – Interception X
3rd clip: Seattle Defense – Sack of the quarterback X 1/2 Slow | Replay | REW | Pause | FFW | Full

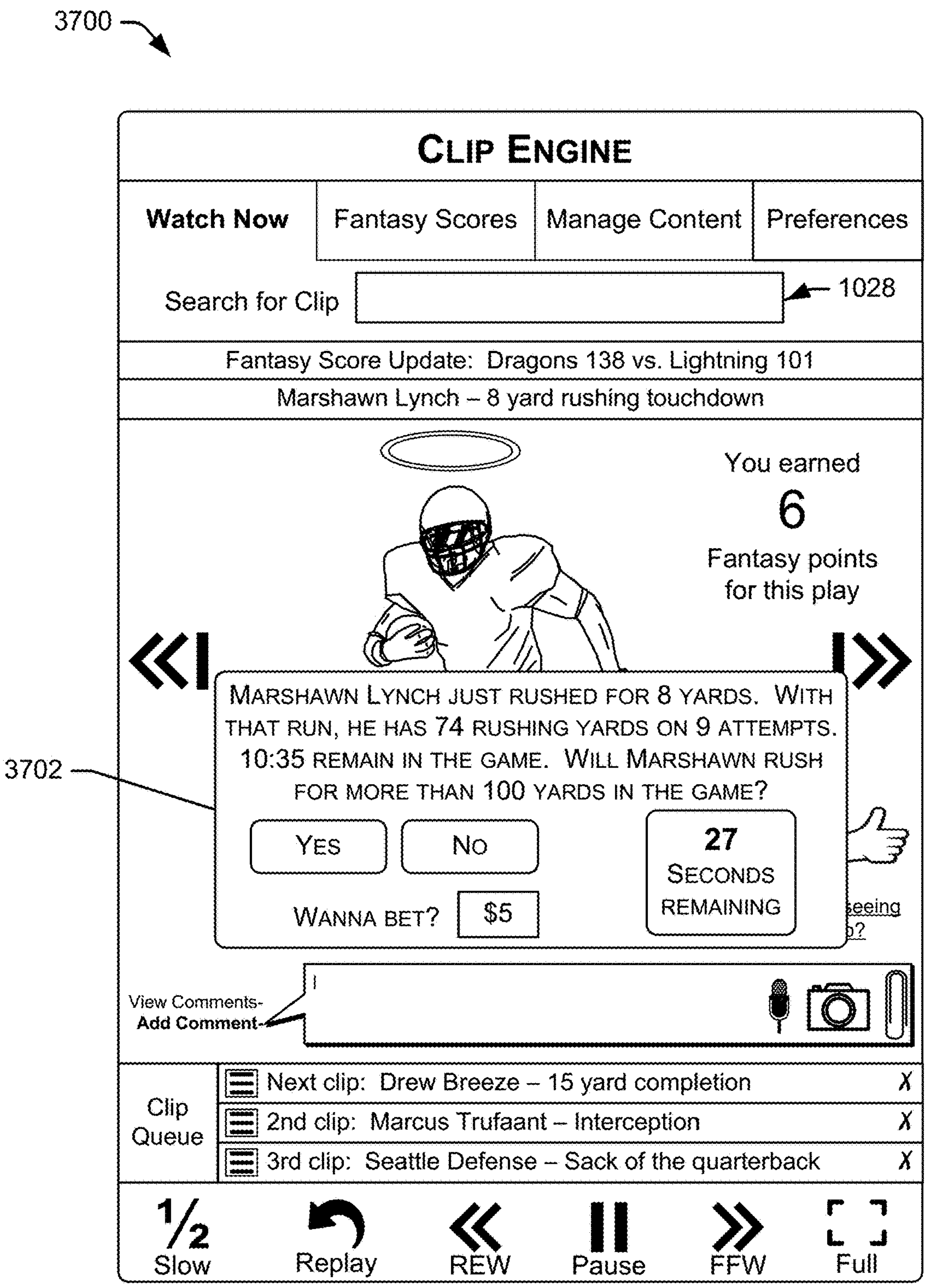

4402
SEND DATA TO A DEVICE OF A USER, WHEREIN THE DATA COMPRISES A LISTING OF ATHLETES ON A FANTASY TEAM OF THE USER

4404
THE LISTING DISTINGUISHES BETWEEN FIELDED AND BENCHED ATHLETES IN NON-FANTASY GAMES

4406
THE LISTING DISTINGUISHES FIELDED AND BENCHED ATHLETES BASED ON THE FANTASY TEAM OF THE USER

4408
RECEIVE DATA FROM THE USER, THE DATA INDICATING MOVEMENT OF ATHLETES ASSOCIATED WITH THE FANTASY TEAM OF THE USER BETWEEN A BENCHED STATUS AND A FIELDED STATUS ON THE FANTASY TEAM OF THE USER WHILE THE NON-FANTASY GAMES ARE BEING PLAYED

4412
MOVEMENT OF ATHLETES IN NON-FANTASY GAMES, BETWEEN FIELD AND BENCH

4410
SEND DATA TO THE DEVICE OF THE USER TO UPDATE THE LISTING OF ATHLETES

4414
MOVEMENT OF ATHLETES BETWEEN THE BENCHED STATUS AND THE FIELDED STATUS OF THE FANTASY TEAM OF THE USER

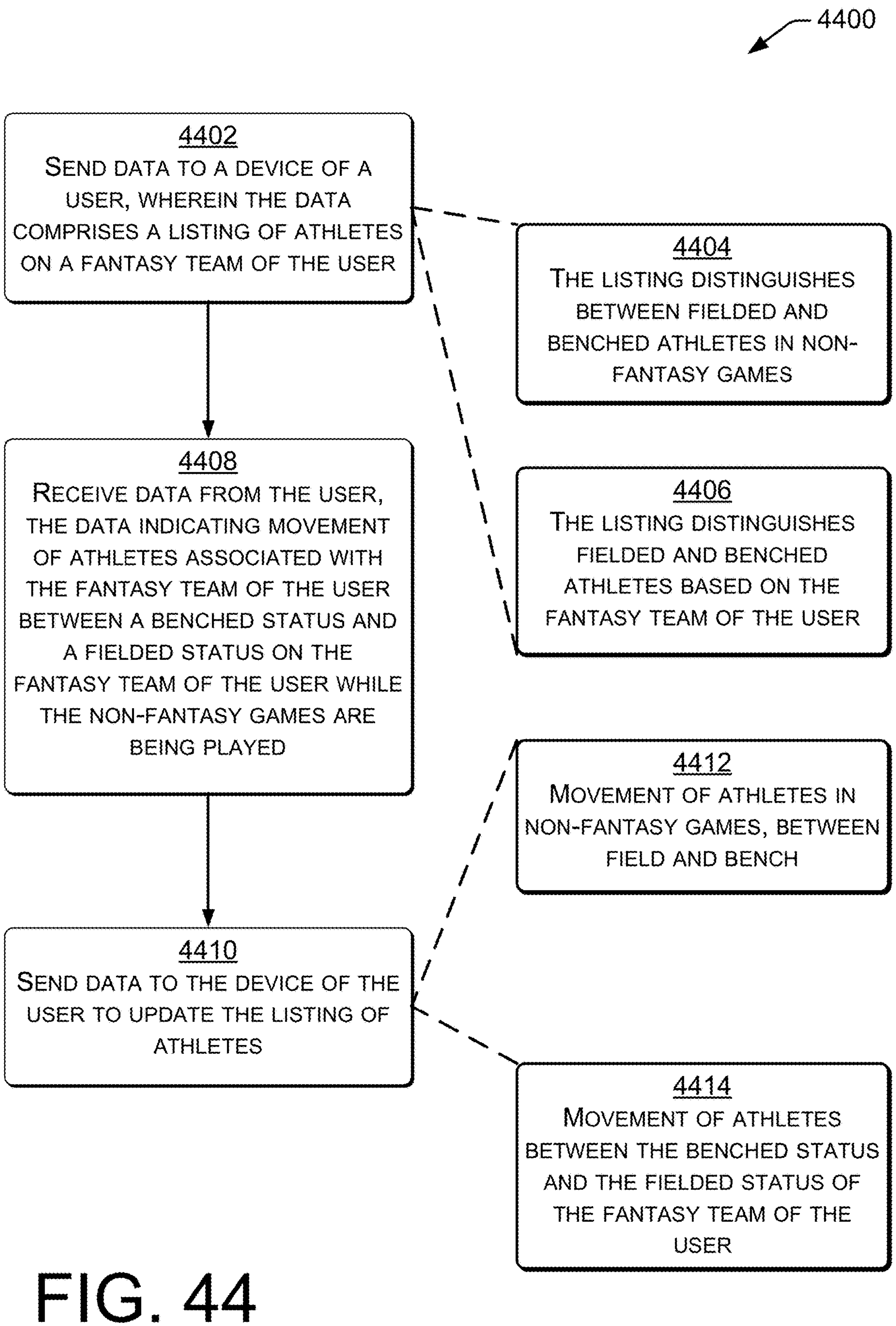

FIG. 44

4502
DISPLAY A LISTING OF ATHLETES ON A FANTASY TEAM OF A USER IN THE USER INTERFACE, WHEREIN THE LISTING IDENTIFIES EACH ATHLETE ON THE FANTASY TEAM OF THE USER, INCLUDING FIELDED ATHLETES AND BENCHED ATHLETES, AS BEING EITHER FIELDED ATHLETES OR BENCHED ATHLETES IN NON-FANTASY GAMES

4504
RECEIVE DATA FROM THE USER INDICATING DESIRED MOVEMENT OF ATHLETES BETWEEN A BENCHED STATUS AND A FIELDED STATUS ON THE FANTASY TEAM OF THE USER WHILE THE NON-FANTASY GAMES ARE BEING PLAYED

4506
RECEIVE DATA FROM A REMOTE SERVER UPDATING THE LISTING OF ATHLETES, ACCORDING TO MOVEMENT OF ATHLETES IN NON-FANTASY GAMES, BETWEEN FIELD AND BENCH

4508
DISPLAY AN UPDATED LISTING OF ATHLETES ON THE FANTASY TEAM OF THE USER THAT IS CONSISTENT WITH MOVEMENT OF ATHLETES IN NON-FANTASY GAMES BETWEEN FIELD AND BENCH

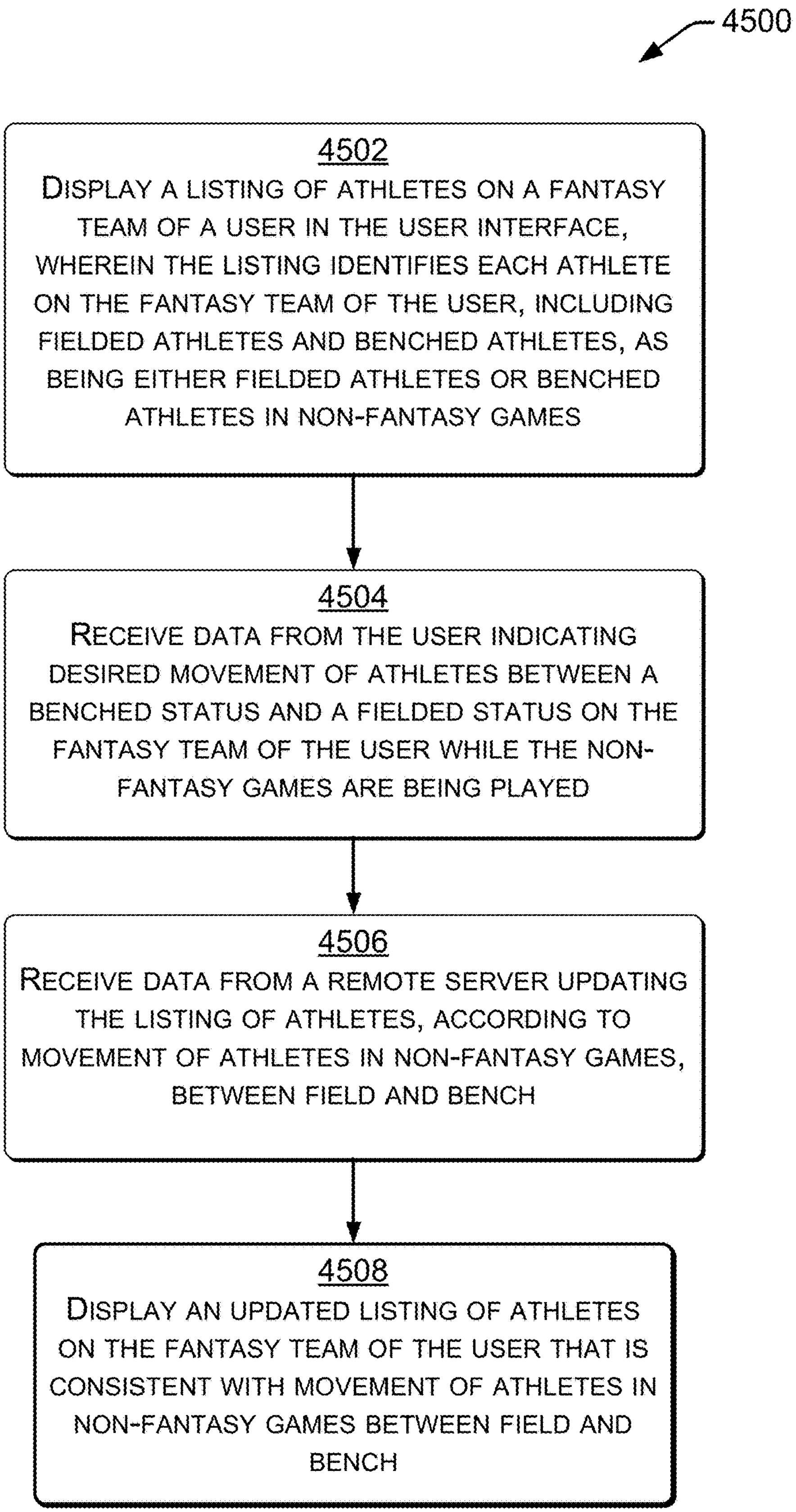

FIG. 45

INTERACTION INTERLEAVER

CROSS-REFERENCE TO RELATED APPLICATIONS

This application is a continuation of U.S. patent application Ser. No. 17/712,291 filed Apr. 4, 2022, which is a continuation of U.S. patent application Ser. No. 16/190,136 filed Nov. 13, 2018 (now U.S. Pat. No. 11,291,920), which is a continuation-in-part of U.S. patent application Ser. No. 14/828,519 filed Aug. 18, 2015 (now U.S. Pat. No. 10,158, 925), which claims the benefit of U.S. Provisional Application No. 62/116,801 filed Feb. 16, 2015 and U.S. Provisional Application No. 62/180,606 filed Jun. 17, 2015, all of which are incorporated herein by reference. U.S. patent application Ser. No. 16/190,136 is also a continuation-in-part of U.S. patent application Ser. No. 15/356,661 filed Nov. 20, 2016 (now abandoned), which claims the benefit of U.S. Provisional Application No. 62/258,461 filed Nov. 21, 2015, and is a continuation-in-part of U.S. patent application Ser. No. 15/261,973 filed Sep. 11, 2016 (now U.S. Pat. No. 9,889, 382), which is a continuation of U.S. patent application Ser. No. 14/846,886 filed on Sep. 7, 2015 (now U.S. Pat. No. 9,440,152), which is a continuation-in-part of U.S. patent application Ser. No. 14/550,906, filed on Nov. 21, 2014 (now U.S. Pat. No. 9,138,652), which is a continuation-in-part of U.S. patent application Ser. No. 14/285,607, filed May 22, 2014 (now U.S. Pat. No. 9,056,253), which claims the benefit of priority to U.S. Provisional Patent Application No. 61/862,089, filed on Aug. 5, 2013, and to U.S. Provisional Patent Application No. 61/826,485, filed on May 22, 2013, all of which are incorporated herein by reference.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts and examples, and not to indicate required and/or necessary elements.

FIG. 10 is a schematic diagram showing an example user interface of a client application for presenting audio, video and/or audio-video displays to a user.

FIG. 11 is a schematic diagram showing an example user interface of a client application for presenting fantasy sports scores and other fantasy sports information.

FIG. 12 is a schematic diagram showing an example user interface of a client application for designating and managing content from/about which custom content, such as a custom content stream from the interleaver service, is to be provided.

FIG. 21 is a flowchart showing a second example method of fantasy score estimation.

FIG. 29 is a flowchart illustrating an example method of annotating video content with user-specific fantasy information.

FIG. 32 is a flow diagram showing a method for content segmentation, concatenation and transmission.

FIG. 37 is a schematic diagram of an example user interface of a client application for consuming custom content, such as a custom content stream from an interleaver service.

FIG. 44 shows an example flow diagram showing an example method by which a user interface may be managed to thereby provide the user with an interactive fantasy sports experience.

FIG. 45 shows an example flow diagram showing an example method by which an interactive fantasy sports experience may be provided to a remote user, and by which content producers (e.g., creators of incoming audio/video feeds of non-fantasy games), fantasy sports platform(s), and/or user interfaces provided to a plurality of users may be managed.

DETAILED DESCRIPTION

Overview

Figure 1:
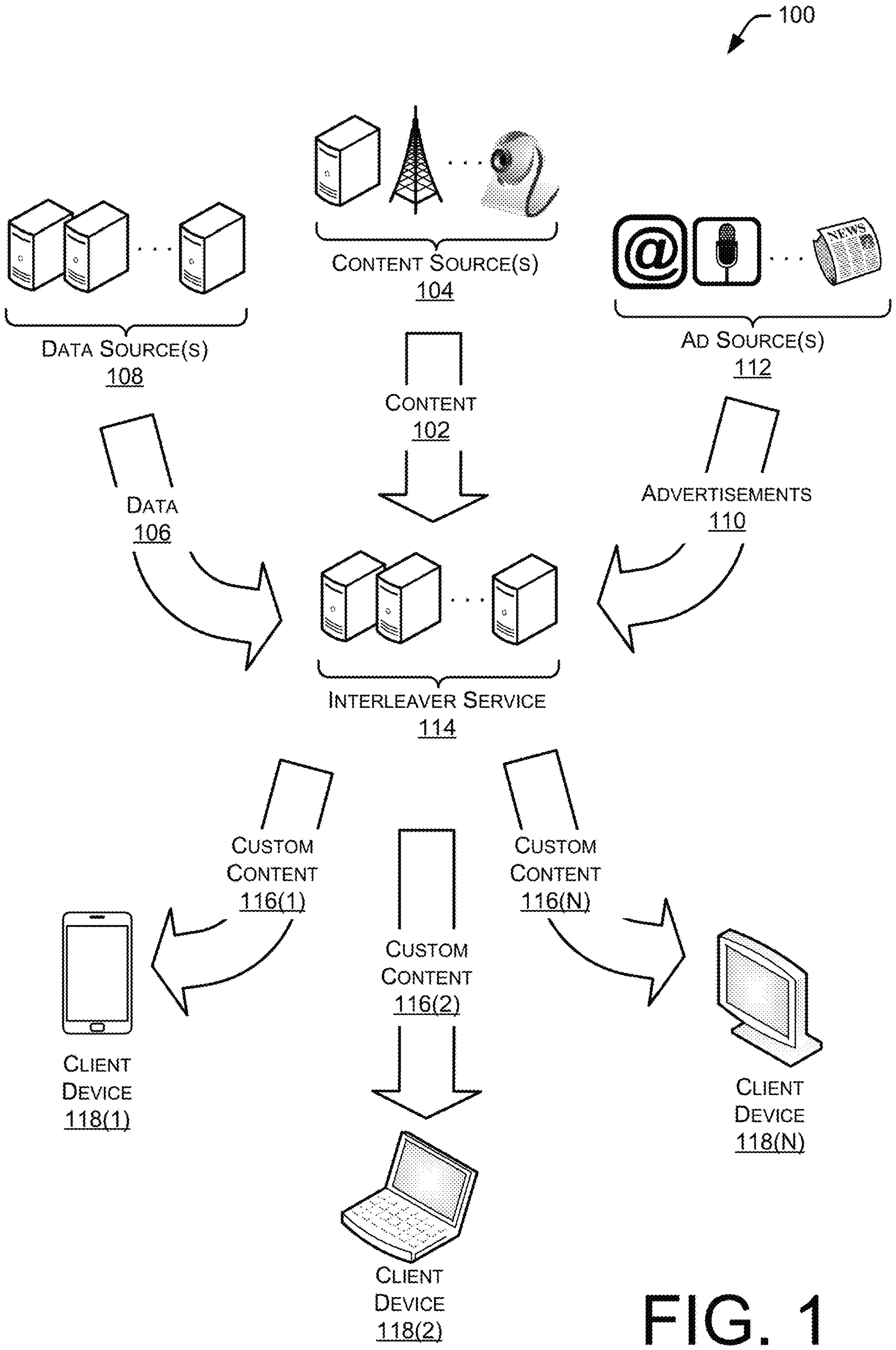
FIG. 1 is a schematic diagram of an example of an architecture usable to provide users with customized streams of content. In the example architecture, an interleaver service receives content from one or more content sources, data from one or more data sources, and advertisements from one or more ad sources, and outputs customized content streams to client devices of each user.

As discussed above, existing fantasy sports outlets (e.g., websites and/or applications) offer very limited ways in which participants can participate in and consume the fantasy sports experience. This application describes techniques and systems for providing a complete fantasy sports experience.

In one aspect, the application describes a content-rich fantasy sports experience in which users are able to consume content (e.g., video, audio, images, articles, etc.) associated with the athletes, teams, and leagues associated with their fantasy teams. For instance, a user may be presented with a stream of video clips or segments associated with the user's fantasy sports team(s). The stream of video segments may be composed of segments showing plays or other events that resulted in points for the user's fantasy team, points for an opposing fantasy team, points for one or more other participants in the user's fantasy league, or otherwise affected a fantasy score of one or more athletes or teams. The stream of video segments may additionally or alternatively include segments corresponding to athletes, teams, leagues, sports cheerleaders, or other topics of interest to the user. The topics of interest may have been explicitly designated by the user and/or may have been implicitly inferred based on one or more criteria. In some examples, the video segments may be augmented by statistics, commentary (e.g., by analysts or other users), images, graphics, articles, or the like that are made available to the user (e.g., via links in the video segments, overlays on the video segments, etc.). In some examples, the stream of video segments may be continuously updated and served, such that there is always a content stream available for the user to consume. The particular segments and the order of their presentation may be unique for each user.

The application also describes various other features that enhance the functionality, ease of use, customizability, interactivity, and numerous other aspects of the complete fantasy sports experience. Fantasy sports users already have a relatively high level of engagement with the existing limited fantasy sports offerings, spending a considerable amount of time and energy researching athletes, managing their fantasy teams, and viewing score updates. However, existing fantasy sports offerings fail to integrate video with user's fantasy sports teams. Rather, existing offerings provide a primarily text based interface for viewing fantasy sports scores and information. The techniques described herein provide numerous enhancements that, in some examples, provide fantasy sports scores along with clips and other rich content tailored to the user's fantasy sports team(s) and other interests. For instance, in some examples, a user's fantasy sports points may be provided in association with one or more clips depicting plays or other events that resulted in awarding of the fantasy sports points to the user. Moreover, in some examples, the techniques described herein may provide users with content customized to them based on things that interest them, such as athletes and other topics related to their fantasy sports teams. The custom content may comprise content from multiple different sources, and may include segments from simultaneously occurring and/or overlapping content. As such, techniques described herein may provide users with a more efficient way of viewing content of interest to them. Additionally, the techniques described herein may allow users to watch clips from multiple different sources and regions via one point of access. These enhancements have the potential to greatly increase the enjoyment of users and their fantasy sports experience.

Also, while many of the examples are described in the context of providing a complete fantasy sports experience, many of the aspects described herein are not limited to the fantasy sports context and have other applicability. For example, while the stream of video segments is described as being related in some way to the user's participation in fantasy sports, in other examples, the stream of video segments may additionally or alternatively include segments that relate to other activities with which the user is associated or interested. For instance, some or all of the stream of video segments may relate to a video game that the user plays, a club or organization that the user belongs to, a movie or television show that the user likes, contacts and social acquaintances of the user, etc. As other examples, the application describes interleaving of commercials or advertisements into the fantasy sports content stream. However, the techniques described herein relating to commercials or advertisements are also applicable to other contexts and are not limited to use with the fantasy sports content stream.

These and numerous other examples are described in detail below with reference to the accompanying figures.

Example System and Techniques

FIG. 1 is a schematic diagram of an example architecture configured to provide users with customized streams of content. The example architecture 100 may be used to generate and serve custom content to one or more subscribers. In the example architecture 100, content 102 from one or more content sources 104, data 106 from one or more data sources 108, and/or advertisements 110 from one or more ad sources 112 are input to an interleaver service 114. The interleaver service 114 processes the received content 102, data 106, and ads 110, and assembles customized content 116(1), 116(2), . . . 116(N) (collectively "customized content 116") for each of a plurality of subscribers or users. The interleaver service 114 then causes the customized content 116(1), 116(2), . . . 116(N) to be served to client devices 118(1), 118(2), . . . 118(N) (collectively "client devices 118") associated with the plurality of subscribers. In this example, N represents the number of subscribes to which the interleaver service 114 serves custom content and may be any positive integer.

In the illustrated example, the interleaver service 114 communicates with the content sources 104, data sources 108, ad sources 112, and client devices 118 over one or more wireless or wired networks, or a combination thereof. By way of example and not limitation, the networks may comprise over-the-air broadcast networks (e.g., broadcast radio and television), cable networks (e.g., cable television and/or internet networks), telephone networks (e.g., wired and cellular), satellite networks (e.g., satellite television networks), local area networks (e.g., Ethernet, wifi, etc.), fiber optic networks, or any other network capable of transmitting the content 102, data 106, ads 110, and/or custom content 116. The network(s) may be a collection of individual networks interconnected with each other and functioning as a single large network (e.g., the Internet or an intranet). Further, the individual networks may be wireless or wired networks, or a combination thereof. In some instances (e.g., receipt of certain content feeds) the communication may be one-way, while in other instances communication between the interleaver service 114 and the content sources 104, data sources 108, ad sources 112, and/or client devices 118 may be two-way.

In the context of fantasy sports, the content 102 may comprise audio and/or video ("A/V") feeds of televised sporting events, such as football games, baseball games, basketball games, auto races, soccer matches, hockey games, or the like. The content 102 may be live or delayed, and may be obtained from a plurality of games or other events, which are being played simultaneously. The content 102 may include actual game play, instant replays, sideline interviews, discussion by commentators or hosts, and other information. The data 106 may include, fantasy sports information, such as fantasy leagues in which a user participates, rosters of athletes on the user's fantasy team, or the like. The advertisements 110 may comprise advertisements included in the televised sporting events by a national or regional broadcaster of the sporting events, advertisements from an ad agency or marketing firm, internet advertisements, or the like. The interleaver service 114 receives the content 102, data 106, and advertisements 110 as inputs, processes this information as described in detail below, and outputs customized content 116 as clips or streams of clips of the sporting events to each of the client devices 118.

While the interleaver service 114, content sources 104, data sources 108, and ad sources 112 are shown as separate entities disposed at separate locations, in other embodiments, any or all of these components may be combined or integrated in whole or in part. For example, the interleaver service 114 may include an integral content source (e.g., source of original content), data source (e.g., fantasy sports platform), and/or ad source (e.g., ads for the interleaver service or a related business). In other examples, a single source may provide content, data, and/or ads.

Figure 2:
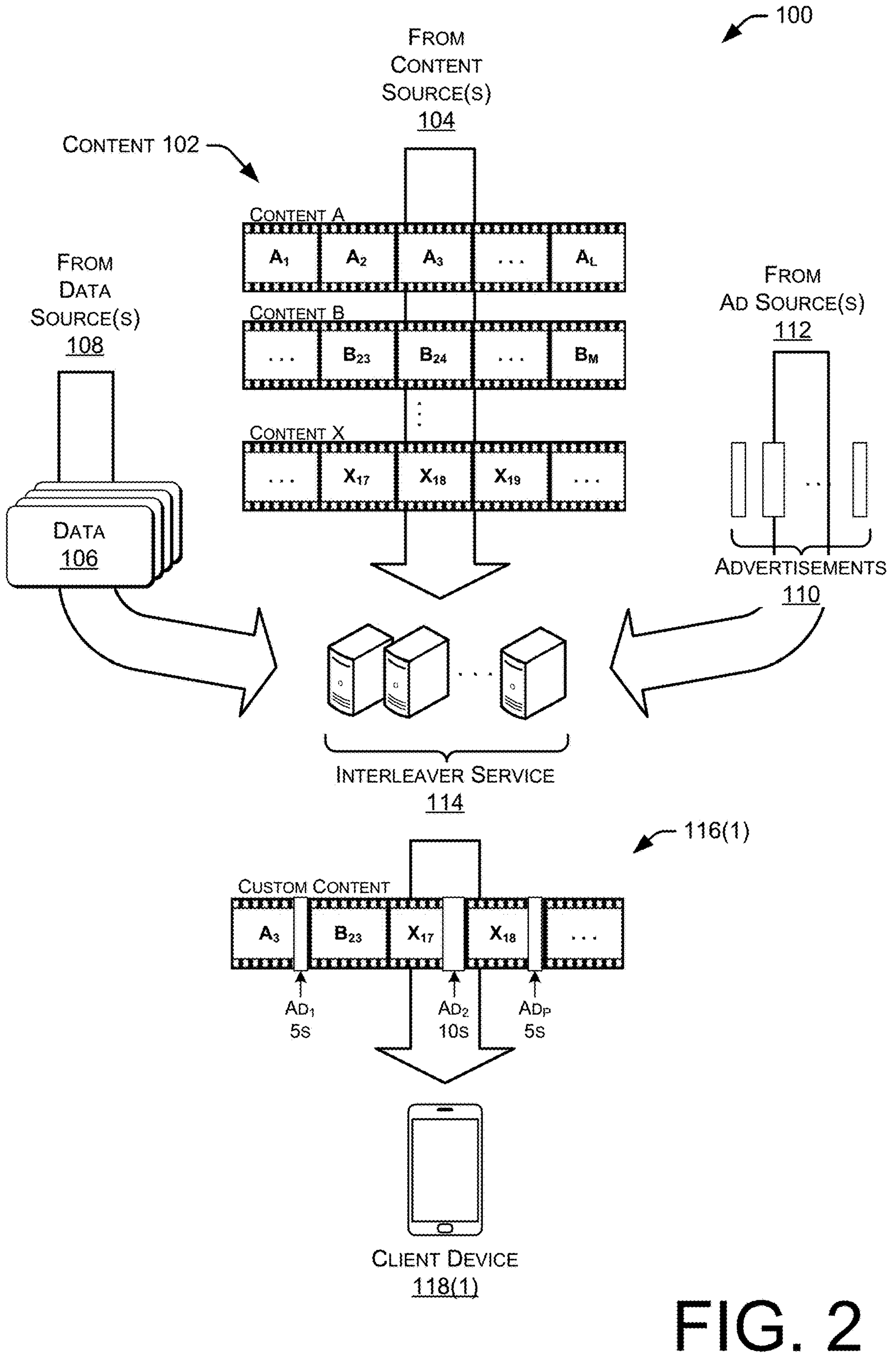
FIG. 2 is a schematic diagram showing an example of how the interleaver service uses the content, data, and ads to generate custom content for output to a client device of a particular user. In this example, the interleaver service receives content (e.g., video recordings of sporting events or sports commentary or analysis) from one or more content sources, data (e.g., fantasy sports data, user data, account information, etc.) from one or more data sources, and advertisements (e.g., internet, television, radio, print ads, etc.) from one or more ad sources. The interleaver service outputs customized content streams to one or more client devices of each user based at least in part on the received data. For instance, the content stream output for each user may be customized based on, for example, a fantasy sports account of the respective user.

FIG. 2 is a schematic diagram showing additional detail of the example architecture 100, including an example of how the interleaver service 114 uses the content 102, data 106, and ads 110 to generate custom content 116 for each subscriber. FIG. 2 illustrates how custom content 116(1) is provided to a particular client device 118(1) of the plurality of client devices 118.

The content 102 may arrive at the interleaver service 114 as A/V feeds already segmented into "clips." Alternatively, the content 102 may be segmented at the interleaver service 114. In the example shown, a plurality of content streams (e.g., Content A, Content B, . . . Content X) are segmented into a plurality of segments (e.g., segments $A_1$, $A_2$, $A_3$, . . . $A_L$, . . . , $B_{23}$, $B_{24}$, . . . $B_M$, . . . , $X_{17}$, $X_{18}$, $X_{19}$, . . . , etc.). In the fantasy sports context, each segment may include, for example, a "play" or "down" in football, a pitch and associated play (if any) in baseball, a shot or basket in basketball, a lead change in auto racing, a corner kick in soccer, etc. In some instances, several plays (e.g., a football goal line defense, a baseball strikeout or at-bat, a basketball possession including multiple shots on basket, an auto racing lap, etc.) may be grouped into one segment.

The content 102 may arrive at the interleaver service 114 having metadata, "annotation" or "tagging" that provides information about each clip. Alternatively, the content 102 may be annotated or tagged at the interleaver service 114. The tags or annotations may include, for example, information about the subject matter shown in each clip (e.g., an athlete or athletes shown in the clip or that performed an action for which fantasy points are assigned or decremented, a description of the events of the clip such as a touchdown in football, a description of a game to which the clip corresponds, a location depicted in the clip, etc.). The tags or annotations may be used by the interleaver service 114 to determine specific athletes, teams, or other subjects depicted in each individual clip. In some examples, the clips (e.g., $A_1, \ldots, X_{19}$, etc.) may additionally or alternatively be tagged with fantasy information (e.g., fantasy points attributable to a depicted event).

In the fantasy sports context, the data 106 may include fantasy information related to subscribers' fantasy teams, leagues, rosters, and the like. The data may be obtained from websites (e.g., Yahoo!, ESPN, CBS, FOX, the NFL, Real-Time, etc.) that host fantasy sports leagues. The data 106 may also include league information, such as the names of teams in a user's league, the user's team roster, other teams' rosters, the names of athletes that are fielded (being played), the names of athletes that are benched (not played, but held in reserve). The data may include win-loss records of fantasy teams, league standings, a user's favorite real-life teams, favorite athletes, and other information.

By parsing the fantasy information or other data 106 corresponding to each user/subscriber, the interleaver service 114 may determine subjects of interest to the subscriber. In some examples, the interleaver service 114 may determine that athletes on a user's fantasy roster(s) or rosters of opponents in the user's fantasy leagues would be of interest to the user. The interleaver service 114 may then identify individual clips of incoming content having tags that match the subjects of interest to the user. The interleaver service 114 may then output the clips of interest to the client device 118(1) of the user as the feed of custom content 116(1). The clips of interest may be transmitted to the client device 118(1) individually or may be combined with one or more other clips for transmission to the client device 118(1).

In some examples, the interleaver service 114 may also insert one or more ads 110 at various locations in the custom content 116(1), such as between clips, in the middle of clips, simultaneously with clips, overlaid on top of clips, or the like. The ads 110 may include ads considered complementary or of interest to each particular user based upon the data 106 corresponding to the particular user. The ads may be audio, video, and/or still image ads. In the case of audio and/or video ads, the ads may be of varying length. In some examples, the length of an ad inserted may depend on how long it has been since a previous ad was presented.

In the context of a fantasy football example, the custom content 116(1) may include clips (e.g., audio/video) of football plays relevant to the user's fantasy football team (e.g., touchdowns, interceptions, field goals, etc.), the user's opponent's fantasy team, the user's favorite real-life team, the user's favorite athletes, etc., interspersed with selected advertisements (audio, video, and/or still images). In some examples, the ads may be relatively short ads (e.g., of about 5 seconds to about 30 seconds) inserted every few clips. In some instances, one or more of the ads may be related to one another (e.g., a sequence of related ads). Due to their short length, users are less likely to stop watching because the content will resume very shortly. Additionally, because the ads may be tailored to the user's interests, the ads themselves may be of more interest to the user as well. Thus, in some examples, within a relatively short period of time (e.g., 30 minutes), a user may be presented with a number of relevant clips (e.g., about 20-90 clips) interspersed with a number of ads (e.g., 10-30 ads).

Example Interleaver Service

Figure 3:
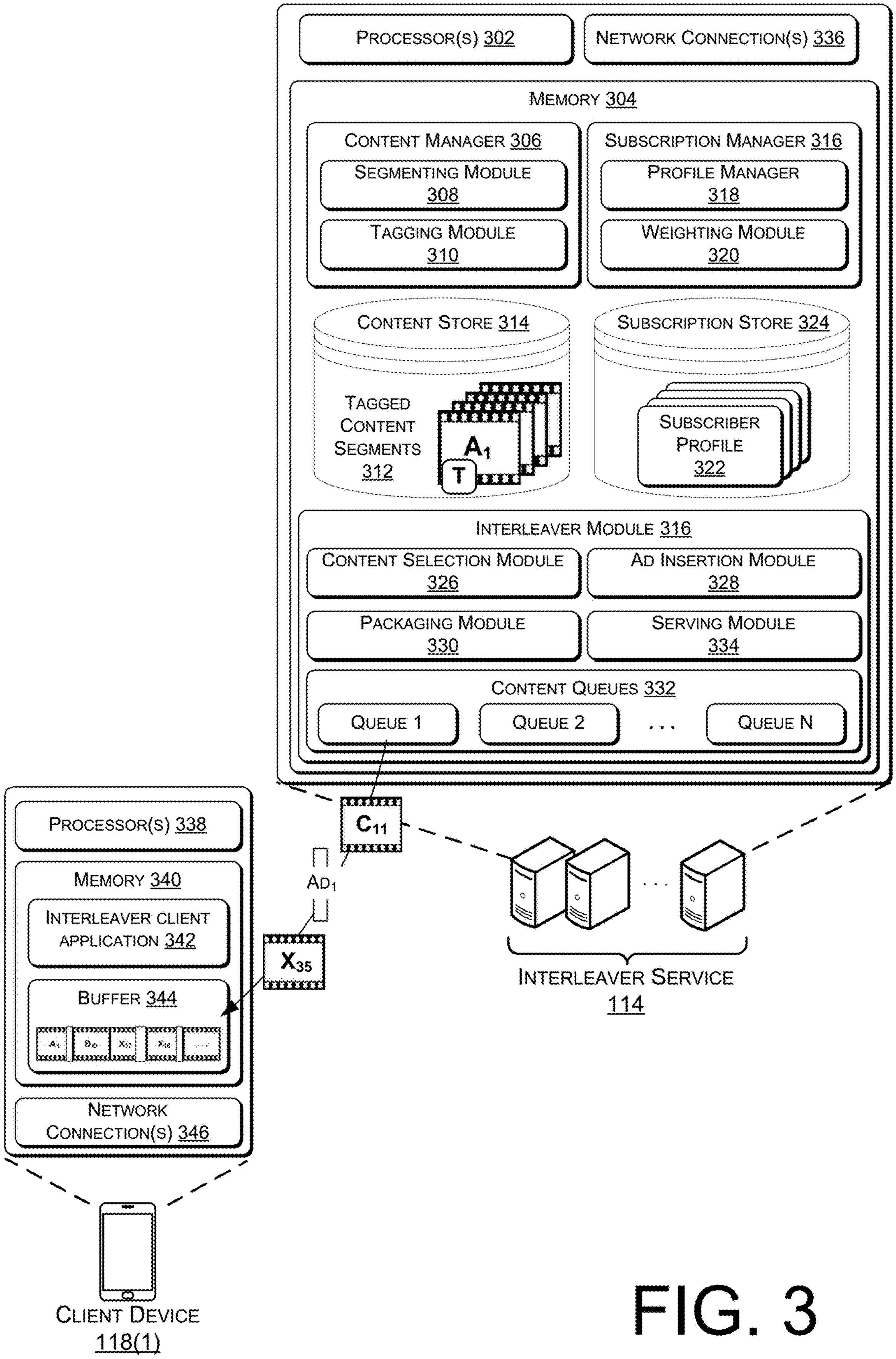
FIG. 3 is a block diagram showing example detail of the interleaver service of FIGS. 1 and 2.

FIG. 3 is a block diagram showing details of the example interleaver service 114 and a representative one of the client devices 118 of FIGS. 1 and 2. As shown in FIG. 3, the interleaver service 114 includes one or more processor(s) 302 communicatively coupled to memory 304. The memory 304 may store one or more software and/or firmware modules, which are executable by the processor(s) 302 to implement various functions.

In the illustrated example, the memory includes a content manager 306 which processes the incoming content 102 from the content sources 104. The incoming content 102 may comprise content from multiple concurrently airing broadcasts of sporting events, for example. The content manager 306 may include a segmenting module 308 configured to segment the incoming content 102 (e.g., to break the content into short clips of individual plays or groups of plays). In some instance, incoming content 102 may already be segmented, in which case the segmenting module 308 may further segment the content or the content may not need to be segmented by the interleaver service 114. The content manager 306 may also include a tagging module 310 to tag the incoming content (e.g., to identify one or more athletes, teams, locations, events, etc. depicted in each segment). The incoming content may be tagged prior to, during, or after the segmenting process. The tagging module 310 may tag untagged segments, add tags to previously tagged segments (e.g., segments that were received with existing tags), or replace previous tags with new tags. Once the incoming content is segmented and tagged (by the content manager 306 or otherwise) the tagged content segments 312 may be stored in a content store 314 in the memory 304 or another location accessible to the interleaver service 114. Segments and/or segmenting information may be saved in the content store 314 as separate files or combined in data structures, or may be saved as metadata to the original incoming content.

The memory 304 also includes a subscription manager 316 which manages subscriptions of one or more users of the interleaver service 114. The subscription manager 316 includes a profile manager 318 and a weighting module 320. The profile manager 318 may be configured to create and maintain a subscriber profile 322 for each user. The subscriber profiles 322 may include user information (e.g., contact information, demographic information, etc.), fantasy sports information (e.g., information about fantasy sports athletes, team(s) league(s) or account(s) of the user), and/or other information (e.g., favorite real athletes or teams, social network information, etc.). The subscriber profiles 322 may also include subscriptions to one or more topics of interest to the user. The topics of interest may have been explicitly identified by the user, or may be inferred based on the user information, the fantasy sports information, or the other information. Each of the subscriptions to the topics of interest may be assigned a weight by the weighting module 320. The weight indicates a relative importance or interest level of the various topics of interest to the user. The weightings may be explicitly set by the user, may be set according to a default weighting, and/or may be inferred based on the user information, the fantasy sports information, a history of user action, or the like. The subscriber profiles 322 may be stored in a subscription store 324 in the memory 304 or another location accessible to the interleaver service 114.

An interleaver module 316 stored in the memory 304 is responsible for identifying tagged segments 312 to serve and/or include in the custom content provided to the various users. The interleaver module 316 includes a content selection module 326 an ad insertion module 328. The content selection module 326 identifies tagged segments 312 that match subscriptions in subscriber profiles 322, prioritizes the segments based on user preferences or weights in the subscriber profiles, and generates a custom content stream for the user. The ad selection module 328 identifies ads relevant to the respective subscriber profiles 322 and inserts them into the custom content stream at appropriate locations.

The interleaver module 316 also includes a packaging module 330 that formats the segments of the custom content stream and prepares them for transmission to client devices. For instance, the packaging module 330 may break segments into multiple packets and/or insert multiple segments and/or ads into a packet or package. The segments are then placed into a queue for transmission to the particular user. In the illustrated example, the interleaver module 316 administers content queues 332 (e.g., queue 1, queue 2, . . . queue N) corresponding to each user of the interleaver service. Thus, the queue for each user may contain tagged segments and ads packaged for transmission to a client device of the respective user as a custom content stream. In other examples, rather than storing individual copies of segments and ads in the queues for each user, the queue for each user may simply include a pointer or other reference to a common, centralized copy of each segment or ad. The tagged segments and ads remain in the respective user's queue (or in a centralized store to which the pointer or reference in the queue is directed) until they are transmitted to the user's client device. Before they are transmitted to the client devices, an order of content segments and ads may be reordered based on various priorities and user preferences (e.g., relevance to the user vs. freshness of the segments). A serving module 334 of the interleaver service 114 is configured to transmit packets in an order indicated in each queue to the respective client device via one or more network connections 336 (e.g., wired or wireless connections etc.). The serving module 334 may serve packets to the client devices as the packets become available (i.e., are packaged and placed in the queue) and/or to maintain a predetermined clip buffer at each client device.

FIG. 3 also illustrates additional details of representative client device 118(1). As shown, client device 118(1) includes one or more processors 338 and memory 340. The memory 340 includes, among other things, an interleaver client application 342. The interleaver client application 342 may be installed on the client device 118(1) and when opened or executed may provide a user interface by which the user may interact with the interleaver service 114. For instance, the interleaver client application 342 may provide one or more graphical user interfaces that allow the user to create an account, manage one or more fantasy teams, manage one or more preferences or subscriptions, and/or consume a custom stream of content, all of which are described in greater detail below.

The memory 340 also includes a buffer 344 that includes one or more content segments and ads of the custom content stream. The content segments and ads are placed in the buffer 344 when they are received via one or more network connections 346 from the interleaver service 114. The content segments and ads remain in the buffer 344 until they are played or otherwise consumed by the interleaver client application 342, until they are deleted, or until they are replaced by other content and/or ads (e.g., content and/or ads that are more relevant and/or fresher).

In the example of FIG. 3, the content selection module 326 identifies one or more tagged content segments 312 as being relevant to a user of client device 118(1) based on information in the user's subscriber profile 322. The ad insertion module 328 then inserts one or more ads that are tailored to the user based on the user's subscriber profile. The tagged content segments 312 and ads are then formatted by the packaging module 330 and placed in queue 1 corresponding to the user of client device 118(1). Then, the serving module 334 transmits one or more segments and/or ads from the queue 1 to the buffer 344 of the client device 118(1). In the illustrated example, the serving module 334 transmits segments $X_{35}$ and $C_{11}$ and ad $AD_1$ to the client device 118(1). The segments and ads may be pushed to the client device 118(1) on a schedule determined by the interleaver service 114, or they may be transmitted in response to a request from the client device 118(1). In some examples, the segments and ads may be transmitted responsive to the buffer of the client device 118(1) falling below a threshold fullness (i.e., having less than a threshold number of segments or ads, or less than a threshold length of custom content).

The segments $X_{35}$ and $C_{11}$ and ad $AD_1$ may then be played back by the interleaver client application 342 in the order they were received, in an order specified by the user, in a priority order determined by the interleaver client application 342 or the interleaver service 114, or in any other suitable order.

While the modules are described herein as being software and/or firmware executable by one or more processors, in other embodiments, any or all of the modules or functional blocks may be implemented in whole or in part by hardware (e.g., as an application specific integrated circuit or "ASIC," a specialized processing unit, a field programmable gate array or "FPGA," etc.) to execute the described functions.

The memory 304 of the interleaver service 114 and/or the memory 340 of the client devices 118 may comprise computer-readable media and may take the form of volatile memory, such as random access memory (RAM) and/or non-volatile memory, such as read only memory (ROM) or flash RAM. Computer-readable media includes volatile and non-volatile, removable and non-removable media implemented in any method or technology for storage of information such as computer-readable instructions, data structures, program modules, or other data for execution by one or more processors or circuits of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device. As defined herein, computer-readable media does not include transitory media such as modulated data signals or carrier waves.

Example Segmenting and Tagging Operations

Figure 4:
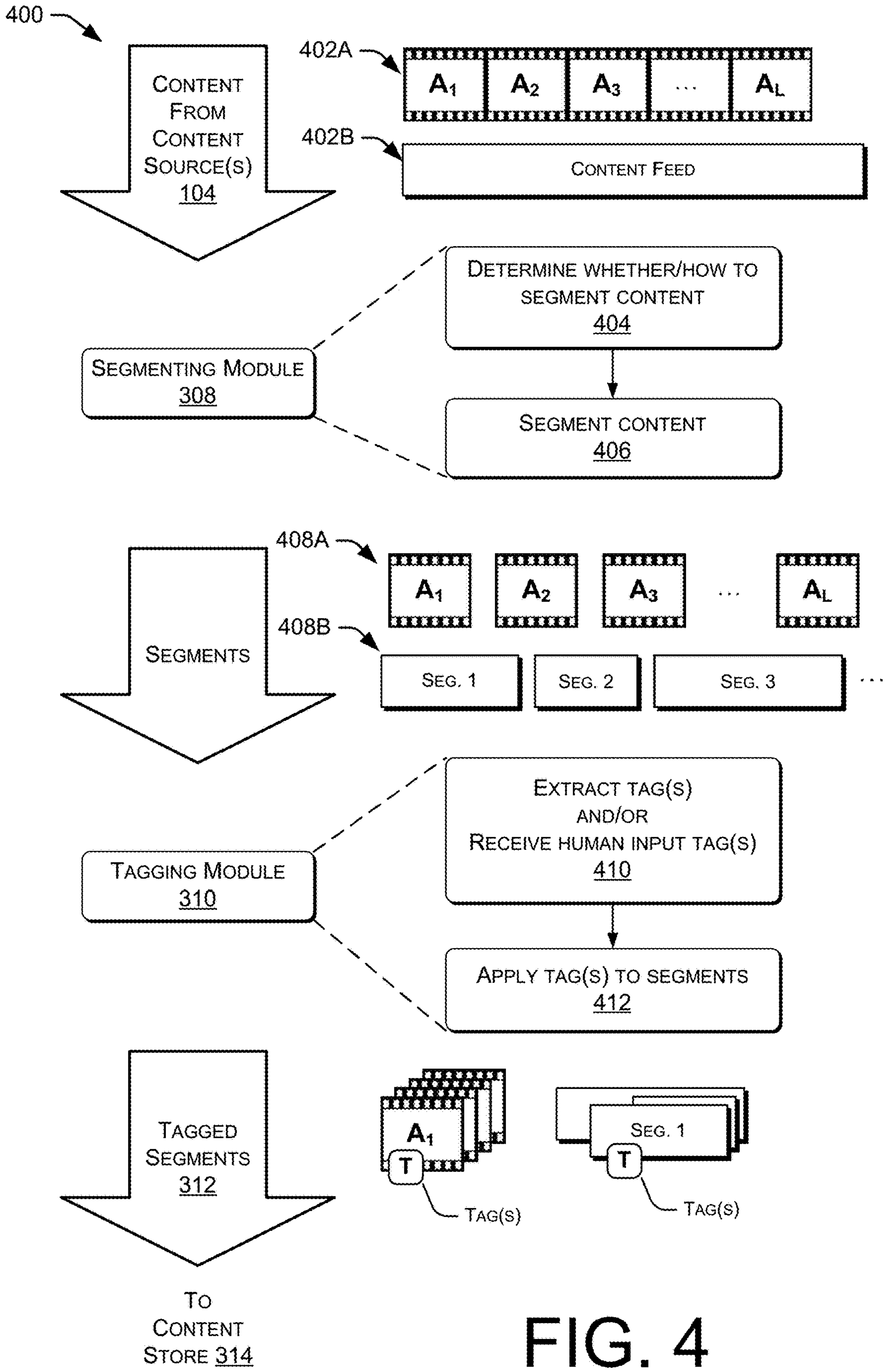
FIG. 4 is a schematic flow diagram showing example operations performed by a segmenting module and a tagging module of the interleaver service of FIGS. 1 through 3.

FIG. 4 is flowchart with schematic diagrams providing an overview of an example segmentation and tagging process 400 that may be used to segment a content feed into multiple segments and to tag the segments with one or more tags. For ease of description and understanding, the process 400 is described as being performed by the segmenting module 308 and tagging module 310 of the interleaver service 114 of FIGS. 1-3. However, the process 400 may additionally or alternatively be performed in whole or in part by one or more other systems.

As shown in FIG. 4, the segmenting module 308 receives content from one or more content sources 104. In some cases, content may come from a content source with predefined frames, tracks, chapters, scenes, or other segments, as in the case of content 402A in FIG. 4. In that case, the interleaver service may segment the content according to the predefined segments. Alternatively, the segmenting module 308 may create new segments, which may include multiple of the predefined segments, may include a portion of a predefined segment, may span multiple predefined segments, or may replace the predefined segments. In other cases, as in the case of content 402B, content may be received in a lengthy and/or ongoing feed.

At block 404, the segmenting module determines whether the content needs to be segmented. If the content is received in an un-segmented fashion (e.g., a large content file or a continuous stream or feed of content) or if additional segmentation is necessary or desired (e.g., if the predefined segments are to large or do not align with content of interest to the user), at block 406, the segmenting module 308 may segment the content into one or more segments, such as segments 408A or 408B. Additional details of segmentation are provided with reference to FIGS. 5A-5C, 6, and 8.

At block 410, the tagging module 310 may obtain one or more tags for each segment. While in this example the tagging is shown as being performed after segmentation, in various examples the tagging may be performed prior to, concurrently with, and/or after the segmenting. The tags may be obtained by extracting the tags from the content of the segments themselves or by receiving human input tags (as described in further detail with reference to FIGS. 7, 8, and 17. Regardless of how the tags are obtained, at block 412, the tagging module may apply the tag(s) to the content segments 408A and/or 408B. Once tagged, the tagged content segments 312 may be output to and stored in the content store 314.

Figure 5A:
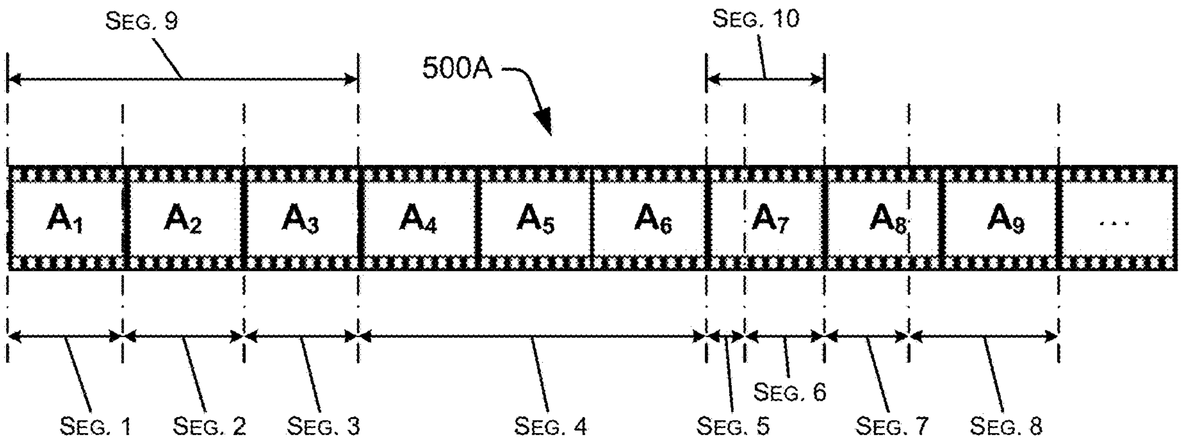
FIGS. 5A, 5B and 5C illustrate three example ways in which content may be segmented.
Figure 5B:
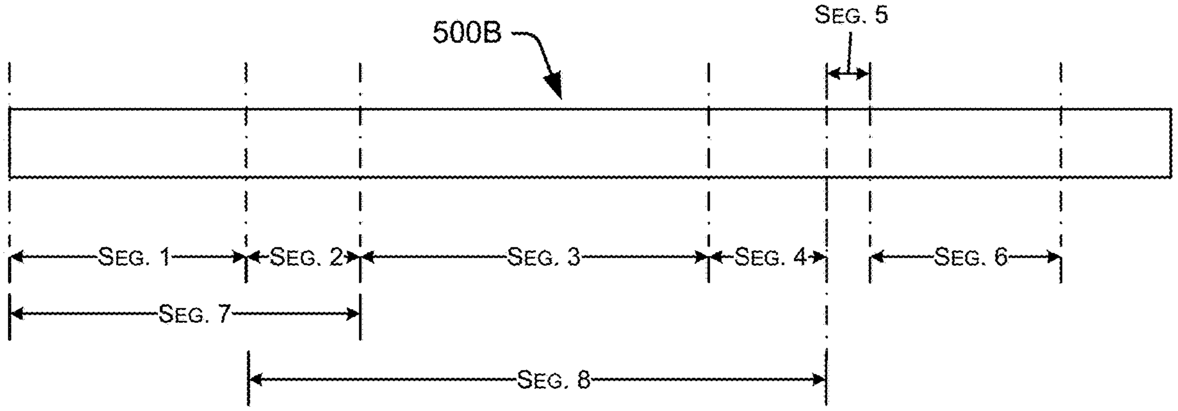
Figure 5C:
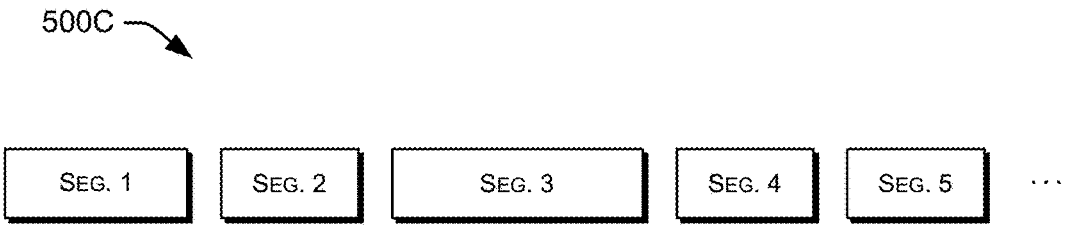

FIGS. 5A-5C illustrate examples of various types of content that may be received by the interleaver service 114, and different ways of segmenting the various types of content that may be received. For instance, FIG. 5A illustrates a continuous or incoming stream of content 500A from a content source that includes predefined frames ($A_1$, $A_2$, $A_3$, etc.), tracks, chapters, scenes, or other segments. As mentioned above, the interleaver service 114 may use the predefined segments as-is, or may create additional or alternative segments (e.g., because the predefined segments are not of an appropriate length for use by the interleaver service or are not centered around the desired subject matter or event). In FIG. 5A, segments "Seg. 1," "Seg. 2," and "Seg. 3" are examples of instances in which the interleaver service 114 has adopted the predefined frames and segmented the incoming content according to the predefined frames. "Seg. 4" is an example of an instance in which the interleaver service 114 has segmented the content into a segment including multiple of the predefined frames (i.e., frames $A_4$-$A_6$). "Seg. 5," "Seg. 6," and "Seg. 7" are examples of instances in which the interleaver service 114 has segmented the content in to segments shorter than the predefined frames, such that each of Seg. 5-Seg. 7, includes a portion of a predefined frame. "Seg. 8" is an example of a segment that spans parts of multiple predefined frames (i.e., part of frames A8 and A9).

Moreover, content may be segmented in multiple different ways. For instance, the portion of the content represented by frames $A_1$-$A_3$ has been segmented into three segments ("Seg. 1," "Seg. 2," and "Seg. 3") that generally align with the predefined frames, and has also been segmented into one larger segment ("Seg. 9) that generally spans all three of the predefined frames. In the context of fantasy football, "Seg. 1," "Seg. 2," and "Seg. 3" may generally correspond to three individual plays, while "Seg. 9" may generally correspond to a sequence or series of plays (e.g., a goal line stand or a series of downs) or a single play with one or more instant replays, celebrations, etc. Alternatively, "Seg. 2" may correspond to a reception, while "Seg. 1" may correspond to the pass that resulted in the reception, and "Seg. 3" corresponds to a touchdown by the receiver that caught the pass in "Seg. 2." In that case, "Seg. 2" may be considered a "short" version of the reception showing just the catch, while "Seg. 9" may be considered a "long" version of the reception showing the series of events leading up to and following the reception. By segmenting content in multiple different ways, the interleaver service 114 may serve different versions to different users (e.g., send the short version to users with slower connection speeds and/or more limited data packages and send the larger version to users with faster connection speeds and/or larger or unlimited data plans; send short or long version based on user preferences; send short or long version depending on which is more relevant to the user; etc.).

Alternatively, the interleaver service 114 may send the long version of the content along with metadata designating both short and long segmentation, and the interleaver client application 342 on the client device 118 may determine whether to play the short version or the long version based on one or more factors (e.g., user preference, relevance, freshness, amount of content in the buffer 344, amount of content in the user's content queue 332 at the interleaver service 114, or the like). In one specific example, the interleaver client application 342 may determine to play the short version if the buffer 344 is full (e.g., over a threshold content size or number of clips), otherwise play the long version. While in the foregoing examples, two alternate segmentations (i.e., long and short) are described, in other examples, the content could include three or more segmentations.

While in the example of FIG. 5A, the series of frames constituting "Seg. 9" are contiguous and consecutive, in other examples the segments may be composed of multiple non-contiguous and/or non-consecutive frames or other portions of the content. Moreover, segments may be composed of portions of multiple different content streams (e.g., "Seg. 3" from FIG. 5A may be combined with "Seg. 2" from FIG. 5B to result in a new composite segment).

FIG. 5B illustrates an example in which content 500B comes from the source as a program or a continuous feed without predefined breaks and may be continuously segmented in substantially real time. The content 500B in this example does not include any predefined frames or other segments. In that case, the content may be segmented in a variety of ways. For instance, the content may be segmented manually (i.e., by manual editing by a human user), automatically via a variety of automated segmenting techniques, or by a semi-automatic or partially automated segmentation process. Whether manual, automatic, or semi-automatic, the content may be segmented based at least in part on audio of the content (when speaker starts/stops, when speaker mentions athlete, etc.), video of the content (when athlete enters field of view, when play begins/ends, etc.), and/or textual content (when athlete's name appears in images in the video or closed captioning) in or appended to the content (e.g., in metadata or tags). These and other segmenting approaches are described further below with reference to FIGS. 6 and 7.

FIG. 5C illustrates an example in which content 500C comes from the source as individual discrete segments or blocks of content. The content 500C may come from the source as individual segments of arbitrary length, uniform length, or multiples (e.g., 2X) of a uniform length.

Regardless of the form of the incoming content and/or the segmenting approach employed, not all of incoming content is necessarily kept as a segment and/or some segments may be discarded. Further, in instances where the segments comprise metadata appended to or referencing the original content, not all portions of the original content need be designated as a segment. In either case, the result is that some portions of the original content (e.g., huddles, credits, commercials, etc.) may be not segmented or may be segmented and then discarded.

Figure 6:
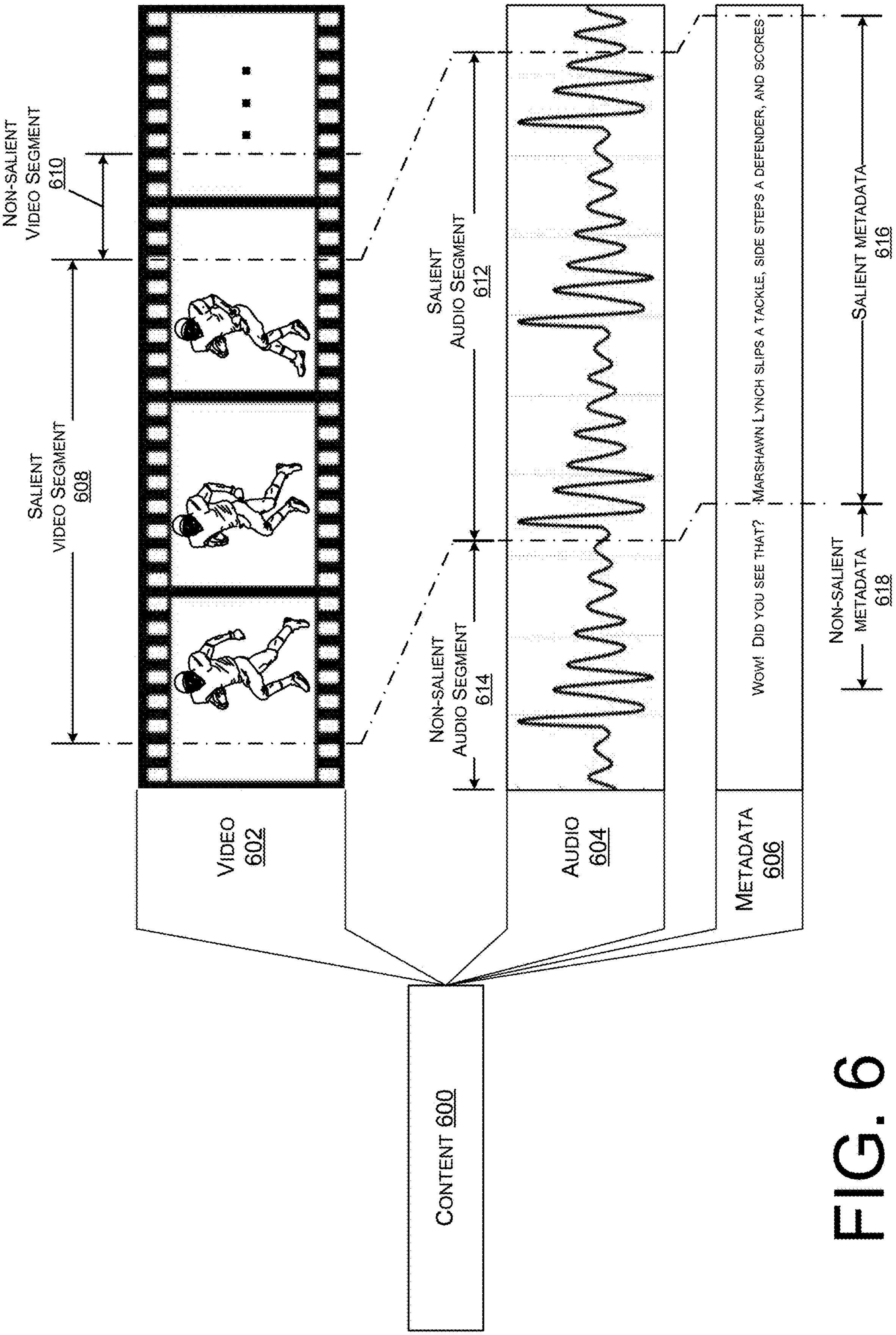
FIG. 6 is a schematic diagram illustrating an example of how content including video, audio, and metadata may be segmented.

FIG. 6 is a schematic diagram illustrating an example of how content 600 may be segmented. Incoming content received by the interleaver service 114 may include audio, video, still images, closed captioning data, tags or and/or annotations. As mentioned above, the incoming content may be segmented based at least in part on audio of the content, video of the content, and/or textual content in or appended to the content. Content 600 represents an example content stream corresponding to a televised sporting event, which includes video 602, audio 604, and metadata 606.

The video 602 includes recorded and/or digitized video of the sporting event. The video 602 may be raw, unedited video (e.g., a feed from one of multiple cameras filming the sporting event), or it may be edited video (e.g., a final or semi-final version of video ready for consumption by consumers). While content 600 includes a single feed of video (i.e., images from a single camera or source), in other examples, video content may comprise multiple video feeds (e.g., simultaneous video feeds from multiple cameras filming the same sporting event). As shown in FIG. 6, the video 602 includes one or more salient video segments 608 and one or more non-salient video segments 610. The salient video segments 608 correspond to portions of the video 602 that depict an event of interest, while the non-salient segments 610 correspond to portions of the video 602 that depict events of low interest. Generally, the salient video segments 608 depict subjects (e.g., people, places, or things) and/or occurrences (e.g., actions or events) that are or are likely to be of interest to one or more users of the interleaver service 114. In the fantasy sports context, salient video segments 608 may include, for example, portions of the video that depict events for which statistics are maintained by an athletic governing body (e.g., rushing yards in football, strikeouts in baseball, three-point baskets in basketball, etc.), portions of video that depict events resulting in fantasy points being awarded or decremented. In some fantasy sports examples, salient video segments 608 may additionally or alternatively include portions of the video showing context of the sporting event or surroundings (e.g., stadium, cheerleaders, sidelines, halftime shows, announcers, analysts, fights, crashes in auto racing, etc.). Non-salient video segments generally relate to portions of the video of little or no interest to users. In the fantasy sports context, non-salient video segments 610 may include, for example, portions of the video showing periods of inaction (e.g., rain delays, huddles, timeouts, etc.) or errors or mistakes (e.g., inadvertently recorded video showing the ground or the inside of the lens cap for instance, blurred or obscured images, scrambled or blank video feeds, etc.). In some examples, non-salient video segments 610 may include advertisements contained in the original video. However, in other instances, advertisements in the original content may be considered salient video segments 608.

The audio 604 comprises an audio recording (e.g., digital audio data) corresponding to the video 602. The audio 604 may comprise audio recorded by a microphone associated with a camera that recorded the video 602, audio recorded by one or more announcer microphones, audio from a studio announcer/analyst, or other audio. The audio may be recorded contemporaneously with the video (i.e., "live" relative to the video) or at a different time prior to or after the video. The audio 604 may include one or more salient audio segments 612 and one or more non-salient audio segments 614. In some cases, the salient and non-salient audio segments may be temporally aligned with the salient and non-salient video segments, respectively. However, in other cases, such as that shown in FIG. 6, the salient audio segments 612 may be temporally offset from the salient video segments 608. This may be the case when, for example, a play unfolds and the announcer's description or analysis of the play does not begin until the play is in progress or complete. In that case, the portion of the salient audio segment (i.e., the announcer commentary or analysis may be delayed relative to the salient video segment (i.e., the video depicting the play). In some instances, the length of the salient audio segments 612 may be of the substantially a same duration as the corresponding salient video segments 608. However, in many cases, the length of a salient audio segment will be different than that of the corresponding salient video segment. For instance, often a salient video segment (e.g., play) occurs quickly and is of short duration while the salient audio segment is delayed and/or more lengthy (e.g., in the case of announcer description of the play followed by analyst discussion or explanation). In other instances, the salient video segment may be longer than the corresponding salient audio segment. Further, in some instances, there may be no salient audio segment corresponding to a salient video segment (e.g., when there is no announcer mention of a particular play or other event) or vice versa (e.g., when an announcer or analyst comments on an athlete or other topic that is not present in the video content).

The content 600 in FIG. 6 also includes metadata 606. Metadata take many forms, including closed captioning data, annotations (textual, audio, video, etc.), bookmarks (e.g., showing points of interest), partitions (e.g., frame or track boundaries), editing data, supplementary information (e.g., index or table of contents, scene or chapter designators, credits, etc.). In the illustrated example, metadata 606 includes closed captioning data comprising a textual representation of the audio 604. In this example, the content 600 was received with the metadata 606, but in other examples, the interleaver service 114 may process the incoming content as it is received in near real time to add the metadata. Regardless of where the metadata 606 is generated, it may be generated manually (e.g., entered by a transcriptionist), automatically (e.g., using a voice recognition speech-to-text program), or semi-automatically (e.g., using a voice recognition speech-to-text program to generate a preliminary data, which is then edited by one or more human administrators). The metadata 606 may or may not be aligned temporally with the video 602 and/or audio 604. The metadata 606 may include salient metadata 616 and non-salient metadata 618, which may or may not correspond to salient and non-salient audio and/or video segments. In the example of FIG. 6, since the metadata represents closed captioning data, the metadata generally corresponds to the audio segments (though may not align temporally with the corresponding audio segments).

In some examples all parts of the content (e.g., audio, video, textual content, images, etc.) may be segmented at a same time and/or in a same segmenting operation. For instance, the content may be divided into multiple parts based on time segments of a recording, such that each segment is composed of whatever audio, video, text, or other content is included within the particular time range of the segment. In other examples, the various parts of the content may be separated and segmented separately. That is, the audio may be separated from the other portions of content and the audio may be segmented using one or more audio segmenting techniques. Similarly, the video and other portions of the content may each be segmented individually. Thereafter, one or more salient audio, video, and/or other segments may be aligned and recombined so as to provide segments having salient audio, video, and other content that are temporally aligned. For example, as mentioned above, salient video segment 608 begins at a time in the content 600 prior to salient audio segment 612, which in turn begins prior to the corresponding salient metadata 616. In some examples, the salient video segment 608, salient audio segment 612, and salient metadata 616 may be aligned temporally. Aligning the various salient segments temporally may include aligning them to begin at a same time, to end at a same time, and/or to be centered around a same midpoint in time.

In some examples, the various salient segments may be of different lengths (e.g., the salient audio segment may be longer than the salient video segment or vice versa). In some instances these differences in length may be acceptable or even desirable. However in other instances, it may be desirable that the various salient segments that are to be combined be of the same or substantially the same length. In such cases, a longer segment may be trimmed to match a length of a shorter segment, a shorter segment may be supplemented with additional content or ads to reach the length of a longer segment, or one or more of the segments may be sped up or slowed down to match the length of the other segment(s).

In still other examples, one or more portions of the original content may be omitted from the finished segments. For instance, the original audio of the content may be omitted from the segments. In that case, the finished segments may be free of audio entirely, may be replaced by alternative audio (e.g., an audio account of what is shown in the video, commentary on what is shown in the video, or the like).

Figure 7:
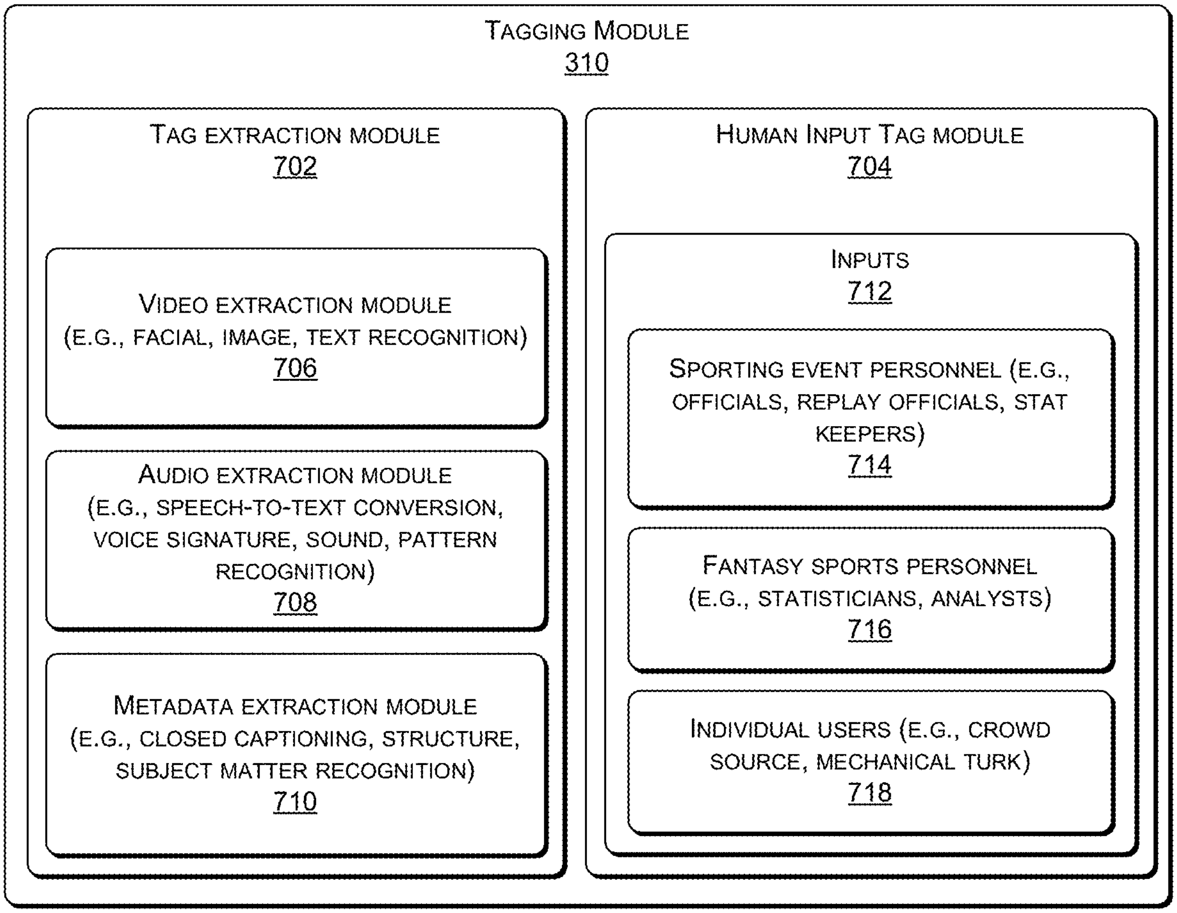
FIG. 7 is a block diagram showing additional details of the example tagging module of FIG. 3.

FIG. 7 is a schematic diagram showing additional details of the example tagging module 310 of the interleaver service 114 that may be used to tag segments with terms describing subject matter in the segment, a source of the segment, a date and time of the segment, fantasy points attributable to events in the segment, or the like. As mentioned previously, in various examples segments may be tagged automatically, manually (i.e., by one or more humans), or semi-automatically (using both automated and manual processes in parallel or in series). In the example of FIG. 7, the tagging module 310 includes a tag extraction module 702 configured to perform automated tagging and a human input tag module 704 which facilitates receiving human input tags. Thus, the tagging module 310 in this example is capable of performing tagging automatically, manually, or semi-automatically. Whether the tagging module 310 does tagging automatically, manually, both in parallel (e.g., cumulative automatic and manual tagging), or both in series (e.g., automatic tagging reviews and revised by human users or vice versa) may depend upon the form in which the content is received, the nature of the events depicted in the content, the demand for new fresh segments, the allowable time for processing incoming content into segments, or the like.

The tag extraction module 702 in this example includes a video extraction module 706, an audio extraction module 708, and a metadata extraction module 710. The tag extraction module 702 may use any or all of these modules to automatically extract or discern subject matter depicted or described in the content.

The video extraction module 706 may include one or more algorithms to perform facial recognition to identify faces of people depicted in video of the content. Facial recognition approaches employed by the video extraction module 706 may include geometric approaches, photometric approaches, or other facial recognition approaches. By way of example and not limitation, several specific facial recognition algorithms that may be used separately or in combination include the Principal Component Analysis using eigenfaces, Linear Discriminate Analysis, Elastic Bunch Graph Matching using the Fisherface algorithm, the Hidden Markov model, the Multilinear Subspace Learning using tensor representation, and/or the neuronal motivated dynamic link matching. In some examples, the facial recognition may be performed with reference to a database of images (e.g., images of athletes of one or more sports). Once a person is identified using facial recognition, the segment may be tagged with the name, position, or other information about the identified person.

Additionally alternatively, video extraction module 706 may identify one or more images or other objects in the content. The object recognition may be performed based at least in part on the shape, color, and/or contrast of objects in the video content. For instance, the video extraction module 706 may be able to identify objects such as sporting equipment (e.g., a helmet, a ball, shoes, a racket, etc.), structures (e.g., buildings, goals or goal posts, baskets, shot clock, home plate, etc.), visible symbols or markings (e.g., yard lines, side lines, base lines, starting lines, finish lines, track turns, etc.). In some examples, the video extraction module may perform object recognition by analyzing the video content, identifying one or more salient objects in one or more frames of the video, and then comparing the salient object(s) to a database of known objects or object types. If the salient object(s) match known objects or object types, the segment may be tagged as containing the known object or object type. Numerous machine vision techniques are available to perform object recognition depending on the object to be recognized.

Additionally alternatively, video extraction module 706 may perform optical character recognition (OCR) to identify one or more characters in images of printed, computer generated, or handwritten text (e.g., signs, names or numbers on jerseys, scores, time clocks, tickers, announcements, etc.). The text thus recognized may be output as tags of the segment.

Furthermore, in addition to extracting data directly from the content itself, the tag extraction module 702 may further use the extracted information as a query to search one or more other databases of information (e.g., roster information, statistics, schedule information, etc.). In some instances, this additional information may be used to help disambiguate between multiple possible identifications. For instance, the facial recognition algorithm may indicate that a video clip depicts one of multiple possible candidates, but may not be able to definitively determine which person is actually depicted. An object recognition algorithm may also be used and may determine (e.g., based on the uniform colors) that the person belongs to a particular team. By querying a roster database, the tag extraction module 702 may determine that only one of the possible candidates plays for the particular team and in this way may determine the identify of the particular person.

In one specific example related to football, the video extraction module 706 may use object recognition to identify a ball carrier by recognizing the ball based on the color (brown) and/or shape, and may then determine an identity of the ball carrier using facial recognition by comparing the video content to a database of images of football players and/or by using OCR to recognize a name or number on the player's jersey. The segment may then be tagged with a variety of tags, such as the identity of the ball carrier, the particular sport (e.g., football), a position of the ball carrier (e.g., running back, quarterback, etc.), a team for which the ball carrier plays, any other athletes shown in the segment, or the like. In other examples, other information may be recognized in the segment and/or included as a tag of the segment.

The audio extraction module 708 may perform speech-to-text conversion on the audio content to determine one or more words that are being spoken in the audio content. The output of the speech-to-text conversion comprises text, some or all of which may be used to tag the audio content or temporally aligned video content. In some examples, the audio extraction module 708 may select less than all of the output of the speech-to-text conversion for use as tags, such as names (e.g., athletes names, team names, announcer names, etc.), events for which statistics are kept and/or fantasy potions are awarded (e.g., touchdown, homerun, tackle, goal, score, basket, etc.), locations, etc.

Additionally or alternatively, the audio extraction module 708 may perform voice signature recognition, sound recognition, and/or pattern recognition to identify a source of the respective voice, sound, and/or pattern. For example, the audio extraction module 708 may compare a portion of audio content to a database of audio content, such as a database of known voice samples (e.g., of known athletes, coaches, announcers, etc.) or other known sounds common to various sporting events (e.g., crowd noise, field noise, crack of a bat, shot clock buzzer, motor noises, etc.). Prior to performing the comparison, the audio extraction module 708 may perform some pre-processing to identify particular classes of audio (e.g., speech, motor noise, etc.), to isolate or enhance certain sounds, or the like. In some examples, the audio extraction module 708 may analyze the video content, identify one or more salient portions of the audio, and then compare the salient portion of the audio to the database of known voice samples or other known sounds. If the salient audio matches known voices or sounds, the segment may be tagged as containing the known voice or sound. Numerous audio processing techniques are available to perform voice signature, sound, and/or pattern recognition.

The metadata extraction module 710 may extract data metadata such as closed captioning information, structure of the content such as audio and/or video format, compression, resolution, source information (e.g., a broadcasting company, website, or other source of the content), data information, property right information (e.g., copyright, license information, etc.), annotations, predefined segments (e.g., frames, chapters, etc.), or the like. The metadata extraction module 710 may additionally or alternatively include subject matter recognition capabilities to determine or infer subject matter (e.g., people, places, things, events, actions, etc.) included in content from the metadata. For instance, if content includes closed captioning or other metadata including names of two athletes, the metadata extraction module 710 may query one or more other databases to determine which teams those two athletes are on, when those two teams play each other, the positions of the athletes, or the like. From this, the metadata extraction module 710 may infer that the segment corresponds to a segment from a particular game between the two teams, and that the two athletes are featured in the segment. Depending on the respective positions of the two athletes, the metadata extraction module 710 may also be able to infer something about the nature of the event depicted in the segment. For instance, if one of the athletes is a kicker, the metadata extraction module 710 may infer that the play involved a kick. The information obtained by the metadata extraction module 710 may be used alone or together with information obtained by the video and/or audio extraction modules to tag the various segments with terms relevant to the segments.

The human input tag module 704 provides one or more inputs 712, from which the tagging module 310 may receive human input tags. In the illustrated example, the inputs 712 include event inputs 714 from sporting event personnel, such as referees, umpires, replay officials, statistics keepers, or other personnel associated with a sporting event. These inputs may be in the form of speech, text, or other information and may include inputs captured or received at the time the content was recorded (e.g., by officials' microphones or stat keepers' entries during the sporting event) or after the fact (e.g., during an instant replay, booth review, review of the film after the game).

The inputs 712 may additionally or alternatively include fantasy inputs 716 from one or more statisticians, analysts, or fantasy sports company personnel. The inputs from the fantasy inputs 716 may include terms or descriptions associated with or describing the subjects and/or events depicted in one or more segments. Additionally or alternatively, the fantasy inputs 716 may include a number of fantasy points awarded or decremented based on events depicted in the segment(s).

The inputs 712 may additionally or alternatively include user inputs 718 from one or more users of the interleaver service 114, one or more fantasy sports services (e.g., Yahoo, ESPN, etc.), a crowd sourcing service such as Amazon's mechanical turk that solicits tags for one or more segments in exchange for compensation (e.g., money, goods, services, discounts, etc.). In the case of users of the interleaver service 114, the segment may be served to one or more users as part of their custom content. The users may then annotate the segment, post comments regarding the segment, message one or more of their contacts regarding the segment, or the like. These annotations, comments, and/or messages may be analyzed to identify additional tags associated with the segment. In this way, tags for segments may be updated and refined over time to improve the accuracy and completeness of the tags for each segment. In the case of users of a crowd sourcing platform such as Amazon's mechanical turk, the segments may be posted on the crowd sourcing platform where the users may view the segments and input one or more tags associated with each segment. Users may be compensated based on, for example, the number of segments they tag, the number of tags they assign to each segment, the timeliness of the tags (i.e., how soon they tags are applied after the segments are posted), or the like.

In still other examples, a crowd sourcing approach could be implemented directly through the interleaver service 114. In that case, user may receive compensation (e.g., money or credits to their account) for tagging segments. In some examples, if a user opts to participate as a crowd source worker to help tag segments, the user may receive untagged segments as part of the user's custom content stream. The user may adjust a number or frequency of untagged segments that the user receives to tag via one or more interfaces of the interleaver service. In other examples, the interleaver service 114 may serve a separate segment tagging interface presenting multiple segments available to be tagged by the user.

In some cases the inputs 712 may comprise raw inputs (speech, text, points, etc.) that are then converted into individual tags to be applied to the segments. In other instances however, the inputs 712 may comprise individual terms or other tags in a form suitable to be applied to a particular segment or other portion of content.

Figure 8:
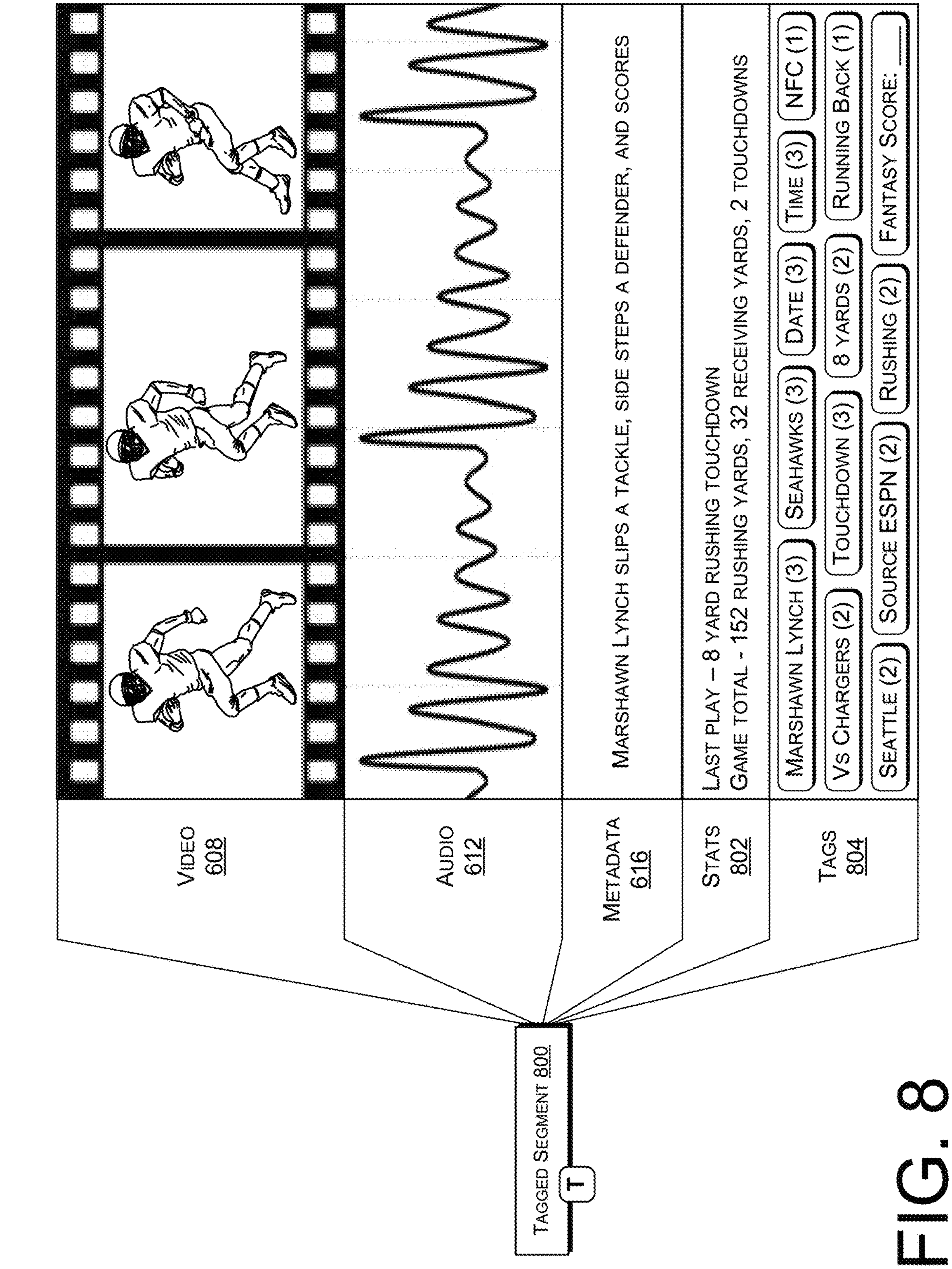
FIG. 8 is a schematic diagram illustrating example structure of a tagged content segment.

FIG. 8 is a schematic diagram illustrating an example tagged (or annotated) segment 800. The tagged segment 800 corresponds to a portion of the content 600 shown in FIG. 6, which has been tagged by the tagging module 310 with multiple applicable tags. Of course, in other examples tagged segments such as tagged segment 800 may be generated by other systems and using other processes. Moreover, the systems and processes described with reference to FIGS. 6 and 7 may be used to generate different tagged segments. Thus, using the tagging or annotations associated with the tagged segment 800, and using information found in each subscriber profile 322, the interleaver service 114 may determine if any particular tagged segment (e.g., video clip) has fantasy point relevance (or other relevance, such as favorite player or team) to any particular user and associated client device 118. Accordingly, the interleaver service 114 may be configured to include the tagged segment 800 in the custom content 116 associated with those client devices to which the segment is relevant.

As shown in FIG. 8, the tagged segment 800 comprises the salient video segment 608 aligned with the salient audio segment 612 and salient metadata 616. In some examples, the tagged segment 800 may include one or more statistics 802 relevant to the segment and one or more tags 804 relevant to the segment. For instance, in the illustrated example, the statistics 802 include an indication of a result of a last play (e.g., an 8-yard rushing touchdown by Marshawn Lynch) and one or more game total statistics (e.g., 152 rushing yards, 32 receiving yards, 2 touchdowns) for an athlete featured in the segment.

In the illustrated example, the tags 804 include an athlete shown in the segment (e.g., Marshawn Lynch), a team for which the athlete plays (e.g., Seahawks), a location of a game that the segment depicts or a location of the team for which the athlete plays (e.g., Seattle), a conference (e.g., NFC) to which the team belongs, one or more actions or events depicted in the segment (e.g., Rushing, Touchdown), a quantity associated with an action (e.g., 8 yards, as applied to rushing), a position played by the athlete (e.g., running back), a date on which the content or segment was generated and/or on which the athletic event was played, a time at which the content or segment was generated and/or at which the athletic event was played, a source from which the content came (e.g., ESPN), and an opposing team whether or not depicted in the segment (e.g., vs. Chargers). Of course, the tags 804 depicted in FIG. 8 are merely examples, and numerous additional or alternative tags may be used, depending on the subject matter depicted in the segments and when/how the segments are to be provided to individual users.

The tags 804 may include tags provided with the incoming content, tags generated automatically (e.g., by the tag extraction module 702), tags generated manually (e.g., by the human input tag module 704), and/or tags generated semi-automatically using both of the tag extraction module 702 and the human input tag module 704. In some examples, the stats 802 may be generated from the tags 804 or may be obtained from another source. For instance, the stats 802 may be obtained from a website or web service such as Gametracker, by Yahoo!Corporation. In some examples, the stats 802 may be configured to be presented to the user along with the segment on a display of the user's client device, while the tags 804 may be used to determine what content is to be served to the user's client device but is not configured to be presented to the user along with the segment. That is, the stats 802 are intended for viewing or other consumption by the user, while the tags 804 may form a basis upon which segments are identified and prioritized for transmission and/or consumption by individual users.

In some examples, each tag may include a score indicative of relevance of the tag to a segment, specificity of the tag to the segment (e.g., is the tag a general term such as "running back" that may be applicable to a large number of segments or a more specific term such as a specific athlete's name), historical importance of the tag to users (e.g., how has this tag been ranked in the past as applied to other segments), number of times the tag was associated with this segment (e.g., if the segment has been tagged by multiple manual and/or automatic sources), etc. In the illustrated example, higher scores are better (i.e., more relevant, more specific, more important, more frequent, etc.) than lower scores. For instance, in FIG. 8, the tag Marshawn Lynch has a tag score of 3 because it is very relevant (corresponding to an athlete depicted in the segment) and very specific (corresponding to an individual athlete as opposed to a class of athletes). Conversely, the term running back has a tag score of 1, because it is more general and is of less historical importance to users.

In some examples, the tags 804 may include a fantasy score tag, which may be usable to designate a number of fantasy points attributable to one or more events depicted or described in the segment. If included, the fantasy score tag may be populated with an absolute number of points attributable to one or more events in the clip (e.g., 6 points) or may serve as a place holder to receive to receive a score specific to a particular user based on the fantasy sports platform(s) in which the user participates. For instance, the score may be inserted at the time of tagging, when the segment is transmitted to a user's client device, when the segment is added to a queue for transmission to the user's client device, etc. Additionally, the fantasy score may be calculated and populated directly by the interleaver service, or may be scraped from the one or more fantasy sports platforms that the user participates in (e.g., by the interleaver service 114 or the interleaver client application 342).

The tag scores may be used in combination with user preferences or weights in determining which segments to serve to a particular user and when. By way of example and not limitation, if client device's buffer 344 is relatively full, only segments with high tag scores may be served.

While in this and other examples the statistics and/or tags are shown as being assigned to and stored with the segments in the content store 314 in advance, in other instances, the tags may be assigned and/or appended to the segments at other times, such as when the segments are placed in the content queues 332 or when they are transmitted to the client devices 118. This may be the case when, for example, there is a reason to tag a segment differently for different users (e.g., the segment is relevant to different users for different reasons, different users are entitled to different fantasy points for the segment, etc.). In still other examples, some tags (e.g., tags describing subjects or events in the segment) may be stored in association with the segments in the content store 314, while other tags (e.g., fantasy points attributable to one or more events in the segments) may be appended to the segments when the segments are placed in a content queue for a specific user or when the segment is transmitted to the client device of the specific user.

Example Subscriber Profiles

Figure 9:
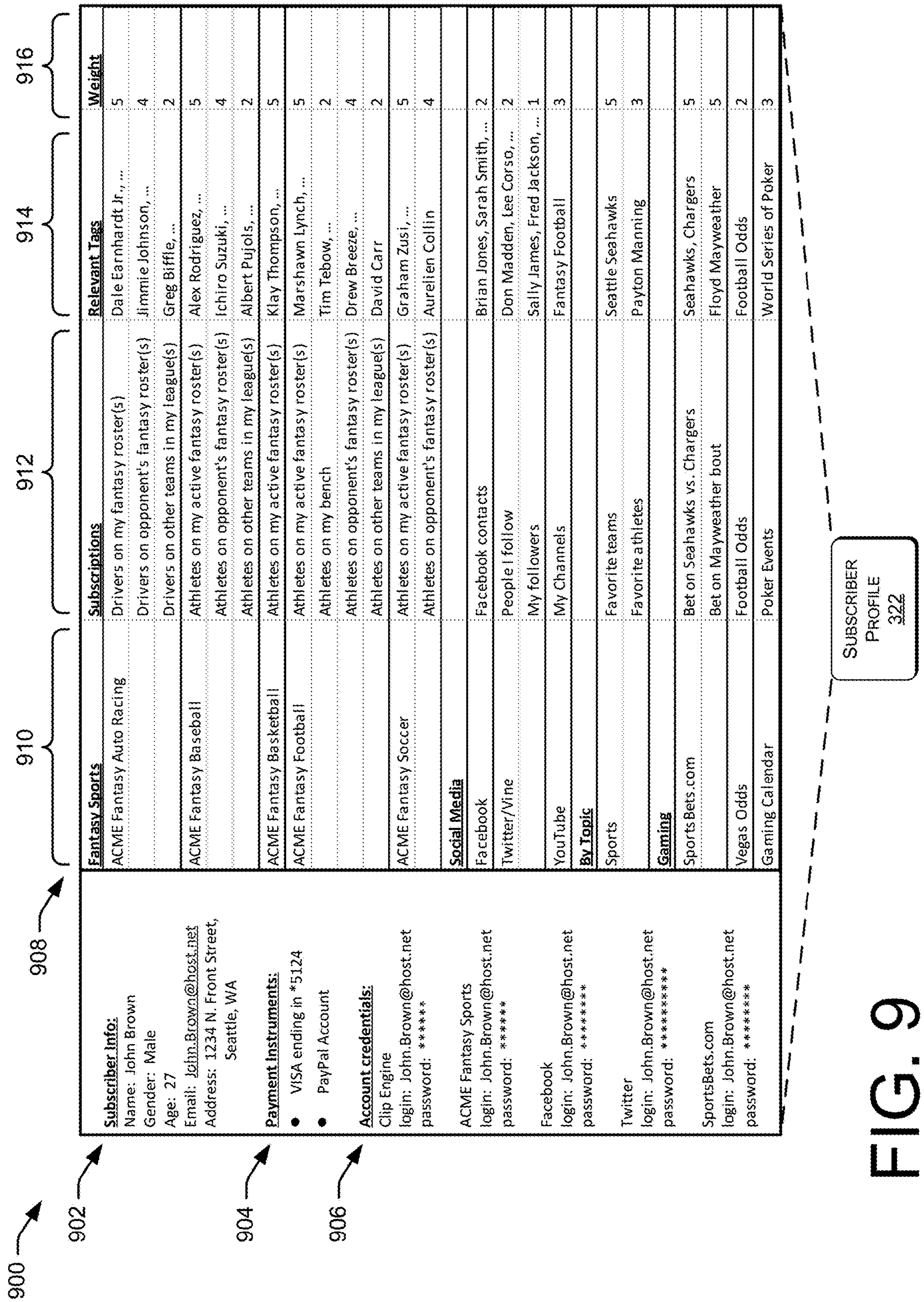
FIG. 9 is a table representing an example subscriber profile.

FIG. 9 is a schematic diagram illustrating details of an example subscriber profile 322. Generally, each user of the interleaver service 114 has a corresponding subscriber profile. The subscriber profile 322 may be stored as a table 900 or other data structure in the subscription store 324 or elsewhere in memory 304 of or accessible to the interleaver service 114. In some examples, table 900 (or portions of the table, or information from or based upon the table) may be presented in a user interface for viewing and/or editing by the user and/or administrators of the interleaver service 114. In operation, the interleaver service 114 may compare and/or contrast information for a particular user contained in the subscriber profile 322 and/or table 900 with tagging information contained in one or more tagged segments 800. In one aspect, the interleaver service 114 may determine if athlete, team or other tagging information in any tagged segment 800 is relevant with respect to fantasy athlete/fantasy team and/or other information in a user's subscriber profile. Based on that relevance, the segment 800 may be sent (with or without actual tagging information) to the user's client device. Accordingly, each user may receive custom content 116 that includes audio/video segments depicting athletes performing in a manner that has relevance to the user's fantasy team and/or the user's other interests, while not receiving other segments having less or no relevance to the user's fantasy team.

The subscriber profile 322 of each user includes subscriber information 902 about the user, such as name, contact information (e.g., email address, phone number, physical address, etc.), demographic information (e.g., gender, age, etc.), socioeconomic data (e.g., marital status, income level, family members, etc.), and the like. The subscriber information 902 may be provided by the user, such as at the time of account creation, during installation or set up of the interleaver client application 342, or during use of the interleaver service 114 (e.g., based on click stream activity, based on user responses to questions or prompts, based on user interaction with presented content or ads, or based on annotations, comments, or messages the user provides, etc.). Additionally or alternatively, at least a portion of the subscriber information 902 may be derived or inferred by the interleaver system 114 based on, for example, a type or types of client device(s) the user uses to access the interleaver service, an internet protocol address of the device(s) the user uses to access the interleaver service, times of day at which the user accesses the interleaver service, or other contextual information.

In some examples, subscriber profile 332 may also include payment information 904, such as credit card numbers, bank accounts, payment accounts (e.g., PayPal, Square Wallet, Google Wallet, etc.), Bitcoin, or other payment instruments or modes. The payment information 904 may be used, for example, to allow users to pay for access to the interleaver service 114, to pay for access to certain content provided by the interleaver service 114 (e.g., proprietary content of one or more content sources), to pay for in-app purchases, or any other financial transactions related to the interleaver service 114. The payment information 904 may additionally or alternatively allow users to receive payment from the interleaver service 114 and/or other users of the interleaver service For instance, user's may be able to earn money or other compensation for tagging segments via a crowd sourcing platform, for providing annotations or comments on segments, and/or for providing content to the interleaver service 114 for distribution to other users. The amount of compensation earned by the users may be based at least in part on the quantity and/or quality of the tags, annotations or comments, and/or content provided by the user.

In some examples, the interleaver service 114 includes a complete fantasy sports platform, including infrastructure to support creation and operation of fantasy sports leagues and teams in which users can participate. That is, users can join one or more fantasy sports leagues and/or teams administered by the interleaver service. Additionally or alternatively, the interleaver service 114 may work in conjunction with one or more other accounts of the user, such as other fantasy sports accounts, social networks, gaming accounts, or the like. In that case, the interleaver service 114 may provide custom content related to and/or based at least in part upon the other accounts of the user. However, the interleaver service 114 may not provide the underlying functionality of the other accounts. In the fantasy sports context, the interleaver service 114 may serve custom content including segments depicting events related to one or more of the user's fantasy sports accounts. For instance, the interleaver service 114 may present segments depicting athletes on one or more of the user's fantasy sports rosters, athletes on an opponent's fantasy sports roster, athletes on a roster of other members of the user's fantasy league(s), events resulting in fantasy points being awarded or decremented to the user, or the like. In other contexts, the interleaver service 114 may serve the user one or more segments including information from, or based at least in part on, the one or more other accounts. For instance, the interleaver service 114 may present segments depicting subject matter (e.g., video, audio, images, text, etc.) from the one or social networking accounts (e.g., Facebook, Twitter, Instagram, etc.), one or more gaming accounts (e.g., a sports book account, a gambling account, a game, etc.), a media account (e.g., Youtube, Netflix, Hulu, etc.), or other accounts of the user.

The subscriber profile 332 also includes account credentials 906 for the interleaver service 114 (the user facing portion of the interleaver service is named Clip Engine in this example). The account credentials 906 may additionally or alternatively include account credentials for one or more other accounts of the user. In the illustrated example, the account credentials 906 include credentials for fantasy sports services other than Clip Engine of which the user is a member (ACME Fantasy Sports in this example). In other examples, the user may have accounts with other fantasy sports services, in which case account credentials for those other accounts may be included as well. In this example, the account credentials 906 further include credentials for social media accounts of the user (Facebook and Twitter in this example), a gaming account of the user (SportsBets.com in this example), and potentially other accounts (not shown). The account credentials for each account may comprise any credentials needed to log in to or otherwise access the account or service. By way of example and not limitation, the account credentials for each account may comprise a login name, email address, password, pin, digital certificate, watermark, hash, biometric information (e.g., finger print, retinal scan, facial recognition, voice recognition, etc.), or the like.

By including the account credentials of the one or more other accounts, the interleaver service 114 is able to access the other accounts to obtain information usable to, among other things, provide the user with the custom content. For instance, the interleaver service 114 may access other fantasy sports accounts to obtain information about the user's fantasy league(s), team(s), roster(s), fantasy points and/or rules of how fantasy points are awarded, identify which fantasy athletes are active and which are benched, and the like. In other examples, the interleaver service 114 may access other social media accounts to identify social media contacts of the user, determine topics of interest to the user and/or the user's social connections, and in some instances to obtain content (e.g., photos, videos, etc.) from the social media accounts. In still other examples, the interleaver service 114 may access one or more gaming accounts of the user to determine outcomes (e.g., sporting events, elections, etc.) on which the user has placed bets, people against whom the user has bet, games the user has played, etc. In some examples, the interleaver service 114 may access the one or more other accounts by calling an application programming interface (API) of the service to which the account belongs. The interleaver service 114 may use information obtained by accessing the other accounts and/or other information to determine which content segments in which the user is likely to be most interested and, therefore, which segments to include in the user's custom content stream. The interleaver service 114 may additionally or alternatively use this information to identify ads to serve to the user, an order in which to serve the content segments and/or ads, or for other purposes.

For instance, the subscriber profile 322 may include subscription information 908 defining various topics of interest to the user based on the information obtained from the accounts. The subscription information 908 is shown in tabular form for ease of explanation, but in other examples may be stored and/or presented in any form. In the illustrated example, the subscription information includes an entry 910 for each account (or sub account thereof) for which account credentials are provided. Entries 910 may also be included for other items such as "topics" of interest, websites or services that don't require an account or credentials, or any other item that is usable to identify topics that may be of interest to the user.

In the illustrated example, the entries 910 include four entries corresponding to sub accounts of the ACME Fantasy Sports account (namely ACME Fantasy Auto Racing, ACME Fantasy Baseball, ACME Fantasy Basketball, ACME Fantasy Football, and ACME Fantasy Soccer). The entries 910 also include entries for social media accounts (namely Facebook, Twitter/Vine, and YouTube) and a gaming account (namely SportsBets.com). The entries 910 also include an entry for a topic of interest to the user (namely "Sports") and several other sites or services that do not require an account to access (namely Vegas Odds and Gaming Calendar).

For each of the entries 910 the subscriber profile 322 includes one or more subscriptions 912 about which the user desires to receive content segments. For instance, the entry 910 entitled "ACME Fantasy Auto Racing" includes subscriptions 912 to "Drivers on my fantasy roster(s)," "Driver(s) on opponent's fantasy roster(s)," and "Drivers on other teams in my league(s)." As another example, the social media entry 910 for "Facebook" includes subscriptions 912 to "Facebook contacts." As yet another example, the entry 910 for the topic "Sports" includes subscriptions 912 to "Favorite Teams" and "Favorite Athletes." In some examples, the subscriptions may be predefined by the respective services to which the entries correspond. In some examples, the user may select the particular subscriptions he or she desires for each service (e.g., using one of the interfaces described below for managing content). In some examples, one or more default subscriptions may be set for a service, which may be modified by the user. In still other examples, the interleaver service may set one or more subscriptions based on information in the user's subscriber profile, the user's content viewing history (e.g., which segments did the user request, which segments did the user watch, skip or replay, etc.). The subscriptions 912 may be static (meaning that they remain constant over time) or they may be dynamic (meaning that they are temporal in nature and change over time or based on one or more other factors). An example of a dynamic subscription is the subscription to "Drivers on my fantasy roster(s)" which may change as the user updates his or her roster(s). Another example of a dynamic subscription is the subscription to "Drivers on my opponent's fantasy roster(s)" because the user's opponent will change from week to week, race to race, or the like.

For each subscription 912, the interleaver service 114 may determine one or more tags 914 that are relevant to the subscription. For instance, the first subscription in the illustrated example is for "Drivers on my fantasy roster(s)." The interleaver service 114 may determine (e.g., by querying the user's ACME Fantasy Sports account) the drivers on the user's fantasy roster. In the illustrated example, the user has Dale Earnhardt Jr., among other drivers, on his or her roster. Thus, "Dale Earnhardt Jr." may be added as a tag to the user's subscriber profile 322, potentially along with one or more other related tags, such as "Dale," "Dale Jr.," "Earnhardt," "Jr.," "No. 88," etc. Similarly, the interleaver service 114 may determine tags relevant to the other subscriptions of the user's subscriber profile 322. Example tags for each subscription are given in the column of tags 914. In some examples, these tags 914 are the terms that the interleaver service 114 uses to match to tags of content segments to identify segments that are relevant to or would otherwise be of interest to the particular user.

As discussed above, certain subscriptions are dynamic, meaning that they change over time or in response to events. In some examples, the tags 914 associated with a dynamic subscription may change over time. For instance, a user's fantasy opponent typically changes periodically (e.g., daily, weekly, etc.). In that case, the particular tags associated with the subscription "Athletes on my opponent's fantasy roster" may change periodically to match the user's changing opponents.

In some examples, the tags 914 may be assigned weights 916. In the example of FIG. 9, the weights are assigned to each category of tags. That is, in the illustrated example, all tags associated with a particular subscription are assigned a same weight. For instance, all tags associated with "Athletes on my active fantasy roster(s)" are assigned a weight of 5, while all tags associated with "Athletes on my bench" are assigned a weight of 2. However, in other examples, each individual tag may be assigned its own weight, regardless of the subscription that the tag is associated with.

The weights 916 may be automatically assigned by the interleaver service 114, may be default settings, may be manually set by the user (as described further below), and/or may be inferred by the interleaver service 114. For example, some or all of the weights 916 may be inferred based on other settings made by the user, the user's interaction with the interleaver service 114, segments the user has requested, segments that the user has skipped, etc.

As discussed above, certain subscriptions are dynamic, meaning that they change over time or in response to events. In some examples, the weight 916 associated with a dynamic subscription may change over time. For instance, a weight of a tag associated with a betting service may change depending on a dollar value of a user's bet placed with the service. In that case, if a user places a relatively small bet (e.g., below a preset or user-specific threshold amount) the weight may be relatively low (e.g., a weight of 2 or 3), whereas if the user places a larger bet (e.g., greater than or equal to the present or user-specific threshold) then the weight may be higher (e.g., 4 or 5). In some examples, the weight may be proportional to the size of a bet, the number of bets placed with the betting service, or any number of other factors. As another example of a weight changing over time, a weight of tags associated with a particular fantasy sports subscription (e.g., football, baseball, soccer, etc.) may be higher when the particular sport is currently in season than when it is out of season. For instance, a weight associated with a fantasy football subscription may be higher during football season than during the offseason.

The weights 916 are one factor that may be used to prioritize the segments that are provided to the user in the user's custom content stream. For instance, the interleaver service 114 may prioritize segments with tags that the user's subscriber profile ranks higher over segments with tags that the user's subscriber profile ranks lower. However, other factors may also contribute to the selection of segments for presentation to the user, such as freshness of the segments, variety of segments, number of available segments that have not yet been viewed by the user, etc.

Example User Interfaces

FIGS. 10-15 illustrate schematic diagrams of example user interfaces (UIs) that may be used by a user to interact with a customized content service, such as the interleaver service 114. However, the interleaver service 114 may employ other UIs and/or the illustrated example UIs may be used with other systems.

FIG. 10 is a schematic diagram of an example user interface 1000 of a client application for consuming custom content, such as a custom content stream 116 from the interleaver service 114. In the example shown, the user interface may appear on a client device, such as the client devices 118(1) through 118(N) of FIG. 1. In the example of FIG. 10, a Watch Now tab 1002 has been selected by a user, thereby invoking the user interface 1000 from among a plurality of other user interfaces, each of which may be associated with tabs or other user interface tools.

In the example shown, a clip 1004 is playing on the screen, showing an athlete performing action that earned fantasy points for the user's fantasy team. The athlete may be highlighted or indicated by a halo, shading or other feature. A headline 1006 may be used to show a description of the clip, which may be based on a perspective of the user's fantasy team. Thus, the headline "Marshawn Lynch—8 yard rushing touchdown" alerts the user to the reason that fantasy points were awarded. The number of fantasy points earned by the user's fantasy team in the clip may be indicated by a message 1008, which in the example shown is located in the upper right corner of the clip.

The user may swipe with a finger across the clip, as it plays or concludes, to move forward to a later clip, or backward to an earlier clip. A clip in mid-play may be stopped and earlier or later clips invoked. The earlier and later clips may be located in a buffer accessed by the user interface 1000, or may be downloaded from the interleaver 114 or other location such as servers or the "cloud." Skip forward and skip backward controls 1010, 1012 allow a user to move to clips in either end of a buffer, queue or other content source.

Rating indicators 1014, 1016 allow the user to rate the clip favorably or unfavorably. Such ratings may provide input to an algorithm (e.g., artificial intelligence) that govern which clips are provided to the user and to the user's queue. A "Why am I seeing this clip?" link 1018 allows the user to request information about why the clip is being provided. Possible reasons include that the clip involves fantasy points for the user's fantasy team, an opponent's fantasy team, a possible draft prospect available to the user, a favorite athlete of the user, etc.

A comment box 1020 is adapted to provide selection indicators such as: "View Comments" or "Add Comment." In the example shown, "Add Comment" is selected, allowing the user to provide a comment available to a fantasy opponent, others in the user's fantasy league, others in the user's contacts, or to the general public that may view the clip to which the comment was applied. The comments may be text, audio, audio/video or may include an attached file. Additionally, selection of the "View Comments" selector allows users to view comments left specifically to them by other users, or to view comments left by others for general consumption.

A client clip queue 1022 provides a view of clips that are available for viewing on the client device. The clips may be available locally in a buffer, or available remotely for download. The clip queue 1022 shows three clips, and additional clips may be available if the user swipes up or down. The clips are labeled in an order, i.e., "Next clip" and "$2^{nd}$ a clip," etc. Tabs 1024 on each clip may be utilized by a user to rearrange an order of the clips in the queue 1022. An "X" 1026 or other tool may receive user input to remove a specific clip from the queue. The clip queue 1022 may provide links to one or more clips in response to a user query or in response to action of athletes in real life games that have relevance to a user's fantasy team and/or other interests of the user.

A search box 1028 allows a user to type a query including one or more search terms, such as an athlete's name, a type of play (e.g., touchdown, homerun, etc.), key word/tag, fantasy point type or other factors. The query may be searched by a search engine that is located on the client, and searches content already downloaded or known to the client. Alternatively, the query may be searched by a search engine that is located remotely, such as on the interleaver 114. The search may return results that are not located on the client, and which may be downloaded to the client. The results of the search may be ordered according to relevance and/or recentness, or other factors. In some examples, the user indicates factors used to order the search results.

A number of tools may be provided by the user interface 1000. In the example of FIG. 10, a half-speed or slow tool 1030 allows a user to slow the playback of a clip. A replay tool 1032 allows the user to replay an entire clip, such as a clip currently in playback mode. A rewind tool 1034 allows the user to play video of a clip in reverse direction. A pause tool 1036 allows the user to stop play of a clip. A fast forward tool 1038 allows the user to play a clip in fast motion (e.g., to play the clip at double speed). A full screen tool 1040 allows the user to play a clip using the full screen of a device. Frequency, the playback may orient the clip to play in "landscape" mode, which more nearly approximates broadcast and cable TV.

FIG. 11 is a schematic diagram of an example user interface 1100 that presents fantasy sports scores and other fantasy sports information to a user. In the example shown, the user interface 1100 may be displayed on a client device, such as the client devices 118(1) through 118(N) of FIG. 1. In the example of FIG. 11, a Fantasy Scores tab 1102 has been selected by a user, thereby invoking the user interface 1100 from among a plurality of other user interfaces, each of which may be associated with tabs or other user interface tools.

In the example shown, the user may select This Week's Games 1104 to show fantasy games to be played in the current week (which may be based on real-life games also played in the current week). In the example of FIG. 4, the user may swipe This Week's Games 1104 left or right to reveal prior or future games, respectively. The week's games (e.g., This Week's Games 1104) may be divided to show In Progress Games 1106 and Scheduled Games 1108. In the example shown, In Progress Games 1106 may include several fantasy games in which the user is involved, including one or more games from each of one or more sports, including car racing 1110 (e.g., Shock Racing—Brickyard 400), baseball 1112 (The Shredders vs. Green Guys) and football 1114 (Dragons vs. Lightning). Later in the week, the user will be involved in the fantasy basketball game 1116 involving the fantasy teams Sasquatch and Yeti. If the user scrolls down (e.g., with a swipe of a finger) on the user interface 1100, it may be revealed that scheduled games also include fantasy games based on other sports, such as soccer, which may be similarly shown by the user interface. Any of the This Week's Games 1104 (e.g., Dragons vs. Lightning) may be selected and expanded to view a detailed scoring report, such as seen in the example of FIG. 4.

The user interface 1100 may provide a League Play icon 1118, which may reconfigure the user interface to show a plurality of fantasy leagues (if applicable) in which the user is active and allows the user to view scores of other fantasy games in the user's fantasy league(s). Thus, the user may be active in one or more fantasy football, baseball, car racing, basketball, soccer or other sports leagues, which would be displayed in response to League Play icon 1118. By selecting one of the leagues displayed, the user interface 1100 may display one or more of past games, in progress games and scheduled games. By selecting of the games displayed, the overall score and details of the scoring of individual athletes may be displayed.

The user interface 1100 may provide a manage rosters icon 1120, which may reconfigure the user interface to show a plurality of fantasy teams (if applicable) of which the user is the owner. Thus, the user may be the "owner" of one or more fantasy football, baseball, car racing, basketball, soccer or other sports teams, which would be displayed in response to Manage Rosters icon 1120.

The Manage Rosters icon 1120 may allow a user to manage rosters of one or more fantasy teams of which the user is the owner, and to thereby add or remove athletes from the user's fantasy roster(s), field athletes, bench athletes, trade athletes and to otherwise manage the user's fantasy team(s). The roster or list of athletes of a fantasy team may be maintained by a provider of the user interface 1100 or another website. Thus, while the website "ClipEngine" (shown at the top of the user interface 1100) may provide portions of the user interface, other websites may provide a user interface invoke by the Manage Rosters icon 1120 that allows the user to manage one or more fantasy teams. Thus, the user may have teams hosted by one or more websites, which may be accessed by icon 1120.

A Refresh icon 1122 may be configured to refresh any displayed information, such as rosters of athletes, scores of athletes, scores of fantasy or real teams, etc. Alternatively, such information may be updated or refreshed automatically by the user interface 1100.

In the example shown in FIG. 11, the user has selected the football game 1114 between the Dragons and the Lightning. As a result, the display has expanded to show the fielded athletes. The user may click on a link 1124 to reveal benched athletes, i.e., athletes on the user's team but not fielded for play and eligible to earn points for the user. In the example shown, a projected score column 1126 shows a projected and/or predicted score 1128 for each athlete in column. The athletes may be associated with positions 1130 (e.g., quarterback, pitcher, driver, etc.). An actual score column 1132 shows an actual number of fantasy points that each athlete has scored at this point in play.

The projected score 1128 may be displayed for each of the athletes before and/or during actual play of the real-life game(s). The score may be based at least in part on past or expected performance of each athlete in list 1126. Before real-life play begins, the projected scores for each athlete may be totaled, to result in an original projected score 1134 or projected score of the user's fantasy team. In the example shown the Dragons have an original projected score of 208 points. Similarly, the Lightning have an original projected score of 217. Accordingly, based on a projection by one or more experts or statisticians indicates that the projected or predicted end game score of the Dragons vs. Lightning fantasy football game will be 208 to 217.

In some examples, an athlete's name, the athlete's actual score, or other area may be a clickable link, allowing a user request and view the sequence of plays (e.g., as a list or as sequential video clips) that resulted in the point total. Thus, a user may review the plays that resulted in fantasy point scores for the user's (or other) fantasy team.

After real-life play begins, a current actual score of fantasy points 1132 is shown for each athlete, resulting in a current actual team score of fantasy points 1136 for the user's fantasy team. Thus, as real-life play develops, athletes will score fantasy points that are tabulated at column 1132 and totaled in the summation 1136. Similarly, current actual scores for athletes on a fantasy team of the user's opponent are displayed. In the example shown, the listing of the listing of the football game 1114 also shows the current actual score of the fantasy football game.

As real-life play develops, athletes score fantasy points as a result of their efforts in their respective games. Accordingly, the listing of actual athlete fantasy point scores 1132 may be updated as play develops. Also, as some athletes have above and below average games, the originally projected score listing 1126 may become a poor estimate for their actual fantasy points scored. Accordingly, the projected athlete fantasy point score column 426 may be updated in real time as play develops. Thus, while projected fantasy point scores for each athlete may have appeared reasonable prior to play, as real-life games unfold, the projection of fantasy point scores may change.

Updating the projected total of fantasy points for each athlete, and for each team, aids in allowing team owners to assess if they are winning or losing a fantasy game. In an example, if one fantasy team owner has more athletes playing in early Sunday NFL games, that team may appear to be wining, while the opposing team, having more athletes scheduled to play in later games, is actually in a better position.

Accordingly, each minute that passes during regulation time wherein an athlete does not score a fantasy point makes it more likely that the athlete's final fantasy point score will be similar to a current fantasy point total. In contrast, the more fantasy points that a athlete scores early in the game may make it more likely that a final score will be high. An athlete's fantasy point score may be four times the athlete's score at the end of the first quarter, twice the halftime total, and one and a third the total at the end of three quarters of play. Any of these estimates, which in some examples may be updated with greater granularity (e.g., on a minute by minute basis) may prove to be more accurate than an estimate that does not take into consideration play during the game.

In one specific example, before real-life play started, the athlete Payton Manning was projected to score 45 fantasy points. However, the projected fantasy point score for Payton Manning was reduced as the game was played and it appeared unlikely he would score 45 fantasy points. Ultimately, the projection was reduced to 40 points as the game drew to a close because Manning's point total was 40 points at that time.

In another specific example, the wide receiver Moss was originally projected to receive 17 fantasy points, but has already scored 22 points in an on-going game. Accordingly, the revised projected score for Moss is 31 fantasy points. This figure is more accurate, in view of the points already scored.

In another specific example, the running back Thompson was originally projected to receive 15 fantasy points. However, failure to score fantasy points in earlier parts of the actual game have resulted in a reduction of his projected fantasy point score to 10.

In another specific example, the game involving tight end Gonzalez has not yet begun, and his fantasy point projection remains unchanged.

In another specific example, the wide or tight end Holmes was projected to score 14 fantasy points, and his score of 11 fantasy points during a portion of his game may result in reaffirmation of the original 14 point estimate.

Thus, as real-life games are played, the projected totals of each athlete's fantasy point score may be changed in a manner that considers fantasy points scored in the game and time remaining in the game.

Once a game is final, an athlete's projected fantasy score may be struck-though or removed, and replaced with the athlete's actual fantasy score in the game, thereby increasing the accuracy of the current projected fantasy score for the user's fantasy team.

The "Message Opponent" field 1138 allows the user to send a message to an opponent including text, audio, images, video, and/or an attached file. Thus, the Message Opponent field 1138 may be used for two-way text, audio, audio/video communication with opponents in a particular game or the user's league.

FIG. 12 is a schematic diagram of an example user interface 1200 that allows a user to manage and select content to be provided to the user. In the example shown, the user interface 1200 may be presented to a user by a central office or the interleaver service 114 (e.g., as seen in FIG. 1) to obtain subscription information from users, i.e., for allowing users to select, request and/or indicate desired content sources. In the context of the examples of FIGS. 1-3, the user interface 1200 may be configured to designate, select, request and/or otherwise manage custom content, such as a custom content stream 116 from the interleaver service 114. Using the information received from the user interface 1200, an interleaver 114 or other central office or server may access or scrape a user's existing fantasy sports accounts to obtain league, team, athlete, etc., information. In some examples, a user can indicate one or more websites (e.g., Yahoo!) that are hosting a user's fantasy sports team(s) related to one or more fantasy sports and/or leagues. Additionally, the user may indicate content in addition to fantasy sports clips that the user would like to have in the custom content provided to the user. Such clips, which may not be associated with the gain or loss of fantasy points, may provide entertainment to the user, such as at times when new and/or previously unseen fantasy-point based content is not currently available. Accordingly, the interleaver service 114 may provide and/or serve video clips and data unrelated to fantasy sports teams. The user interface 500 may be displayed on a client device, such as the client devices 118(1) through 118(N) of FIG. 1.

The interleaver service 114 or other central office and/or website may supplement existing fantasy sports outlets (e.g., Yahoo! or ESPN, etc.), or may include an integrated fantasy sports platform that may provide known fantasy information to users in addition to providing the innovations described herein. The user interface 500 may provide the user with a means to access the integrated fantasy sports platform as well as a means to access other fantasy sports platforms available to users. Accordingly, users can participate in multiple fantasy sports platforms, either using present technology or augmented by the techniques described herein.

In the example shown, a Manage Content tab 1202 has been selected by a user, thereby invoking the user interface 1200 from among a plurality of other user interfaces, each of which may be associated with tabs or other user interface tools. A search box 1204 is displayed, which allows the user to search for the user's fantasy teams, leagues, favorite athletes, content of interest, etc.

A fantasy sports block 1206 may be displayed. The fantasy sports block may indicate a plurality of fantasy sports platforms (e.g., Yahoo!, ESPN, etc.) that host fantasy sports competitions, leagues, teams, etc. In the example shown, ACME Fantasy Sports is such a host. ACME Fantasy Sports may host the user's fantasy auto racing team, "Shock Racing," as well as the user's fantasy baseball team, "The Shredders," and others of the user's fantasy teams in sports including basketball, football (two teams), etc. The user may add more fantasy accounts to thereby add more fantasy teams. Adding a fantasy account may involve providing the user interface with a fantasy sports provider, a user name and password to an account. Using this information, the interleaver service 114 or other server or provider may access the account and copy or scrap the information within the account. Such information, including league information, team name, athletes, etc., may be used to provide the user with appropriate clips that correspond with the user's fantasy team. By adding all of the user's fantasy sports accounts with different providers and/or by indicating the user's fantasy team(s), the user provides the user interface 1200 with information that assists the interleaver 114 to provide the user with custom content appropriate to the user. The block 1206 may show only the fantasy sports in which the user is participating or which users commonly participate, and other fantasy sports and/or other providers may be added to block 1206, such as by operation of the search box 1204. Thus, the user may have, or want to add, account or team information to one or more of the other fantasy sports platforms, such as CBS Fantasy Sports, ESPN Fantasy Sports, etc.

Custom content may be provided to the user based not only on the user's fantasy team(s), but on other topics of interest to the user. Such content may be provided as desired, such as between clips that include fantasy point information of interest to the user. Topics block 1208 in the user interface 1200 shows example or representative categories of information that the user may want to select. In the example shown, the user has selected the Seattle Seahawks and athlete Payton Manner. Thus, Topics block 1208 allows the user to select content from among a very broad range of topics. In the example of user interface 1200, the user may select content from such diverse topics a entertainment (e.g., popular culture), events (e.g., news), sports and others. Thus, in the example of FIG. 12, the user may receive a wide range of custom content, which may include video clips and other information associated with a number of fantasy teams, as well as video clips and other information related to the Seattle Seahawks, Payton Manning, etc. Video clips and other content, such as cheerleaders and commentators, may also be selected.

Cheerleaders and commentators may provide video clips which may be invoked upon a fantasy event (e.g., a touchdown by a particular team) or may be invoked due to lack of fantasy sport clips during a particular period of time. Commentators (e.g., "color" commentators) may be individuals from the athletic community or other communities, such as comedy, show business, etc. If the user is less interested in fantasy sports than the content provided by such commentators, the user may select a number of commentators using the user interface 1200.

A social media block 1210 may allow the user to communicate with others, and to share information and/or clips related to fantasy sports or other content, such as content received from the interleaver 114.

A gaming block 1212 may allow users to communicate with gaming websites and to obtain video clips that are related to wagers made on those sites of through other venues (e.g., private parties or local bookmakers). The user may games the user is wagering on (e.g., "My Bets"), and may enter other information at "Odds," "events" and "more options." Thus, while a user associated with fantasy sports may want to see video clips related to athletes on the user's fantasy team, a user that is alternatively or additionally involved in gaming may want to see video clips related to games on which the user has wagered. Thus, the user may see clips that impact the scores of games on which bets were placed, which may be interleaved with fantasy team related clips.

In some examples, the user interface 1200 may also allow a user to select content sources or providers (e.g., ESPN, NFL Network, Comcast Cable, Direct TV, HBO, etc.) from which they want to or are entitled to receive content (i.e., sources from which the custom content may be assembled). In some examples, certain content sources may be free content sources available to all users, while other content sources may be premium content sources that are available for an additional fee. In some instances, a user may be entitled to premium content based upon one or more separate subscriptions to the respective premium content source.

Figure 13:
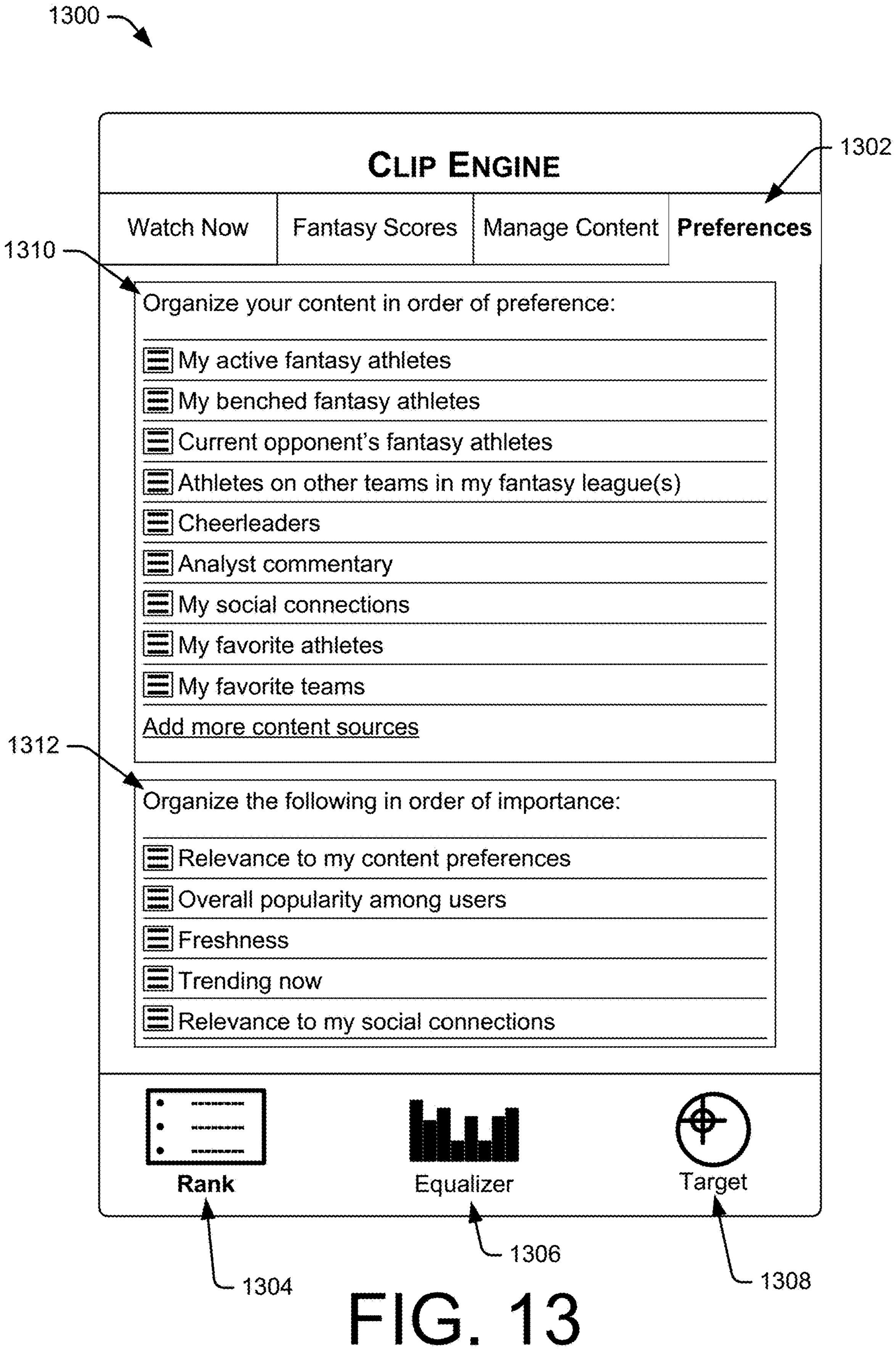
FIG. 13 is a schematic diagram showing an example user interface of a client application usable to set preferences for various types and sources of content by setting a relative rank of the types and sources of content.
Figure 14:
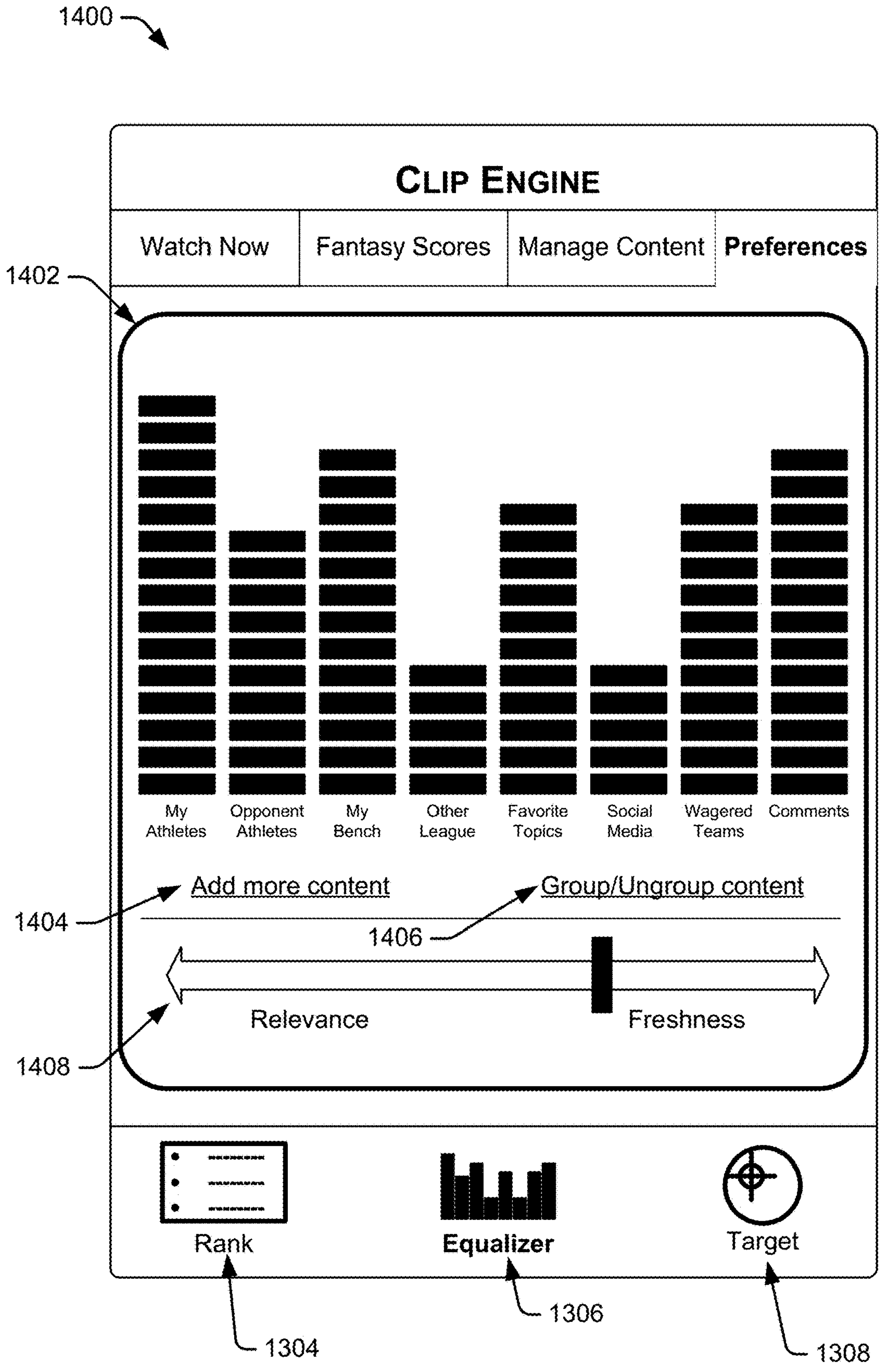
FIG. 14 is a schematic diagram showing other examples user interface of a client application usable to set preferences for various types and sources of content by setting an equalizer to weight the various types and sources of content.
Figure 15:
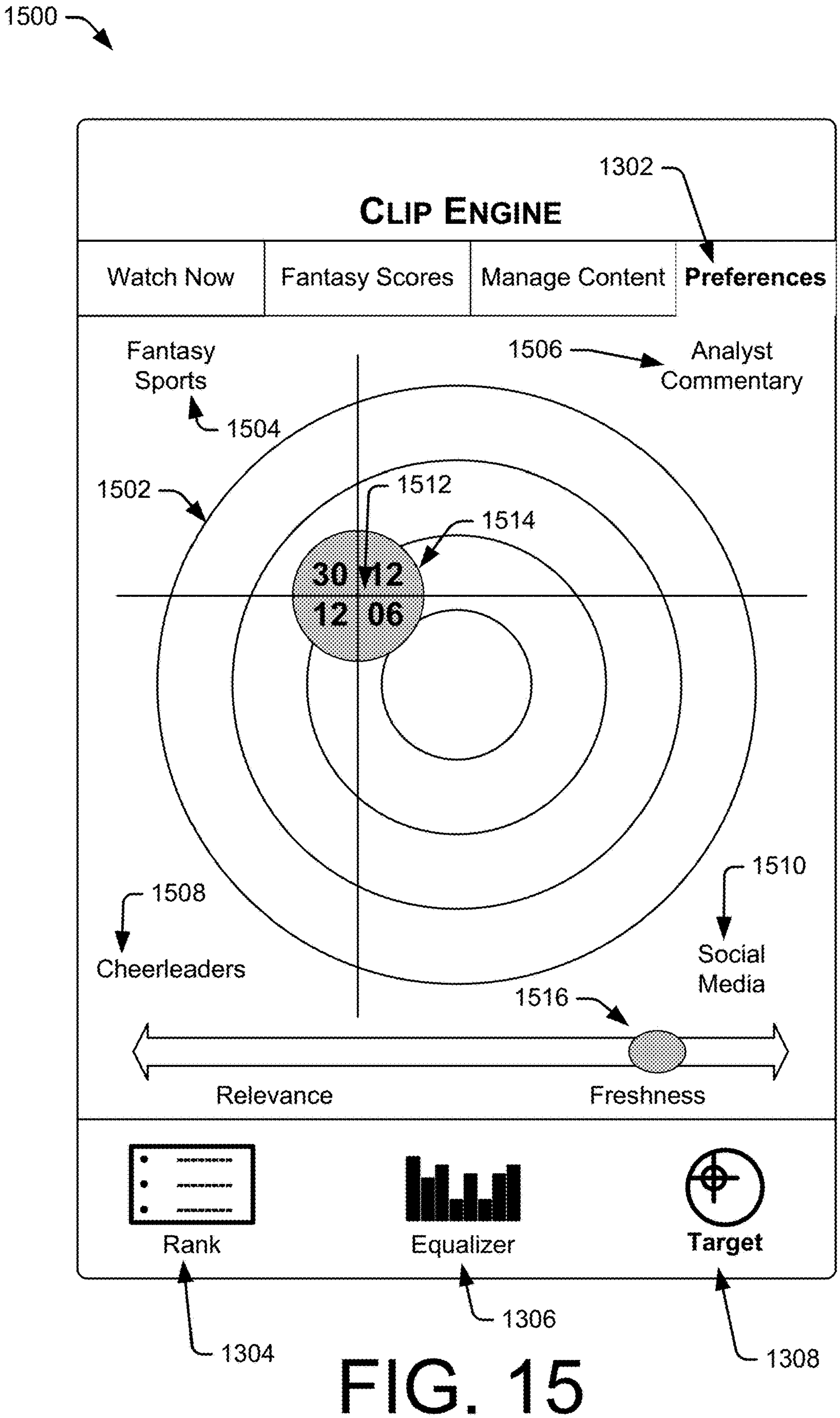
FIG. 15 is a schematic diagram showing yet other examples user interface of a client application usable to set preferences for various types and sources of content by moving a target to weight the various types and sources of content.

FIG. 13 is a schematic diagram of an example user interface 1300, operable on a client application or device, and configured obtain user preferences and relative preferences for various types and sources of content to be sent to the user. In the example shown, a Preferences tab 1302 has been selected by a user, thereby giving the user a choice between a Rank tab 1304, an Equalizer tab 1306 and a Target tab 1308. In the example of FIG. 6, the Rank tab 1304 has been selected by a user, thereby invoking the user interface 1300. The Equalizer user interface 1400 and the Target user interface 1500 are shown in FIGS. 14 and 15, respectively.

The Rank user interface 1300 allows a user to rank categories of content, to thereby assist the interleaver 114 in prioritizing custom content to be transmitted to the user. The arrangement of the content types, from higher priority (top of the list) to lower priority (bottom of the list) indicates a priority of the user for the content sent by the interleaver service 114 or other server or central office. In the example shown, an "Organize content in order of preference:" block 1310 is configured to allow the user to manually arrange a plurality of content types. Thus, the "grip" on the left side of each content type, such as "My active fantasy athletes," can be used to move a content type up or down on the priority list.

A number of representative examples of content types are shown. The first content type, "My active fantasy athletes" corresponds to the "fielded" athletes (i.e., athletes not sitting on the fantasy team bench). Thus, the user's highest priority may be the fielded athletes of the user's fantasy team. A second content type, "My benched fantasy athletes," may be a second priority. Alternatively, the user may want to elevate "Current opponent's fantasy athletes" to the second position. The content type "Athletes on other teams in my fantasy league(s)" allows the user to view clips of athletes that are probably of very high caliber and which are of general interest. The user may also want to manually position "Cheerleaders" and "Analyst commentary" as desired. These content types may include video clips that do not directly relate to the scoring of fantasy points. However, the cheerleader celebration may follow a play that resulted in fantasy points, and the analyst commentary may describe that play. The content type "My social connections" may govern the priority of content that is provided by people or organizations to which the user is connected, such as by Twitter, Facebook or other social services. The user may want to elevate the importance of the content type "My favorite athletes," even though these athletes may be on other user's fantasy teams. Thus, the user may enjoy video clips of favorite athletes, even though their exploits do not result in fantasy point gains. Similarly, the user may enjoy highlight video clips of the user's favorite real life teams, even when they have not fantasy point relevance. The content types shown are representative, and other content sources may be added, substituted or utilized, or provided by the user, the user's league, the interleaver service or other entity.

A block 1312 labeled "Organize the following in order of importance:" allows the user to apply a second hierarchy of inputs to the prioritization of content sent to the user. A number of representative example inputs are shown. In some examples, "Relevance to my content preferences" allows the user to balance what is important to the user (e.g., as discussed with respect to block 614) with other factors, such as the second factor, "Overall popularity among users." Thus, the user may balance the incoming content to include content that may be important to the user's friends. The user may rank "Freshness" higher or lower, depending on preferences. For example, a clip showing an important play may be several hours old, when the user begins to view the user interface 400. Whether such a clip is provided to the user may be based at least in part on how highly the "Freshness" factor is rated, and also on a number of alternative clips available. The "Trending now" factor is another opportunity for the user to determine if the user wants to see more of what is important to the user's fantasy and favorite teams, or if the user wants to branch out and see content of interest to others. Similarly, the factor "Relevance to my social connections" allows the user to adjust how much time is to be spent watching what is important to others.

FIG. 14 is a schematic diagram of an example user interface 1400, operable on a client application or device, and configured obtain user preferences and relative preferences for various types and sources of content to be sent to the user. In the example shown, a Preferences tab 1302 has been selected by a user, thereby giving the user a choice between a Rank tab 1304, an Equalizer tab 1306 and a Target tab 1308. In the example of FIG. 7, the Equalizer tab 1306 has been selected by a user, thereby invoking the user interface 1400.

A block 1402 may display a plurality of vertical bars of different height. The height of each bar represents a priority assigned by the user of a labeled content type relative to other labeled content types. The user may adjust the height of each bar, such as by tapping on it, pulling it or otherwise manipulating it, such as with manual or keypad input. The tallest bar, having the highest priority assigned by the user, represents "My Athletes." Accordingly, content related to athletes on the user's fantasy team is given the highest priority when forming the custom content 116 (e.g., FIGS. 1 and 2) for the user. Thus, if there is an excess of content available or an issue of what content to send first, content related to athletes on the user's fantasy team is given priority.

Secondary priority is given to content related to "My Bench," i.e., the athletes on the bench of the user's fantasy team. Priority may also be given to "Comments," which may include content generated by others, such as those in the user's fantasy league, or may include color commentary from pundits with discussion of athletes in video clips for which fantasy points were awarded points. Alternatively, the pundits may have comments that are related to interests of the user, which may or may not be related to video clips for which fantasy points were awarded.

Other topics may be displayed, such as "Other League," which allows a user with two fantasy teams in two fantasy leagues to assign priority to content related to the second team. "Favorite Topics" allows the user to assign a priority to topics of interest vs. the priority given to other topic expressly listed. "Opponent Athletes" allows the user to assign a relative priority to content related to athletes on a fantasy team of an opponent (e.g., someone within the user's fantasy league).

"Social Media" allows the user to assign a priority to content generated by social media. For example, friends and owners of other fantasy teams may communicate with each other using postings to social media. Such postings may be used to generate content that becomes interwoven into the custom content 116 of the user. While some users may feel that such comments distract from video clips of athletes, other users may participate in fantasy sports simply as a tool to more frequently interact with their friends and may give higher priority to this content source.

"Wagered Teams" provides the user with the opportunity to increase the content related to certain games, teams or athletes on whom the user has made bets. Thus, the user may utilize the interleaver 108 to generate custom content related to the user's gambling.

An "Add more content" link 1404 allows the user to add more content types into the content bar graph. By clicking the link 1404, the user may be presented with a popup interface which allows the user to select one or more content types (e.g., by check boxes or other user interface technique). In on example, by selecting "Add more content" link 1404, the user can add equalizer columns for additional content sources or topics and may specify a preference rating (number of bars) for each column.

If the user adds a number of additional content types, the field may become crowded. The "Group/Ungroup content" link 1406 allows the user to set preferences for groups of related content (e.g., Favorite Athletes, Favorite Teams, and Favorite Plays may all be grouped together as "Favorite Topics"). Alternatively, the user could ungroup the "Favorite Topics" to provide separate preference ratings for each of Favorite Athletes, Favorite Teams, Favorite Plays, or any other favorite topics.

A "Relevance vs. Freshness" slider or device 1408 allows the user to move a slider or other user interface device to provide a relative priority between older but otherwise more relevant content vs. fresher but less relevant content. This helps the interleaver service 108 decide between sending the user a video clip of a favorite athlete on a favorite team scoring a touchdown earlier in time (e.g., before the user activated the user's device) or a less favorite athlete who just scored a touchdown.

FIG. 15 is a schematic diagram of a third example user interface 1500, operable on a client application or device, and configured obtain user preferences and relative preferences for various types and sources of content to be sent to the user. In the example shown, a Preferences tab 1302 has been selected by a user, thereby giving the user a choice between a Rank tab 1304, an Equalizer tab 1306 and a Target tab 1308. In the example of FIG. 8, the Target tab 1308 has been selected by a user, thereby invoking the user interface 1500.

A target 1502 may include two or more topics 1504-1510, which may be labeled outside the target. In the example of FIG. 15, four topics are shown: Fantasy Sports, Analyst Commentary, Social Media and Cheerleaders. By moving the crosshairs 1512 to different locations within the target, the relative contributions of the four topics in the custom content stream 116 (e.g., FIGS. 1 and 2) may be controlled by the user. Thus, the user may want to emphasize Fantasy Sports, and associated video clips related to the user's fantasy sports team(s). The user may also want to emphasize Analyst Commentary. The user may want to replace one of the topics with a different topic, and may do so by techniques such as press-and-hold the topic to be removed, and selection of a new topic in a drop-down menu that results. Accordingly, the user may exercise control over the content and nature of the custom content stream 116 sent to the user.

The gray numbers 1514 close to the crosshairs 1512 may show minutes or hours of each desired content type. Alternatively, the gray numbers 1514 may show relative percentages (which may total up to 100%) of the custom content stream that is related to each of the four topics. If the total of the relative percentages does not total 100%, then other types of content may be provided by the interleaver service 108.

A relevance vs. freshness slider or device 1516 may be configured as seen in FIG. 14.

Example Processes for Providing Custom Content

FIGS. 16-19 are flowcharts illustrating example processes 1600, 1700, 1800, and 1900 for providing custom content. For ease of understanding, the processes of FIGS. 16-19 are described in the context of the interleaver service 114, the segment 500A, and the content feed 600. However, the processes are not limited to performance with these examples and may be performed using other systems and devices and other content to generate other segments. In some examples, the processes 1600, 1700, 1800, and 1900 may be performed independently, while in other examples operations of some or all of these processes may be used together, rearranged, combined, and/or modified.

Figure 16:
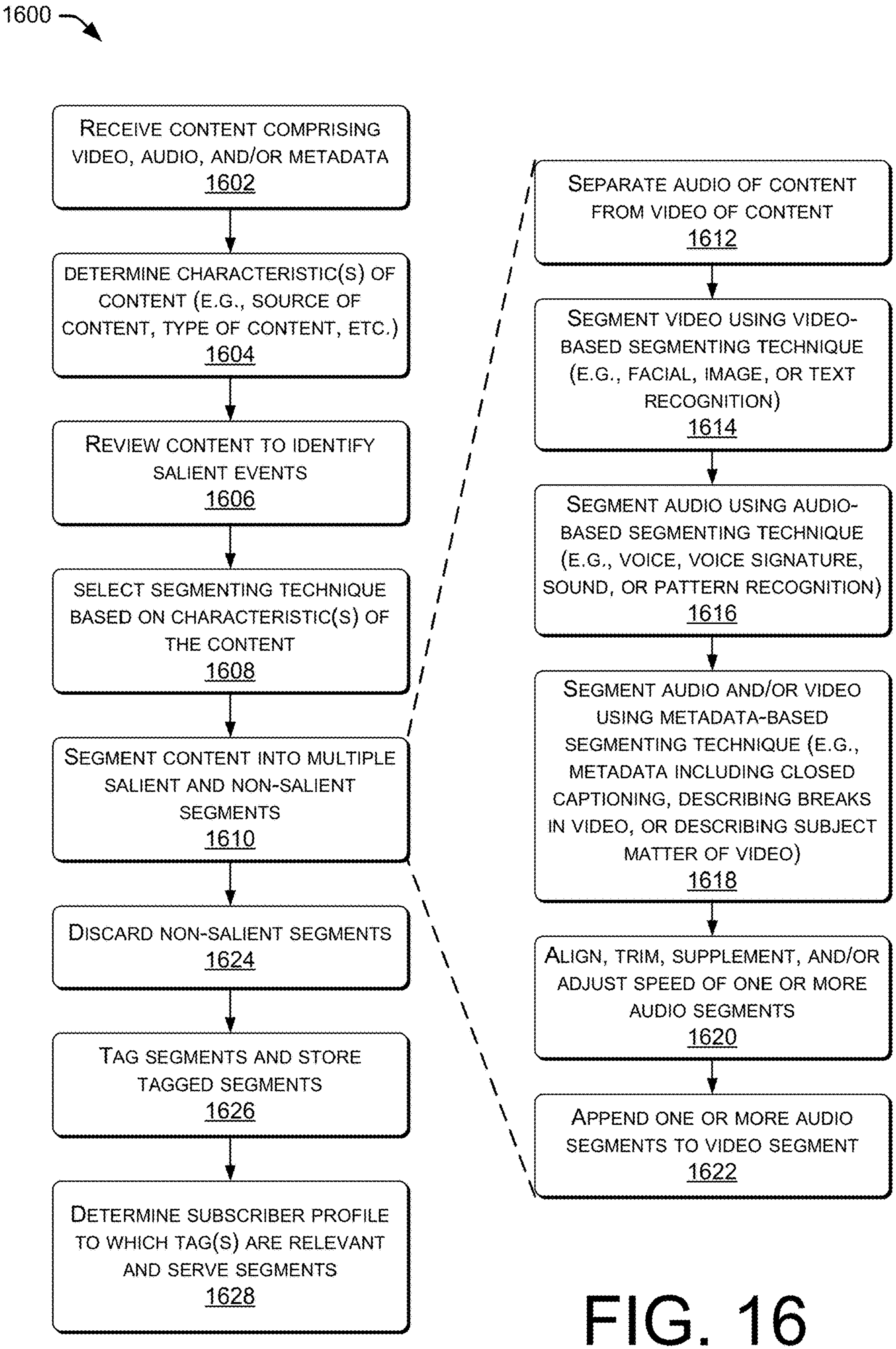
FIG. 16 is a flowchart illustrating an example process of providing custom content, with a focus on a segmenting portion of the process.

FIG. 16 shows a process 1600, which includes techniques for providing custom content, with a focus on a segmenting portion of the process. The process 1600 includes, at block 1602, receiving content (e.g., content 102) at an interleaver service (e.g., interleaver service 114 or other custom content providing service) from one or more content sources (e.g., content sources 104). The content may comprise one or more of video, audio, audio/video, text, images, metadata, etc. For instance, the content may be received from television networks, radio stations, websites, social networks, and/or other content sources. In some examples, the content may include sporting events (e.g., football games, baseball games, basketball games, soccer matches, hockey games, auto races, boxing matches, or the like). For instance, the interleaver service may receive multiple concurrent content feeds (e.g., multiple concurrent sporting events) from multiple different sources (e.g., multiple different television networks, radio stations, or other content providers). In some examples, the received content may include predefined frames, tracks, chapters, scenes, and/or other segments, while in other examples the content may be received free of predefined segments. In some examples, the content may be received as one or more discrete blocks or chunks of content (e.g., discrete programs or games), while in other examples the content may be received as a continuous ongoing feed or stream of content (e.g., a broadcast television channel). The interleaver service may further receive data from one or more websites or other data sources that host fantasy sports leagues and teams, statistics, analysis, odds. The interleaver service may additionally or alternatively receive advertisements (e.g., ads 110) from one or more ad sources (e.g., ad sources 112).

At block 1604, characteristic(s) of the received content are determined. The characteristics may include a content source (e.g., a television network, radio station, cable company, satellite television company, website, service, or other content provider), a type of content (e.g., audio, video, images, text, metadata), or other characteristics of the content (e.g., format, compression, resolution). The characteristic(s) of the received content may at least partially dictate how the content will be processed by the interleaver service (e.g., the type of video, audio, image, or other processing to be applied).

At block 1606, the content may be reviewed to identify salient events, such as portions of content that depict or describe events resulting in fantasy points, desirable commentary, cheerleaders, colorful fans, etc. In examples where the content includes multiple types of content (e.g., audio, video, images, text, and/or metadata), the different types of content may have different salient portions. For instance, some salient video content may not have corresponding audio content and vice versa. Further, in many cases, salient audio portions may not align with salient video portions, closed captioning, or other metadata.

At block 1608, a segmenting technique may be selected for the content based at least in part on characteristics of the content. In some examples, automated segmentation may be performed. Such segmentation may recognize (e.g., by operation of software) the starting and ending points of a "play" or other segment of content. Such a system may recognize a hike in football, the ball coming into play in basketball or soccer, a pitch in baseball, a player entering a field of view, a speaker starting to speak or mentioning a particular athlete by name, an athlete's name included in closed captioning text, etc. In some examples, multiple segmenting techniques may be applied in parallel or sequentially.

At block 1610, the content may be segmented into multiple salient and/or non-salient segments. For instance, received content corresponding to a television broadcast of a sporting event may be segmented into multiple salient segments corresponding to portions of the content that are likely to be interesting to users of the interleaver service, and multiple non-salient segments that are unlikely to be interesting to users of the interleaver service. In some examples, salient segments may comprise segments depicting or describing events that result in awarding or decrementing of fantasy points. In some examples, salient segments may comprise segments depicting or describing events for which statistics are maintained by a governing body (e.g., the National Football League, Major League Baseball, the National Basketball Association, National Association of Stock Car Racing, National Collegiate Athletic Association, etc.). In some examples, salient segments may include segments depicting and/or describing individual plays, collections of plays, analysis, commentary, cheerleaders, half-time shows, colorful fans, etc. In some examples, non-salient segments may comprise content that is of little or no interest to users of the interleaver service, such as, for example, portions of the video showing periods of inaction (e.g., rain delays, huddles, timeouts, etc.) or errors or mistakes (e.g., inadvertently recorded video showing the ground or the inside of the lens cap for instance, blurred or obscured images, scrambled or blank video feeds, etc.). In some examples, non-salient video segments may include advertisements contained in the received content. However, in other instances, advertisements in the received content may be considered salient video segments.

A variety of different techniques may be used separately or in combination to segment the content at block 1610. In some examples, the content may be segmented based on the audio, video, and/or metadata of the received content. In the illustrated example, at block 1612, audio of the content may be separated from video of the content and/or metadata of the content. That is, for content having audio and video, the audio track may be stripped from, and/or processed separately from, the video content. For content having audio, video, and metadata, the audio and metadata may be stripped form, and/or processed separately from, the video. At block 1614, a video portion of the content may be segmented using one or more video-based segmenting techniques, such as facial recognition, image or object recognition, text recognition or optical character recognition, or the like. At block 1616, an audio portion of the content may be segmented using one or more audio-based segmenting techniques, such as voice recognition, voice-to-text conversion, voice signature recognition, sound recognition, or pattern recognition. At block 1618, audio and/or video portions of content may be segmented using metadata-based segmenting techniques, such as by analyzing metadata including closed captioning, describing breaks in video, or describing subject matter of video.

In some example, the segmenting may be performed at least in part by one or more human editors. In that case, the human editors may be personnel of the interleaver service, personnel of the content sources, crowd source workers, and/or users of the interleaver service.

Once the audio, video, and/or metadata are segmented, the interleaver service may, at block 1620, align, trim, supplement, and/or adjust a speed of one or more audio segments and/or video segments and, at block 1622, may append one or more audio segments to each video segment. For instance, in some examples, an audio segment may be aligned temporally to begin at a same time as a video segment, to end at a same time as the video segment, to be centered with respect to the video segment, or the like. In some examples, an audio segment may be trimmed (e.g., by removing a beginning portion, an ending portion, and/or one or more intermediate portions) to be substantially a same length as a video segment, or vice versa. In some examples, an audio segment may be supplemented with additional audio content (e.g., a voice over, commentary, analysis, etc.) to arrive at an audio segment having substantially a same length as a video segment, or vice versa. In some examples, an audio segment may be sped up or slowed down so as to be substantially a same length as a video segment, or vice versa.

In other examples, the content may be segmented without separating the audio, video, and/or metadata portions. That is, audio, video, and metadata of the received content may be segmented concurrently with the content intact. In that case, the received content may be segmented based on any one or a combination of the segmenting techniques described for audio, video, and/or metadata.

Referring back to FIG. 16, at block 1624, the non-salient segments may be discarded, ignored, or tagged as being non-salient. At block 1626, the salient segments may be tagged and stored in memory of or accessible to the interleaver service (e.g., stored as tagged segments 312 in the content store 314).

At block 1628, the interleaver service may compare the tagged segments to one or more subscriber profiles corresponding to users of the interleaver service to determine subscriber profiles to which the various tagged segments are relevant. In some examples, the subscriber profiles include data from the one or more data sources including, among other things, fantasy sports information for the respective users of the interleaver service. The interleaver service may then serve the segments to one or more client devices of the users of the respective subscriber profiles to which the segments were determined to be relevant (e.g., based on the fantasy sports information or other information contained in the subscriber profile of each user). In this way, each user receives a custom content feed that includes segments that are relevant to the particular user (e.g., custom content related to the user's fantasy sports teams/leagues).

Figure 17:
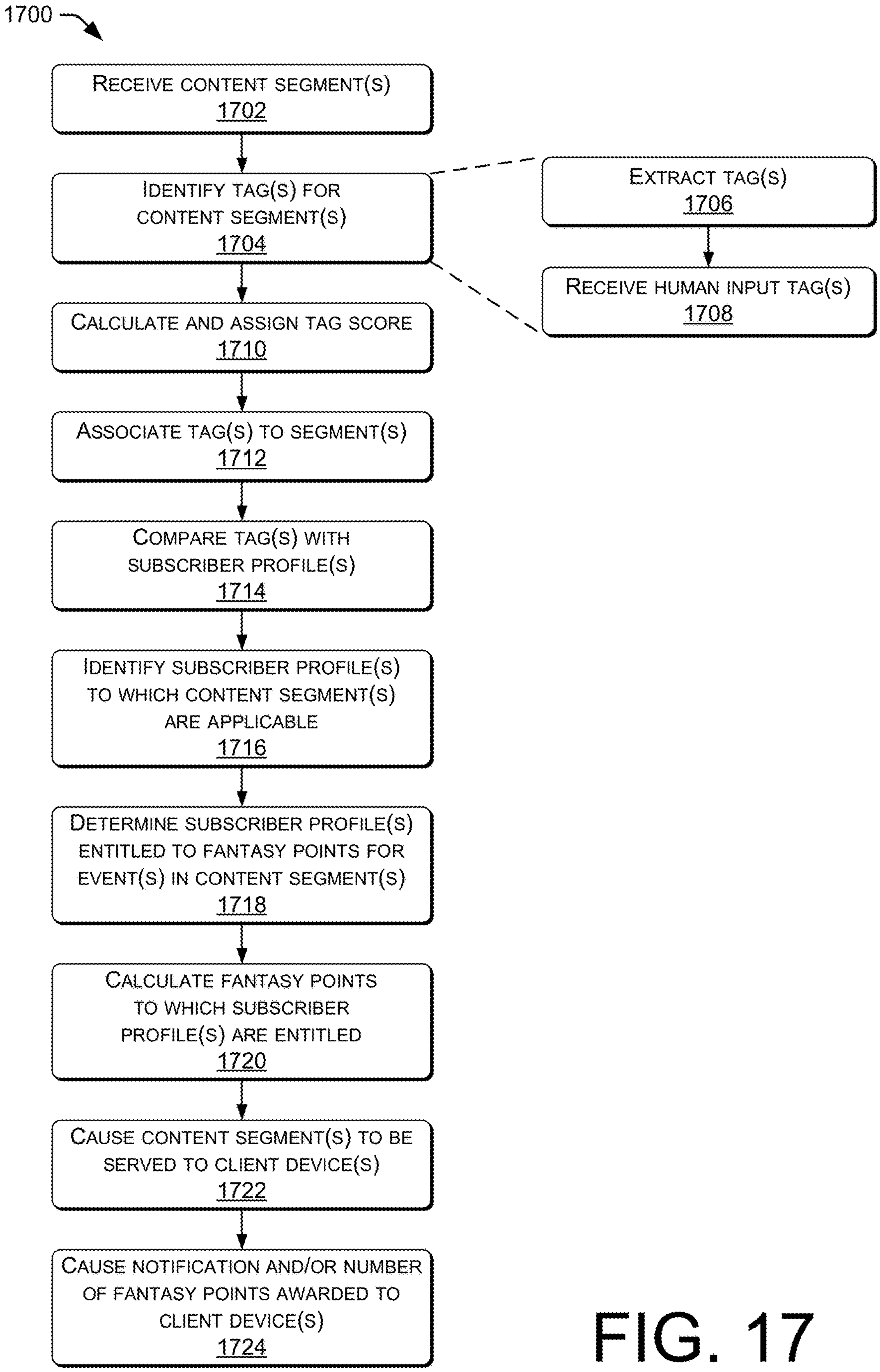
FIG. 17 is a flowchart illustrating an example process of providing custom content, with a focus on a tagging portion of the process.

FIG. 17 is a flowchart illustrating an example process 1700 of providing custom content, with a focus on a tagging portion of the process. The process 1700 includes, at block 1702, receiving one or more content segments at an interleaver service (e.g., interleaver service 114 or other custom content providing service). The content segments may be received from one or more external content sources (e.g., content sources 104) or from one or more internal sources (e.g., segmenting module 308).

At block 1704, one or more tags may be identified for each content segment and the content segments may be tagged with the one or more tags. In some examples, the tagging may be performed by a tagging module of the interleaver service (e.g., tagging module 310). However, in other examples, the tagging may be performed by other services internal or external to the interleaver service. For instance, in some examples, content may be received from an external content source in an already segmented and/or tagged form. In either case, the identification of the tags for each segment may be performed by, at block 1706, extracting one or more tags from the content segment itself and/or by, at block 1708, receiving one or more human input tags. By way of example and not limitation, extracting tags from the content segments may be performed automatically or semi-automatically and may include analyzing audio, video, and/or metadata of the content to recognize subject matter (e.g., people, places, things, events, and/or actions) depicted in the video and/or described in the audio and/or metadata. In some examples, tag extraction techniques may include video extraction techniques such as facial recognition (e.g., to identify athletes, coaches, announcers, officials, or other people from a database of known people), image or object recognition (e.g., to identify objects or object types from a database of known objects), and/or text recognition (e.g., optical character recognition) to identify and determine the meaning of text in the content. The tag extraction techniques may additionally or alternatively include audio extraction techniques, such as speech-to-text conversion to identify and determine a meaning of voice content, voice signature recognition to identify individuals by comparison to a database of known voice samples, and/or sound or pattern recognition to identify sounds or sound types by comparison to a database of known sounds or patterns. The tag extraction techniques may additionally or alternatively include metadata extraction techniques, such as analysis of closed captioning data to identify subject matter (e.g., people, places, things, events, actions, etc.) described in the content, a source of the content, a format of the content (e.g., file format, resolution, compression, etc.), or the like.

Human input tags may be received from, for example, personnel at or associated with the sporting event or other subject matter of the content, personnel associated with one or more fantasy sports websites or platforms (e.g., fantasy sports platforms offering fantasy sports experiences based on one or more sporting events of the received content), and/or one or more individual users (e.g., crowd source workers and/or users of the interleaver service).

In some examples, at block 1710, a tag score may be calculated and assigned to some or all of the tags. In some examples, the tag score may be assigned to each tag regardless of the segments to which it is applied (i.e., the tag scores may be segment agnostic). In other examples, the tag scores for each tag may be dependent upon the segments to which the tag is applied (i.e., the tag scores may be segment specific). In that case, a tag may have one tag score as applied to a first segment and may have a second, different tag score as applied to a second, different segment.

At block 1712, one or more tags may be associated with each segment to identify the subject matter depicted or described in the respective segment. In some examples, associating the tags with segments may comprise modifying the files corresponding to the content segments to include the tag information. In other examples, associating the tags with segments may comprise creating a separate tag file or index including the tag information along with pointers to the corresponding content segments and/or locations of the content segments in memory. In either case, once the tags have been associated, the segments may be stored in memory accessible to the interleaver service (e.g., they may be stored as tagged segments 312 in content store 314).

At 1714, the interleaver service may compare the tags with one or more subscriber profiles to identify tags that are relevant to the subscriber profile(s). In some examples, the comparison may be initiated by the interleaver service (e.g., periodically or upon receipt of one or more new content segments) or may be initiated in response to receipt of a request from a client device of a user (e.g., a client device 118). At block 1716, based at least in part on the comparison, the interleaver service may identify one or more subscribe profiles to which one or more content segments are applicable (or vice versa).

At block 1718, the interleaver service (or other service) may determine that a subscriber profile to which a content segment is applicable is entitled to fantasy points for one or more events depicted or described in the content segment. Additionally, at block 1720, the interleaver service may determine a number of fantasy points the user is entitled to for the events depicted in the segment. In the illustrated example, this fantasy point determinations of operations 1718 and 1720 are described as being made after the segment is determined to be applicable to the subscriber profile. This approach may be advantageous when different users of the interleaver service participate in fantasy sports leagues provided by websites or services other than the interleaver service, since in that case different users may be entitled to different fantasy points for the same segment (e.g., because different fantasy sites/platforms apply different scoring metrics and/or fantasy commissioners may set different scoring metrics for each league). In some implementations, the indication of fantasy points and/or the number of fantasy points may be calculated by the interleaver service, while in other implementations the indication and number of fantasy points may be obtained from another fantasy sports website or service (e.g., by querying or scraping the other fantasy sports website). The indication that the segment is entitled to fantasy points and/or the fantasy point total to which the user is entitled for the events depicted in the segment may be associated with the segment when the segment is placed in the user's queue to be transmitted to a client device of the user.

In other examples, fantasy point information may be assigned to each segment without regard to which subscriber profiles it may be applicable to. In that case, the fact that a segment depicts an event resulting in fantasy points and/or a fantasy point total attributable to the segment may be associated with the segment (e.g., as one or more tags). This approach may be particularly advantageous when the fantasy points are determined and/or assigned by the interleaver service (e.g., if the interleaver service administers the fantasy sports league/team).

At 1722, the interleaver service may transmit or otherwise cause the content segment(s) to be served to client device(s) of the user. The interleaver service may, at block 1724, additionally transmit or otherwise cause a notification to be sent to the client device(s) of the user indicating that the user is entitled to fantasy points, and/or a number of fantasy points awarded to the user, for an event depicted or described in the content segment. In this way, the user is provided with a custom content feed comprising content segments that are relevant to the user (e.g., based upon information about the user's fantasy sports accounts stored in the user's subscriber profile).

Figure 18:
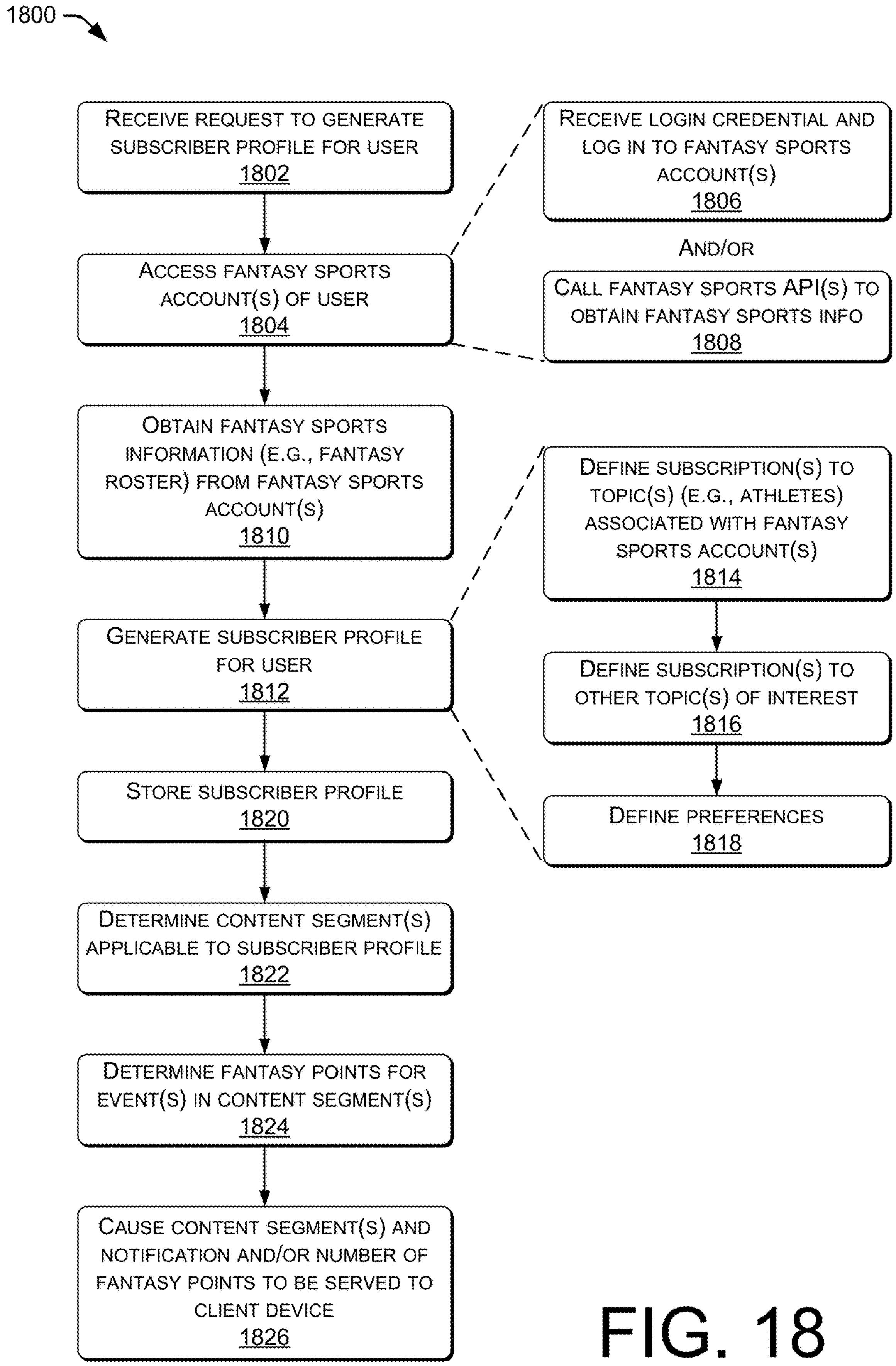
FIG. 18 is a flowchart illustrating an example process of providing custom content, with a focus on a subscriber profile portion of the process.

FIG. 18 is a flowchart illustrating an example process 1800 of providing custom content, with a focus on a subscriber profile portion of the process. The process 1800 includes, at block 1802, receiving a request at an interleaver service (e.g., interleaver service 114 or other custom content provider service) to generate a subscriber profile for a user. The interleaver service may also receive account information (e.g., login credentials) for one or more other services (e.g., fantasy sports services or websites, social media sites, gaming sites, or the like) of which the user is a member.

At block 1804, the interleaver service (e.g., via profile manager 318) may access one or more fantasy sports accounts (or other accounts) of the user. In some examples, accessing the one or more accounts of the user may comprise, at block 1806, receiving and using a login credential to access the account(s), and/or at block 1808, calling one or more application programming interfaces (APIs) to access the account(s).

At block 1806, the interleaver service may obtain fantasy sports information (e.g., fantasy league information, fantasy team information, fantasy roster information, etc.) or other information (e.g., social network information, gaming information, etc.) from the account(s). In some implementations, it may be necessary to access the account(s) of the user to obtain the fantasy sports information or other information. However, in other examples, it may be possible to obtain some or all of the information without the need to access the user's account.

At block 1812, the interleaver service may generate a subscriber profile (e.g., subscriber profile 322) for the user. In some examples, the subscriber profile may include the account information of the one or more other services of which the user is a member. In some examples, generating the subscriber profile may include, at block 1814, defining one or more subscriptions to topics of interest to a user (e.g., athletes, teams, etc.) associated with the fantasy sports account(s) of the user. In some examples, generating the subscriber profile may additionally or alternatively include, at block 1816, defining one or more subscriptions to other topics of interest to the user (e.g., favorite athletes, favorite teams, favorite announcers, favorite cheerleaders, home location, etc.). The interleaver service (e.g., via profile manager 318) may then determine tags relevant to the subscriptions. The tags may correspond to, for example, specific people (e.g., athletes, announcers, cheerleaders, etc.), places (e.g., cities, stadiums, etc.), and/or things (e.g., teams, cars, etc.) corresponding to the subscriptions defined in blocks 1814 and 1816.

Generating the subscriber profile may additionally include, at block 1818, defining one or more preferences associated with the interleaver service. The preferences may include, for example, the types and amounts of different types of content that the user wishes to receive in his or her custom content stream. Thus, the preferences may indicate relative priorities of certain types of content. In some examples, the preferences may include weights associated with the subscriptions (or to individual tags associated with the subscriptions). The weights may be determined and/or assigned by, for example, weighting module 320 responsive to preferences provided by the user explicitly (e.g., using the preferences tab in the UIs shown in FIGS. 13-15) or implicitly (e.g., by prior user actions, other memberships, frequency of reference to particular content of interest, frequency of comment on various content of interest, etc.).

At block 1820, the interleaver service (e.g., subscription manager 318) may store the subscriber profile in memory of or accessible to the interleaver service (e.g., subscription store 324).

At block 1822, the interleaver service may determine one or more content segments (e.g., one or more tagged content segments 312 in the content store 314) that are applicable to the user's subscriber profile based at least in part on the subscriptions and associated tags described by the subscribe profile. In some examples, the interleaver service may additionally take into account the weights and other user preferences defined in the subscriber profile when determining content segments that are applicable to the user's subscriber profile.

At block 1824, the interleaver service may determine whether the user is entitled to fantasy points for an event depicted and/or described in the one or more determined content segments and, if so, how many. The fantasy point determination may be made based on calculations of the interleaver service and/or based information obtained from one or more other fantasy sports services.

At block 1826, the interleaver service may transmit or otherwise cause the one or more content segments to be transmitted to a client device (e.g., client device 118) of the user along with a notification and/or number of fantasy points to which the user is entitled for events depicted in the content segment(s). In this way, the interleaver service provides streams of content customized for each user based at least in part on their respective fantasy sports information.

Figure 19:
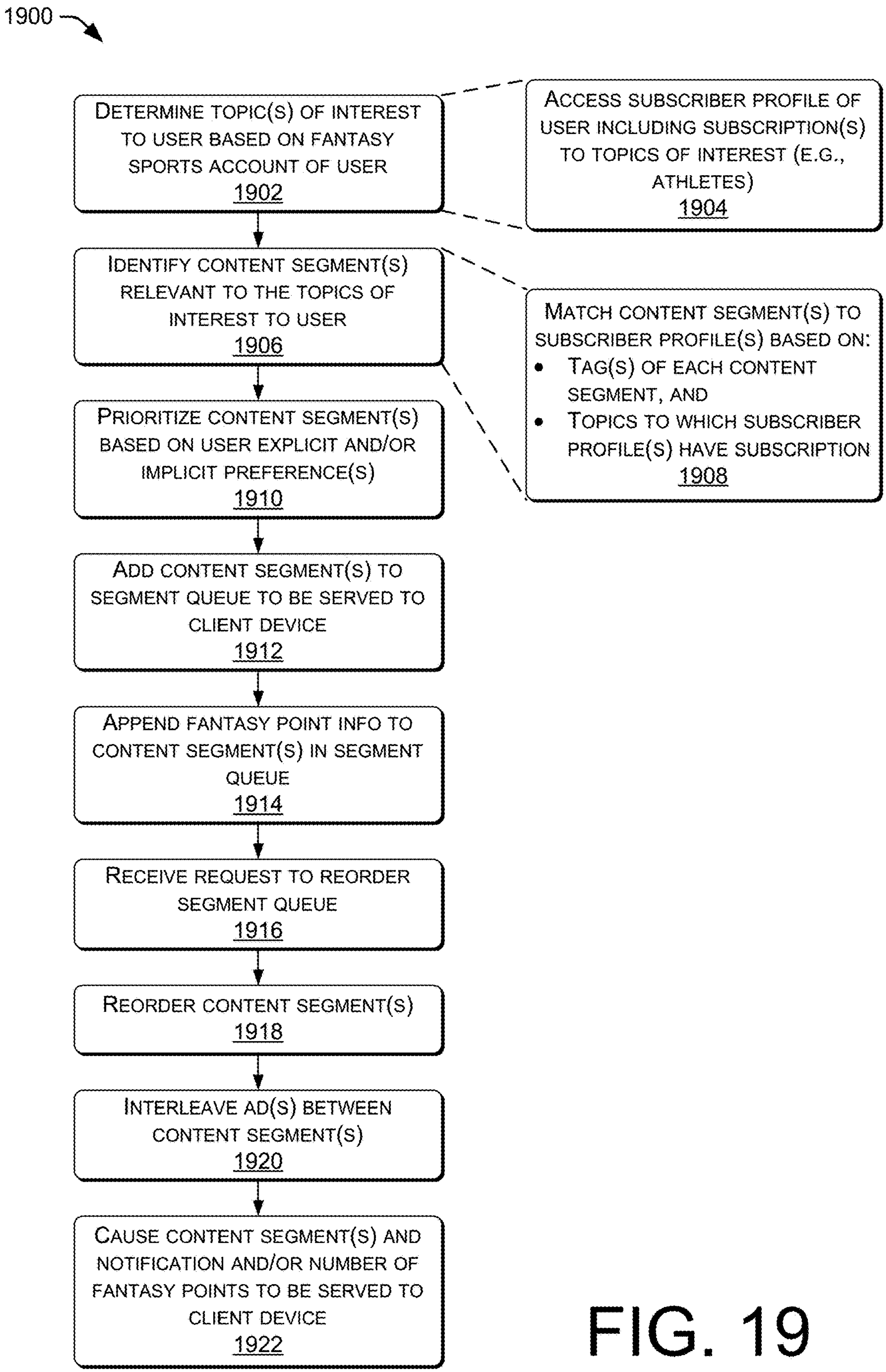
FIG. 19 is a flowchart illustrating an example process of providing custom content, with a focus on an interleaving portion of the process.

FIG. 19 is a flowchart illustrating an example process 1900 of providing custom content, with a focus on an interleaving portion of the process. The process 1900 includes, at block 1902, topics of interest to one or more users are determined. In some examples, the topics of interest to the user may be determined from, or based on, the users fantasy sports account. Such a fantasy sports account may be based on, or provided by, a website that is fantasy sports platform or other fantasy sports application. A website that is a fantasy sports platform may contain the accounts of large numbers of users. Each user's account may be associated with one or more of the user's teams, each of which may be within a league and may be associated an underlying real life sport. Each user may access the user's one or more account, such as by use of a username and password. The account may include information about the user and the user's fantasy sports team. The account may provide access to the roster(s) of the user's fantasy team(s) and the rosters of the user's opponent's teams in one or more leagues. In some examples, any of the athletes on any of the user's fantasy team(s), the user's opponent's fantasy team(s), the other teams in the user's one or more leagues, etc., may be of interest to the user.

In the context of the example of FIG. 1, the interleaver service 114 may use the user's username and password, and log into the user's account on one or more fantasy sports platform websites. Having accessed the user's account, the interleaver may determine the identities of athletes on the user's fantasy team(s) and athletes on other teams of interest to the user. Any content related to such athletes would be of interest to the user, particularly when the content included video and/or audio depictions of the athletes performing in a manner that resulted in fantasy points for the user, the user's opponents, the user's friends, etc.

At block 1904, a subscriber profile of the user may be accessed, to thereby access one or more topics of interest to the user. In the context of the example of FIG. 1 or 2, the interleaver service 114 may access the user's subscriber profile, which may be located at a data source 108. Table 900 of FIG. 9 illustrates example content of a subscriber profile 322. The user profile 322 may include information including athlete identification (roster information) of all of the user's teams and opponents. The subscriber profile 322 may include a large amount of additional data, such as the user's favorite athletes, favorite teams, favorite types of plays, favorite sports, etc. The user profile may also have marketing information, which may assist the user to obtain more relevant commercial messaging. All of this information may be used to identify topics of interest, such as particular video content and/or clips, when they become available.

At block 1906, content segments relevant to the topics of interest to the user may be identified. In the context of the examples of FIGS. 1 and 2, the interleaver service 114 may process information including tagged video segments and athlete rosters of each user's fantasy team and league, and from such processing determine which tagged video segments are relevant to each user. In some examples, the interleaver identifies content segments that are relevant to each user because the identified content segments depict athletes on the user's fantasy team(s) performing in a manner that awards the user's fantasy team with fantasy points.

At block 1908, content segment(s) are matched to a user and the user's subscriber profile based. The matching may be based on a correlation between the tag(s) or annotations associated with (or part of) each content segment and topics to which the subscriber profiles have subscription. In an example, a content segment may have tags or annotations indicating that certain athlete(s) were in a particular content segment and what they accomplished. Additionally, the tags may indicate that the performance(s) resulted in positive or negative fantasy points. The user's subscriber profile may indicate that the user is probably interested in the content of the content segment for one or more reasons. For example, the user's fantasy team may include one or more athletes depicted in the content segment, or the content segment may depict one or more of the user's favorite athletes and/or teams. Accordingly, the interleaver performs a matching process by which one or more (or each) content segment is matched or not matched to one or more users. Such matching may indicate that it is appropriate, depending on priority, to send the content segment to the user.

At block 1910, content segment(s) may be prioritized based at least in part on relevance to the topics of interest to the user. In particular, video clips depicting athletes' performances resulting in fantasy points may be prioritized according to importance to the user. In some examples, athletes on the user's fantasy team and favorite athletes of the user may be given higher priority, while athletes unknown to the user and/or not on the user's fantasy team(s) may be given lower priority. The prioritization may be based on explicit and/or implicit preferences of the user. In some examples, the interleaver service 114 may apply an algorithm to determine the strength of a match between a content segment and a user's subscriber profile. Explicit preferences may include the user's identified fantasy team roster, the user's identified favorite athletes, real life teams, etc. Implicit preferences may also be used, but may be given lower priority. If the user is known to live in the Northwest, an implicit preference for athletes playing for the Seattle Seahawks may be assumed. In other examples, the user's age may be used to prioritize various content segments produced by various color commentators. The prioritization process may consider factors such as how well the content segment matches the user's subscriber profile, how many content segments are currently in the user's segment queue, how rapidly the user is consuming content, whether the priority of content segments in the user's segment queue is high or low, and other factors.

At block 1912, one or more content segments may be added to a queue to be served to the client device. The content segments may be added in an order indicated by the priority established at block 1910. The content segments themselves may be placed in the queue, or links to the content segments may be put in the queue. If links are put in the queue, the user may click the received link to download the actual content segment.

At block 1914, fantasy point info may be appended to content segment(s) in the segment queue. In some examples, athletes' accomplishments may be associated with content segments before actual fantasy point information becomes available. Thus, the content may be segmented and annotated to recognize different athletes' performances before an exact fantasy point award associated with a particular user's league and/or fantasy sports platform is known. However, in many instances, such fantasy point information may be obtained from the fantasy sports platform website (such as by logging in with the user's username and password) or by other means. Once obtained, the fantasy point information may be appended or otherwise associated with a content segment. In some examples, fantasy point info may be appended by adding a tag to segment(s) to be displayed by the client device or embedding in the segment (e.g., text or audio added to the content of the segment). Fantasy point info may include a notification that the user is entitled to fantasy points for an event depicted in the content segment and/or a number of fantasy points to which the user is entitled for the event depicted in the content segment. If the exact fantasy point total is not known when the content segment is added to the segment queue, it may be added with it becomes available.

At block 1916, a request to reorder the segment queue may be received. In some examples, the interleaver service 114 may receive the request, which may have been sent by the client device 118 of the user. The user may have seen an indication of a preferred content segment that was not first the segment queue, and therefore requested the reordering. At block 1918, the content segments in the content queue may be reordered. The reordering may be performed by the interleaver service 114.

At block 1920, one or more ads may be interleaved between content segments. In the context of the example of FIG. 2, the ads $AD_1$, $AD_2$ and $AD_P$ have been added to the custom content 116(1). Thus, the custom content may be a mixture of, at least, content segments and ads.

At block 1922, content segments(s), ads and/or data including a notification and/or number of fantasy points may be served to client device(s). In some examples, the interleaver service 114 may cause or perform the serving.

Example Processes for Providing Estimated Fantasy Scores

Figure 20:
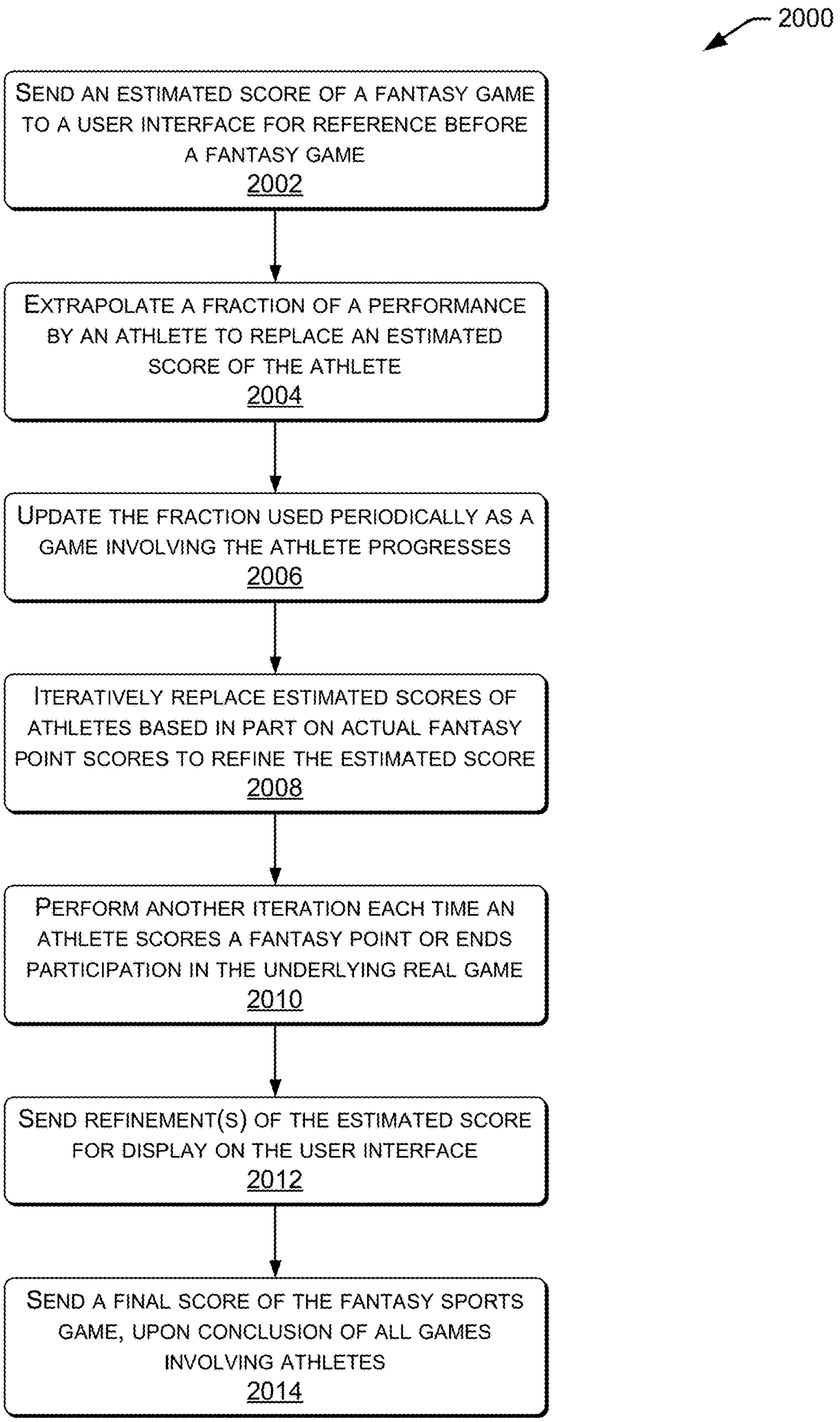
FIG. 20 is a flowchart showing a first example method by which an estimate of a score of a fantasy sports game, made before play begins, may be refined during play of the underlying real life games to provide progressively better estimates of a final fantasy game score and to provide an indication of which fantasy team is currently predicted to win.

FIG. 20 shows example techniques 2000 for providing an estimated final fantasy score, for one or more athletes, one or more teams, and/or one or more games. The estimated scores may be revised as the underlying real-life games are played, and as the actual fantasy point scores of one or more athletes becomes easier to estimate. In some examples, as the fantasy point totals for different athletes become known, those totals may be used to replace previous estimates that were used, thereby creating a more accurate fantasy point total for a fantasy team. In a second example, as fantasy point information for each athlete becomes known as games in which each athlete is playing progress, the fantasy point estimate for each athlete may more accurately be predicted. These more accurate predictions may be used to more accurately predict fantasy team point totals.

At block 2002, an estimated score of a fantasy game may be sent or caused to be sent (e.g., by a server) to a user interface (e.g., operable on a client device). The estimated score may be based at least in part on previous performance of at least some athletes participating in the fantasy sports game.

At block 2004, a fraction of a performance (e.g., one quarter or one half of a game) by an athlete may be extrapolated to replace an estimated score of the athlete. At block 2006, the fraction used may be updated (e.g., from one quarter to two and then three quarters) periodically or occasionally as the game involving the athlete progresses.

At block 2008, estimated fantasy point scores may be iteratively replaced, based in part on actual fantasy point scores, for each athlete and/or for a fantasy team. Such iterative replacements refine an estimated fantasy point game score of each athlete, and collectively, the fantasy team. In some examples, each time an athlete scores a fantasy point, spends a period of time without scoring a fantasy point, or ends participation in a real life game, the fantasy points earned by the athlete may be used in another iteration of an estimate of the score of the athlete and a fantasy game. Thus, as each time an athlete's actual fantasy point score becomes known, that score may be used to make a user's fantasy team prediction more accurate.

At block 2010, estimated scores of athletes used to calculate the estimated score of a fantasy team may be iteratively or repeatedly replaced, as actual scores of the athletes become available and/or each time an athlete ends participation in the fantasy game.

At block 2012, the refinement of the estimated score may be sent for display on the user interface.

At block 2014, a final score of the fantasy sports game is sent, upon conclusion of participation of all athletes of the fantasy sports game.

FIG. 21 shows example techniques 2100 for providing estimated fantasy scores, for one or more athletes and/or one or more teams, which may be revised as real-life games are played.

At block 2102, an estimated score for a fantasy game may be sent to a user interface. In the context of the example of FIG. 1, the interleaver 114 may send the estimated score within custom content 116 to a client device 118.

At block 2104, the estimated score of the fantasy game is transitioned into a real score of the fantasy game. The transitioning may be based on increasingly better estimates of a number of fantasy points that will be scored by each of a plurality of athletes on a user's fantasy team.

At block 2106, an estimated score of an athlete may be updated based at least in part on a number of fantasy points scored by an athlete or a failure of the athlete to score fantasy points within a portion of a game involving the athlete. At block 2108, the estimated score of the fantasy game may be updated based in part on the updated estimated score of the athlete.

At block 2110, an estimated score of an athlete may be updated based on at least one fantasy point earned by the athlete. At block 2112, the estimated score of the fantasy game may be updated, based at least in part on the updated estimated score of the athlete.

At block 2114, the estimated score of the fantasy game may be changed as the fantasy game progresses as indicated by results of a plurality of athletes in a plurality of real games.

At block 2116, a final score of the fantasy sports game may be sent to a client and/or user interface, upon conclusion of participation of all athletes of the fantasy sports game.

Figure 22:
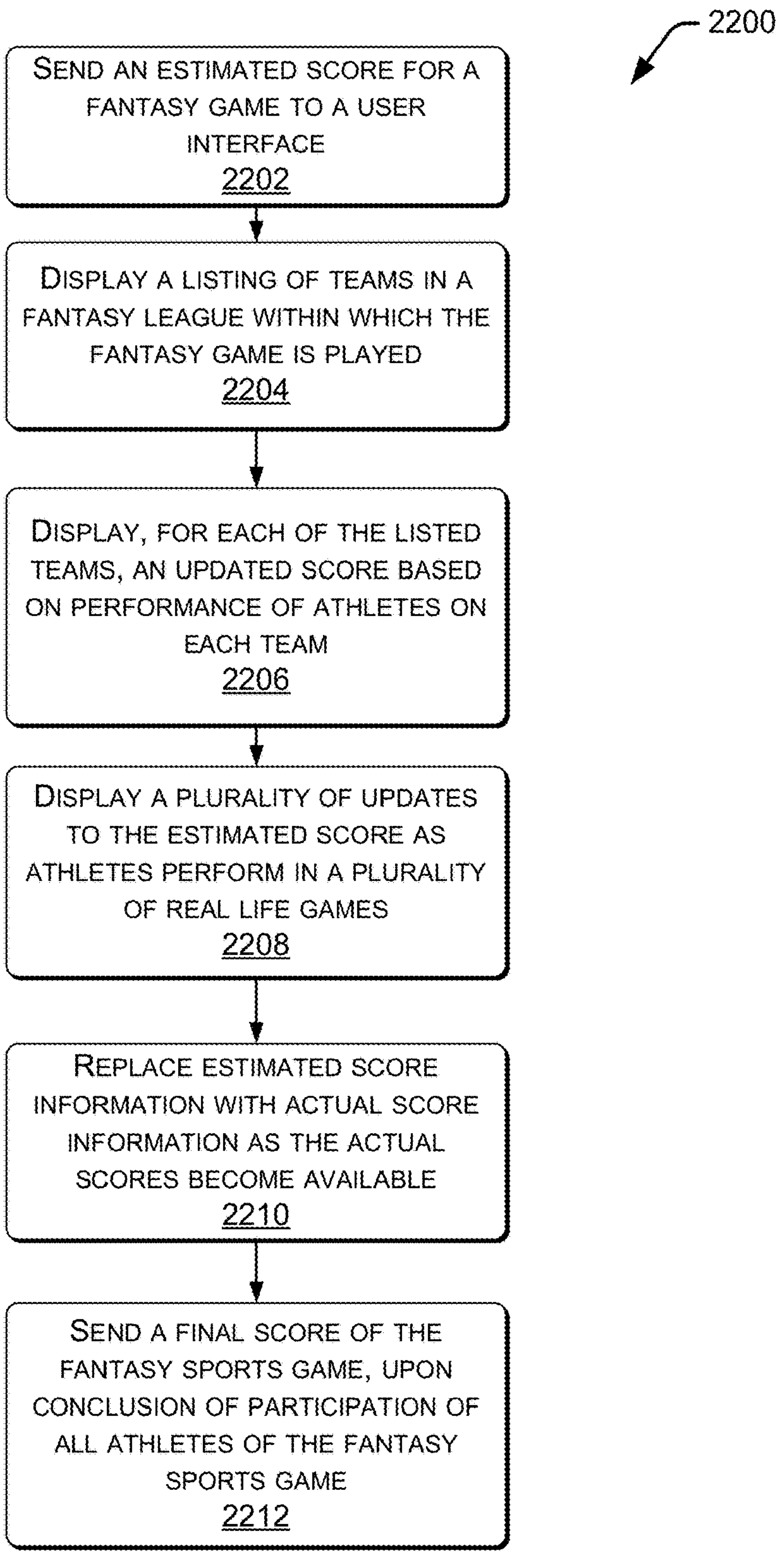
FIG. 22 is a flowchart showing a third example method of fantasy score estimation.

FIG. 22 shows example techniques 2200 for providing estimated fantasy scores, for one or more athletes and/or one or more teams, which may be revised as real-life games are played.

At block 2202, an estimated score of a fantasy game may be sent to a client device and/or displayed on a user interface.

At block 2204, a listing of teams in a fantasy league, within which the fantasy game was played, may be sent to a client device and/or displayed on a user interface.

At block 2206, an updated score, which may be based on performance of one or more athletes, may be display, for each of one or more of the teams in the listing.

At block 2208, a plurality of updates to the estimated score may be displayed, as athletes perform in a plurality of real life games.

At block 2210, estimated score information may be replaced with actual score information as the actual fantasy score information becomes available.

At block 2212, a final score of the fantasy sports game may be sent to a client device and/or displayed on a user interface, upon conclusion of participation of all athletes of the fantasy sports game.

Overview of Example Integration of Fantasy Information with Video Content

The following paragraphs describe example techniques of integrating fantasy information with video content. As discussed above, many people today watch sporting events not only to root for a particular team to win, but also to root for individual players that are on their fantasy rosters. For example, an individual user may be a Seattle Seahawks fan. The user may also participate in one or more fantasy sports leagues and may have athletes from multiple different actual teams on his or her fantasy sports rosters. Thus, the user may have interest in watching the Seahawks games, but may also have interest in watching games in which his or her fantasy athletes participate. In some instances, the user may watch a game and be rooting for the Seahawks (his or her favorite actual team in this example) while at the same time rooting for athletes on the opposing team that are on his or her fantasy roster to play well.

When watching a game or sporting event, it is often difficult to identify individual players that are on the field at any given time, particularly athletes that range around the filed and/or do not line up in the same location very time. This application describes techniques for displaying a visual indicator identifying athletes that are on a fantasy roster of the user. The visual indicator may be presented at or proximate to a location on the display at which the athlete of interest is presented on the display and may track the motion of the athlete of interest, such that when the athlete of interest moves on the display, the visual indicator moves with the athlete of interest. By way of example and not limitation, the visual indicator may comprise a halo (e.g., proximate the head, waist, or feet of an athlete), silhouette, shadow, arrow, text, helmet graphic, shoe graphic, uniform graphic, and/or any other visual indicator associated with the athlete of interest and usable to distinguish the athlete(s) of interest from other athletes depicted in the video content.

In some embodiments visual indicators may be presented for all athletes on the user's fantasy roster. In that case, if a user has athletes from two different actual teams on his/her fantasy roster and the two actual teams play each other, athletes from both teams that are on the user's fantasy roster may include visual indications. In some embodiments visual indicators may additionally or alternatively be presented for all athletes on a fantasy roster of the user's current opponent (i.e., the fantasy team that the user's fantasy team is up against). In some embodiments visual indicators may additionally or alternatively be presented for all athletes in a fantasy league in which the user participates. Visual indicators of athletes on a fantasy roster of the user's team may be the same or different than visual indicators of athletes on a roster of an opponent's or other league member's fantasy teams (e.g., different colors, hues, intensities, shapes, text, or other graphics may be used to denote athletes on different users' rosters). Furthermore, visual indicators for athletes that are currently inactive or benched on the user's fantasy roster may be shown differently (or not shown at all) than athletes that are active (i.e., not on the bench) on the user's fantasy roster. Employing such visual indicators allows users to more easily identify the fantasy players on their roster(s).

In some examples, the visual indicator may be interactive. When the user selects the visual indicator, a graphical user interface may be presented (e.g., as an overlay or pop up). The graphical user interface may be stationary on the screen or may be linked to the visual indicator, such that the graphical user interface moves in conjunction with the visual indicator. In some instances, the graphical user interface may comprise biographical information, statistics, news, fantasy points in the game, projected fantasy points, season total fantasy points, or the like. Such informational graphical user interfaces may allow a user to more quickly and easily obtain information about the athletes on their fantasy roster(s). In some instances, the graphical user interface may display a fantasy roster (or a link to such roster) of the user which includes the athlete with which the visual indicator is associated. This may provide a more efficient way for the user to manage his or her fantasy roster.

Additionally or alternatively, the graphical user interface may comprise one or more controls to control presentation of the video content. By way of example and not limitation, the controls may include a camera angle control usable to select an alternate camera view of the events depicted in the video content, a zoom control usable to zoom in or out on the athlete associated with the visual indicator, a center control usable to center the view on the athlete associated with the visual indicator, a replay control to replay a portion of the video content (e.g., the last 5 seconds, 10 seconds, 30 seconds, etc.) in regular or slow motion, a skip control to skip to a previous portion (or subsequent in the case of pre-recorded video content) of the video content depicting a play or event for which the athlete of interest was awarded or decremented fantasy points, or otherwise control the playback of the video content. Such controls may allow the user to view video content of athletes on his or her fantasy roster(s) in ways never before possible. Such additional viewing options may improve the user's understanding of how his or her fantasy athletes are performing, which in turn allows the user to better manage his or her fantasy team(s).

It can also be difficult for a user desiring to monitor his or her fantasy athletes to keep track of when various athletes on his or her fantasy roster(s) are playing. Moreover, even if a user knows which games his fantasy athletes are playing in and what time those games are, the user still needs to know what channel the games are being broadcast on. And, even then, the user has no way of knowing when the athletes on his fantasy roster are actually on the field during a game. Thus, users can spend considerable time locating the games his fantasy athletes are participating in and watching portions of games during which his or her fantasy athletes are not even participating. This application describes techniques to tune channels or stream content based on the fantasy sports roster(s) of the user. For instance, this application describes tuning to video content of games and sporting events that are currently depicting athletes on one or more of the user's fantasy rosters. In some examples, a system (e.g., game console, smart TV, computer, tablet, web service, etc.) may automatically tune to or access (or prompt the user to) games or sporting events that depict athletes on one or more of the user's fantasy rosters. Such tuning techniques make it much simpler for a user to watch video content in which his fantasy athletes are currently participating, without the need to look up which team his athletes are on, what opponent they are playing, what time the games are, what channel the games are on, etc.

There are many ways in which athletes can be identified in video content, some examples of which are described above in relation to the interleaver service. By way of example and not limitation, athlete(s) may be identified in video content based on image/facial recognition, optical character recognition (OCR) or text recognition of uniform names and/or numbers, visible or invisible watermarks or quick response (QR) codes or other machine readable codes which may be applied to athletes' uniforms and/or helmets, or visible or invisible watermark or QR code or other machine readable code added to the video content as an annotation automatically or by a human user.

In some examples, athletes may be identified in video content based on human identification of the athlete (e.g., by touching, pointing, gesturing, selecting, etc.). In some examples, the human may additionally designate the athlete's route or motion on the display. In other examples, once the human identifies the athlete, the system may track the identified athlete using computerized object tracking techniques. The human identification may be implemented by crowdsourcing (e.g., mechanical Turk, leveraging inputs by other users, etc.), analysts, officials, etc. prior to viewing of the game by a user. In some examples, these techniques may be applied in real time as the game or sporting event progresses. In other examples, the techniques may be implanted when the game or sporting event is being viewed with a "tape delay" (e.g., a slight delay of about 3 seconds to about 60 seconds). The techniques also apply to watching previously recorded video content.

The foregoing techniques may be applied in substantially real time by a computing device of the company or network recording, broadcasting, or streaming the game, by a computing device located at the location of the user viewing the game, and/or by an intermediate computing device (e.g., web service) that annotates or supplements the video content with identification of the athletes and their routes or motion in the video content. In some examples, portions of the techniques may be performed by computing devices locally at the user's site while portions are performed remotely. For instance, video content of a game or sporting event may be annotated substantially contemporaneously with recording of the game content using the computer-based and/or human techniques described above. The annotation may include, for example, identification of one or more athletes and their routes or motion in the video content. The annotated video content may then be transmitted to a client device of the user (e.g., computer, game console, set top box, smart television, tablet, etc.) or an intermediary service, which may determine athletes of interest to the particular user (e.g., based on one or more fantasy teams or leagues in which the user participates), and may then cause a visual indicator for each of the athletes of interest to the particular user to be presented on a display. Additionally, in some instances, an intermediate web service located between the source of the content and the user's client device may further process or supplement the video content to include supplemental information, such as fantasy sports scores, route information, play information, formation information, historical statistics of the athlete or team, or the like.

Example Architecture for Integration of Fantasy Information with Video Content

As discussed above, video content may be customized to visually indicate a user's fantasy athletes that are depicted in the video content. In some examples, the customization of the video content for the user may be performed at a content source (e.g., broadcaster, distributor, cable provider, or the like). In other examples, the video content may be customized at a client device of the user (e.g., computer, tablet, game console, smart TV, etc.). In other examples, the video content may be customized by an intermediary service, such as the interleaver service 114 described above, a fantasy sports provider, or other web service. In still other examples, the content customization may be performed by two or more of a content source, an intermediary service, and/or a client device of the user.

Figure 23:
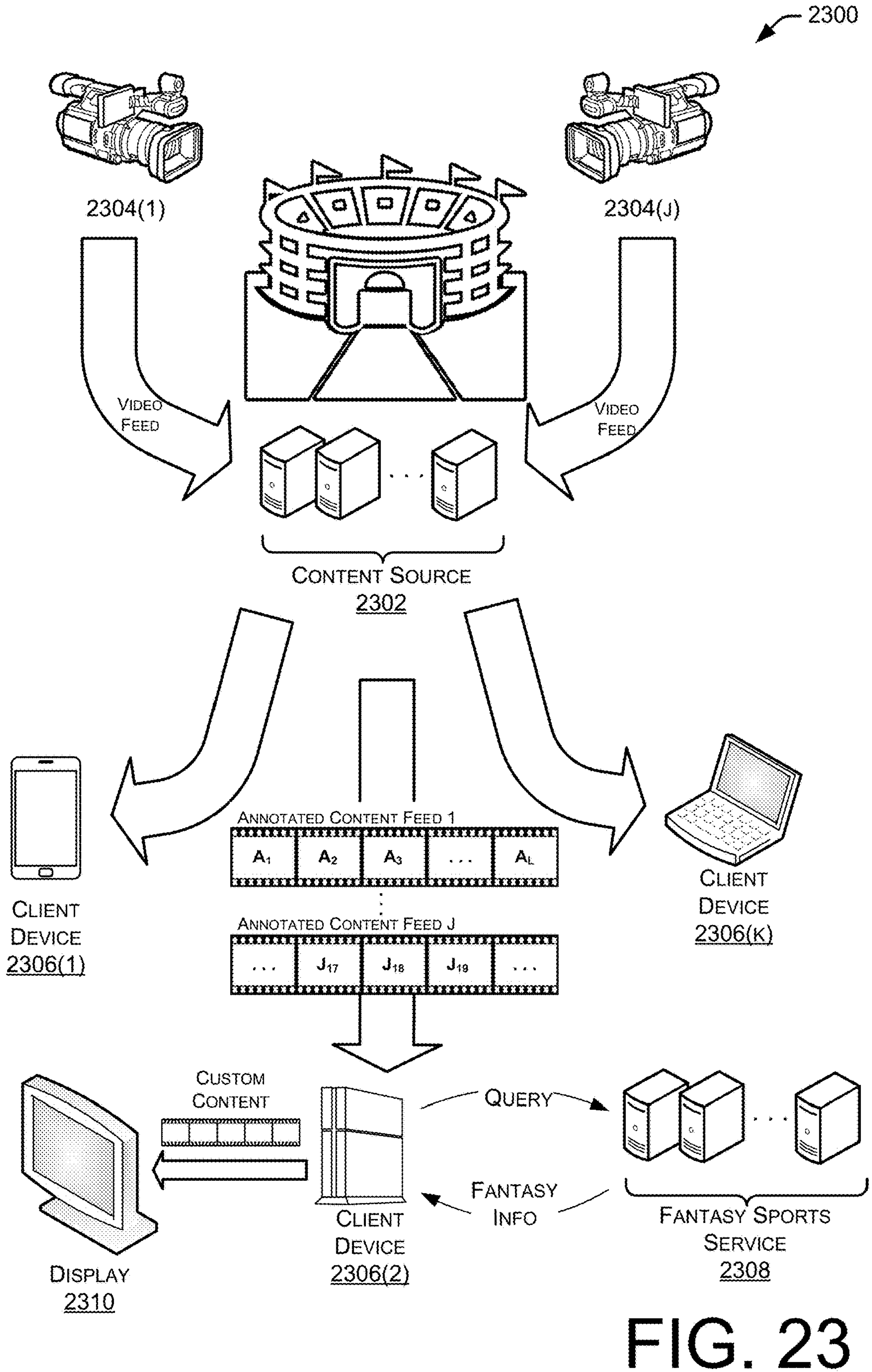
FIG. 23 is a schematic diagram of an example of an architecture usable to integrate fantasy sports information with video content of actual games or sporting events. For example, video content may be customized to visually indicate a user's fantasy athletes that are depicted in the video content.

FIG. 23 is a schematic diagram of an example architecture 2300 usable to integrate fantasy sports information with video content of actual games or sporting events. In the example of FIG. 23, a content source 2302 receives video content from multiple video capture devices 2304(1) to 2304(J) (collectively 2304), where J is any integer greater than 1. The video capture devices 2304 may correspond to different video cameras capturing different views of a game or sporting event, or related content such as broadcasters, announcers, officials, studio analysts, etc. Each video capture device 2304 outputs a respective video feed. The content source 2302 annotates the video feeds to identify athletes depicted in the video content, routes or movements of the athletes in the video content, other objects and/or people in the video content and their respective movements. As described in this section, "movement" refers to changes in location of the athlete, person, or object within the display area of the video content (as opposed to location in real space). The annotations may be human or machine readable identifiers for each athlete, person, or object. In some examples, the annotations may comprise textual annotations (e.g., name, jersey number, team, position, etc.), unique identification numbers, watermarks, QR codes, and/or symbols.

The content source 2302 outputs the annotated content. In the illustrated example, the content source 2302 may output multiple annotated content streams (annotated content feeds 1-J) corresponding to the video capture devices 2304(1)-2304(J). However, in other examples, the content source 2302 may output a single content stream corresponding to one of the video capture devices 2304(1)-2304(J). In that case, the content source 2302 may switch the single content stream among the various content streams of the video capture devices 2304(1)-2304(J), or the content source 2302 may combine or concatenate the various content streams from the video capture devices 2304(1)-2304(J) into a single composite annotated video stream.

Some or all of the annotated content feeds (1-J) are transmitted via a network to one or more client devices 2306(1)(mobile device), 2306(2)(game console), . . . 2306(K)(laptop computer), where K is any integer greater than or equal to 1. The client devices 2306 may comprise any of the client devices described herein and are not limited to the specific examples illustrated. In the illustrated example, the same content feeds are transmitted to all of the client devices. That is, the annotated content feeds (1-J) in this example are not customized for users of the respective client devices 2306. In other examples, different content feeds may be transmitted to each of the various client devices 2306. That is, the content source 2302 may output customized content streams for each client device 2306(1)-2306(K), each custom content stream annotated to visually indicate the fantasy athletes on rosters of users' of the respective client devices 2306.

Referring back to the example of FIG. 23, client device 2306(2) receives annotated content feeds (1-J). The client device 2306(2) may have fantasy information about one or more fantasy leagues in which the user of the client device participates stored in memory thereof. Additionally or alternatively, the client device 2306(2) may query a remote fantasy sports service 2308 to obtain fantasy information including data regarding one or more fantasy leagues in which the user participates. Based on the fantasy information, the client device 2306(2) may determine athletes on a roster of a fantasy sports team of a user. Using this information, the client device 2306(2) may identify at least one athlete of interest that is on the roster of the fantasy sports team of the user and is depicted in the video content of the game or sporting event. The client device 2306(2) may then output custom content to a display 2310. In the illustrated example, the client device 2306(2) and the display 2310 are separate. However, in other examples, the display 2310 may be integral with the client device 2306 (e.g., in the case of a tablet, laptop computer, or smart TV). The custom content may include the video content of the game or sporting event, as well as visual indicators of one or more athletes and other objects and people. Thus, the client device 2306(2) causes presentation of the video content of the game or sporting event on the display and a visual indicator associated with at least one athlete of interest to indicate that the athlete of interest is on the roster of the fantasy sports team of the user.

The techniques described with respect to FIG. 23 may be initiated in a variety of ways. In one example, a user may turn on the client device 2306(2) and tune to a game or sporting event (e.g., turn to a channel that on which the game or sporting event is being shown). The client device 2306(2) cause presentation of a graphical interface, which shows one or more fantasy leagues in which the user participates. The graphical interface may be presented on a same display on which the user is watching the game or sporting event (e.g., a television or other first display), or may be presented on a different display (e.g., a tablet, mobile device, or other second display). The user may select a particular league from among the one or more leagues. In some examples the selection of the particular league may be automatic by the system (e.g., a default or inferred selection). The system may then determine athletes on the user's team in the particular league, and may determine whether any of the athletes on the user's fantasy team in the particular league are participating in the game or sporting event in progress. In other examples, selection of a particular league may be omitted entirely and the system may determine whether any of athletes on any of the user's fantasy teams are participating in the game or sporting event in progress. Such athletes may be referred to as athletes of interest. The system may then present on the display a visual indicator for each of the athletes of interest. Each visual indicator may comprise at least one of a halo, silhouette, shadow, arrow, text, helmet graphic, shoe graphic, uniform graphic, or other indicator associated with the respective athlete of interest. Each visual indicator may be presented at or proximate to a location on the display at which the respective athlete of interest is presented on the display, and may track the motion of the athlete of interest, such that when the athlete of interest moves on the display, the visual indicator moves with the athlete of interest.

Example Annotation Interface

Figure 24:
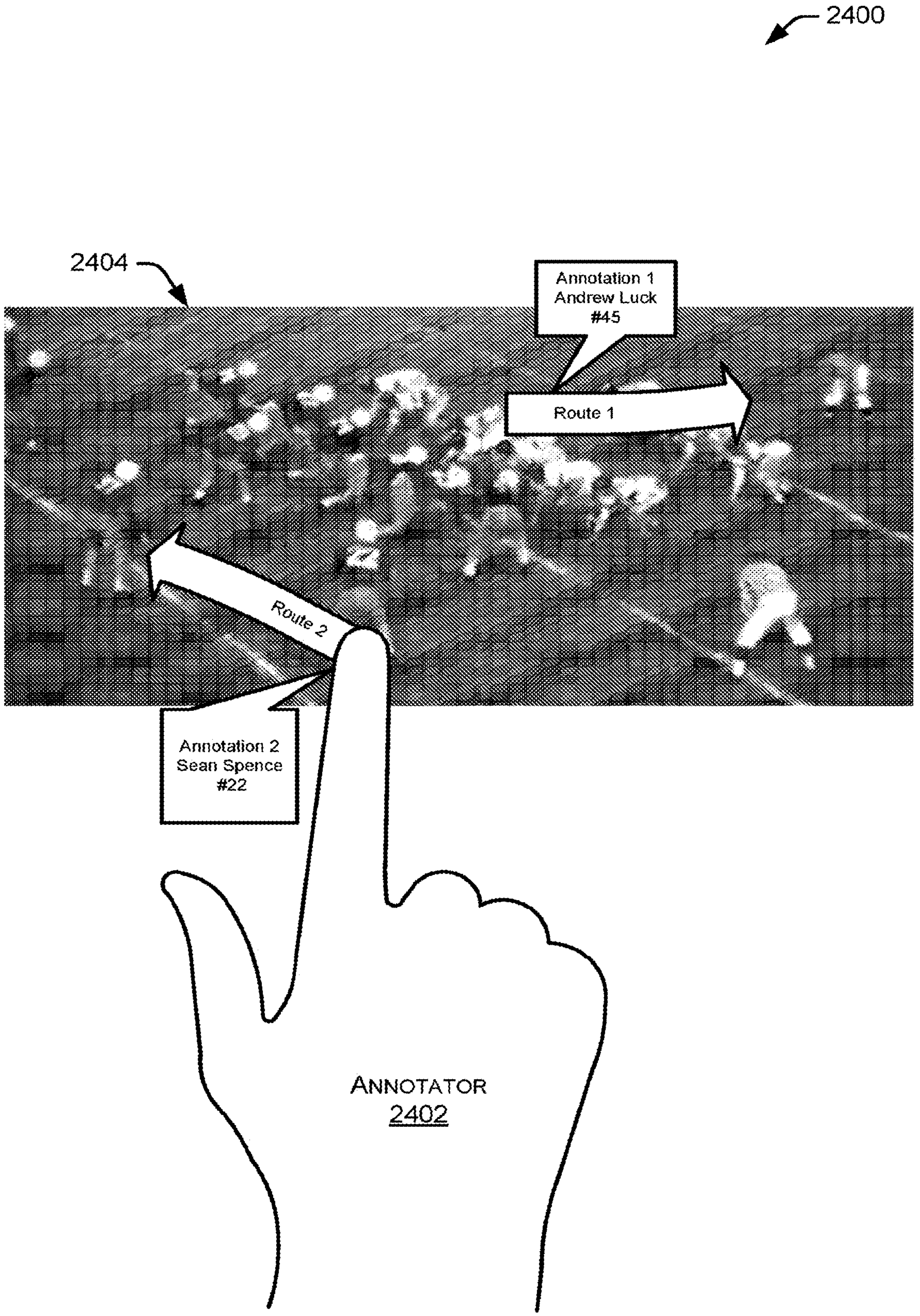
FIG. 24 is an example user interface that illustrates an example human based annotation technique.

As discussed above, there are many ways in which athletes can be identified in video content including both computerized and human based techniques. Various computer based techniques for identifying people and objects in video content and annotating the video content are described in the previous sections. FIG. 24 is an example user interface 2400 that illustrates an example human based annotation technique. One or more human annotators designate one or more athletes or other people or objects in the video content in substantially real time as the game or sporting event progresses. The athlete(s) may be identified by the annotator(s) touching a touch screen at locations corresponding to each of the athletes, pointing to locations of the athletes on the screen using a mouse or touch pad, gesturing to an area of a screen at which the athletes are located, or otherwise designating the athletes using some form of user input. Once an athlete is designated the annotator may add some identifying indicia, such as a name, number (jersey number or unique serial number), machine readable code, or the like. The identifying indicia may be input using a keyboard or other text based input device, voice input, dragging and dropping the indicia from a list or roster of athletes, or the like. In some examples, the annotator may additionally designate the athlete's route or motion on the display. In other examples, once the human identifies the athlete, the system may track the identified athlete using computerized object tracking techniques.

In the example of FIG. 24, an annotator 2402 has designated two athletes, Andrew Luck (#45) and Sean Spence (#22) by touching the location of each of the athletes on a touch screen display 2404. While (or after) touching the location of each of the athletes, the annotator 2404 identifies each athlete using voice input by speaking their respective names and jersey numbers. In other examples, other information may be included in the annotations, such as position, team, etc. The annotator 2404 then designates a route that each athlete moves in the video content by tracing their movements on the screen (Route 1 and Route 2, respectively). This annotation information (e.g., identifiers and route information) may then be appended to, or transmitted separately from, the video content to the one or more client devices directly or via one or more intermediary services. The annotation information may be used by the client device(s) and/or intermediary services to identify athletes of interest to each respective user. As discussed above, this sort of human based identification may be implemented by crowdsourcing (e.g., mechanical Turk, leveraging inputs by other users, etc.), analysts, officials, etc. prior to viewing of the game by a user.

Example Video Content Presentation Interface

Figure 25:
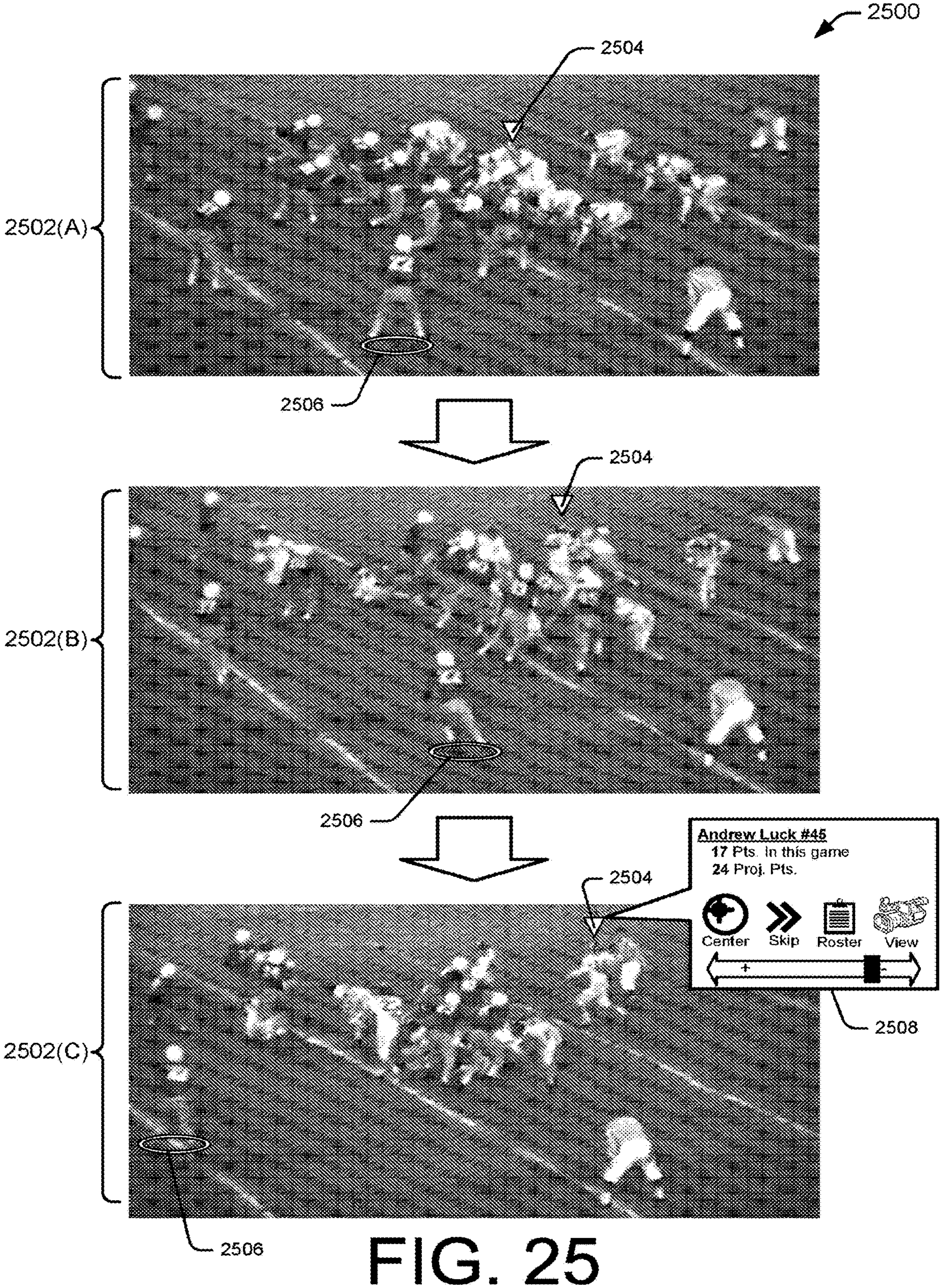
FIG. 25 illustrates a series of example user interface frames of video content that may be presented by a client device.

FIG. 25 illustrates a series 2500 of example user interface frames 2502(A), 2502(B), and 2502(C) of video content that may be presented by a client device. The user interface frames 2502(A), 2502(B), and 2502(C) represent a temporal progression of the video content, but are not mean to represent sequential frames of video content. Overlaid on the video content are multiple visual indicators (2504 and 2506 in this example), designating athletes that are on a fantasy roster of a user of the client device that is presenting the video content. As shown in a first interface frame 2502(A) in the series, a first athlete is designated by a triangular visual indicator 2504 and a second athlete is designated by a halo or ring 2506. Both visual indicators, 2504 and 2506, are located proximate to the respective athlete to whom they are associated. In this example, the triangular visual indicator 2504 is located above a head of one athlete, while the halo 2506 is located around the feet of a second athlete. In some examples, the location of the visual indicators relative to the respective athletes may be the same for all athletes (e.g., always located above the head), or may be different for different athletes (as in the illustrated example). The location of the visual indicator may be used to denote a difference in the athletes (e.g., on the user's fantasy roster, active, benched, on an opponent's fantasy roster, etc.) or to minimize obstruction of the other athletes (e.g., positioned so as not to overlap other athletes in the video content). The size, shape, color, hue, intensity, and other characteristics of the visual indicators may likewise be used to denote a difference in the athletes or to minimize obstruction of the other athletes.

As shown in the second frame 2502(B), the visual indicators have moved in accordance with the athletes with which they are associated. That is, visual indicators 2504 and 2506 move to track the respective positions of the athletes to which they are associated. The third frame 2502(C) shows a still further progression of the video content in which the visual indicators are again moved to track the locations of their respective athletes. Also, in the third frame 2502(C), a graphical user interface 2508 is presented in association with the triangular visual indicator 2504. In some examples, the graphical user interface 2508 may be presented in response to selection of the triangular visual indicator 2504 by the user (e.g., by touching a touch screen or any of the other input modes described herein). In other examples, the graphical user interface 2508 may be presented in response to the athlete associated with such indicator having possession of the ball, or in response to one or more other triggering event. The graphical user interface 2508 in this example includes fantasy statistics (number of points in this game, and projected points for the game) for the player (Andrew Luck in this example) associated with the visual indicator 2504, and a number of controls usable to control playback of the video content. Specifically, in the illustrated example, the controls include a "center" control, a "skip" control, a "roster" control, and a "view" control.

The "center" control is usable to center the displayed video on the athlete associated with the visual indicator. Doing so may result in zooming in on the athlete of interest and cropping a remainder of the video content.

The "skip" control is usable to skip to another (previous or subsequent) location in the video content depicting an event in which the athlete associated with the visual indicator was awarded or decremented fantasy points.

The "roster" control is selectable to open a fantasy roster interface by which the user can make updates or manage his or her fantasy roster. The roster interface may open in the graphical user interface 2508 or as a new window or popup on the display.

The "view" control may be used to select an alternate camera view of the events depicted in the video content. For instance, in the case that a content source transmits multiple video content feeds (e.g., as in the case of content feeds 1-J in FIG. 23), the "view" control may allow a user to switch between the multiple content feeds to see different camera angles or views of the events depicted in the video content.

Example Methods of Integrating Fantasy Information with Video Content

Figure 26:
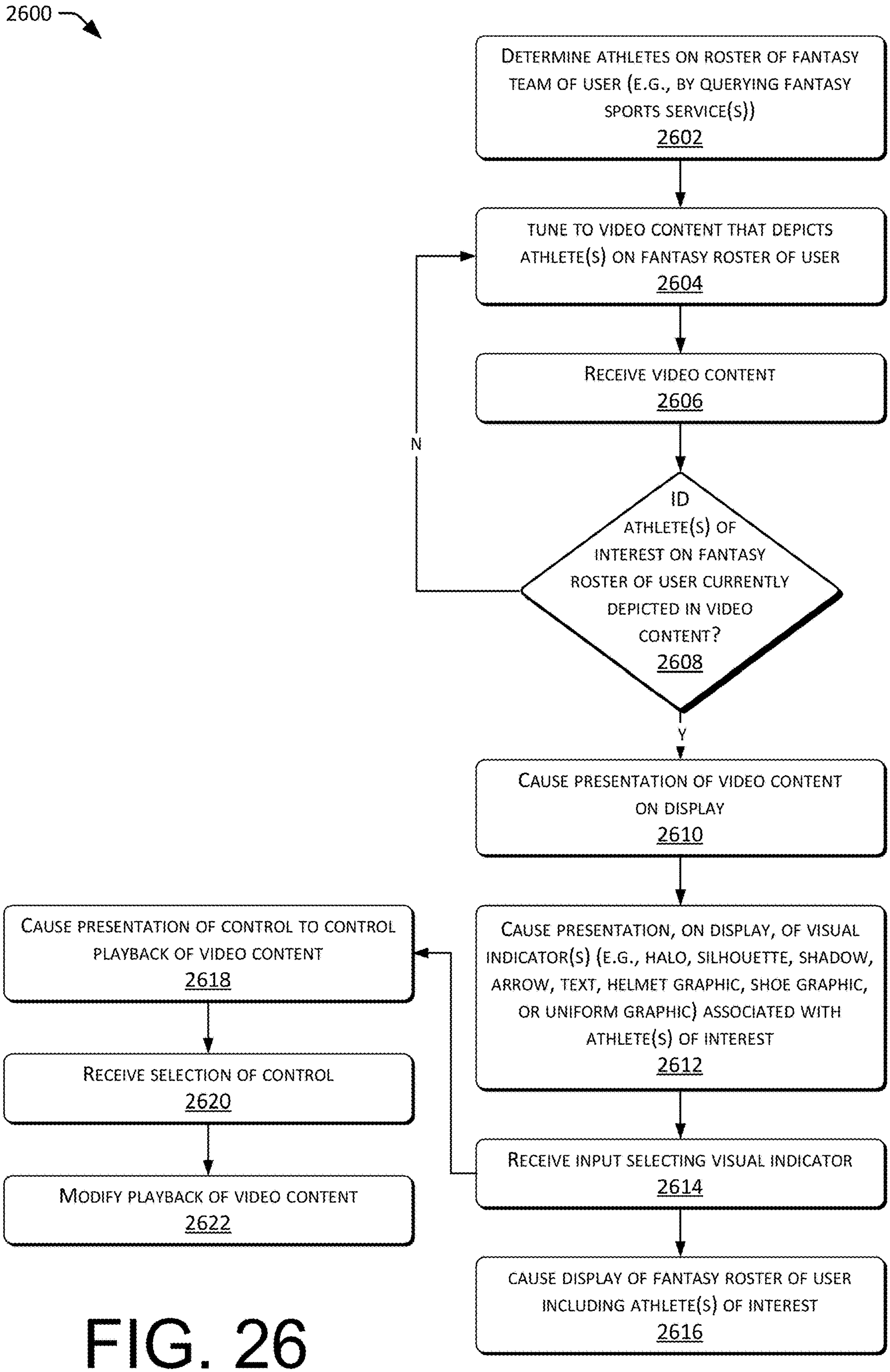
FIG. 26 is a flowchart illustrating an example process of integrating fantasy information with video content.

FIG. 26 is a flowchart illustrating an example process 2600 of integrating fantasy information with video content. Unless expressly described to the contrary, the example process 2600 may be performed in whole or in part by a content source such as content sources 104 and 2302, by a client device such as client devices 118 and 2306, and/or by an intermediary device such as interleaver service 114 and fantasy sports service 2308.

At 2602, a computing device determines athletes on a roster of a fantasy sports team of a user. In some examples, the computing device may comprise a client device such as client device 2306 which is located locally at a same location as a display on which the user views the video content. In that case, the client device may make the determination based on fantasy roster information stored in memory of the client device or by querying a remote fantasy sports service provider with which the user has an account via a network such as the Internet. Examples of such fantasy sports service providers include, without limitation, Yahoo! Fantasy Sports, NFL Fantasy Sports, CBS Fantasy Sports, Fox Fantasy Sports, ESPN Fantasy sports, Real Time Fantasy Sports, or any other fantasy sports service provider. In other examples, the determination may be made by a content source or intermediary device or service that is located at a site remote from the display on which the user views the video content.

At 2604, the computing device tunes to video content of a game or sporting event that depicts one or more athletes on one or more fantasy rosters of the user. Tuning to video content in this context includes tuning to an over the air television broadcast, tuning to a cable channel, tuning to a satellite channel, accessing the video content over the Internet or other network, or the like. In some examples, the video content comprises live video content of a game or sporting event. In other examples, the video content may be tape delayed, pre-recorded or the like. While in this example, the computing device tunes to video content that depicts athletes on a fantasy roster of the user, the computing device may additionally or alternatively tune to channels that depict other subjects of interest to the user (e.g., athletes on a roster of a current fantasy opponent, athletes on rosters of other league members, favorite athletes of the user, etc.). At 2606, the computing device receives the video content of the game or sporting event.

At 2608, the computing device determined whether one or more athletes of interest to the user are currently depicted in the video content. For example, the computing device may determine whether any of the user's fantasy players are currently on the field of play. If not, the computing device may return to 2604 to tune to other video content that depicts athletes on a fantasy roster of the user. Thus, the computing device may actively monitor available video content to tune to content that is currently depicting one or more athletes on a fantasy roster of the user. In this way, the user is readily able to view plays involving his or her fantasy athletes without the need to flip back and forth between channels. This helps to ensure that the user does not miss plays involving his or her fantasy players. Also, the techniques described herein greatly minimize the amount of time and effort required for a user to watch video content depicting his or her fantasy players.

If at 2608, the computing device determines that the video content depicts one or more athletes of interest to the user (e.g., on a fantasy roster of the user), the computing device may, at 2610, cause presentation of the video content on a display. The display may be integral with the computing device (e.g., in the case of a tablet computer or smart TV) or may be separate from the computing device (e.g., in the case of a personal computer or game console).

At 2612, the computing device may cause presentation, on the display, of a visual indicator associated with at least one athlete of interest. The visual indicator may highlight or otherwise identify the athlete of interest and indicate that the athlete of interest is on a roster of the fantasy sports team of the user. In this way, the user may more easily identify his or her fantasy players in the video content and will be better able to follow their play in the game or sporting event. In some examples, the visual indicator may be caused to be presented at or proximate to a location on the display at which the at least one athlete of interest is presented on the display. Additionally, in some examples, the visual indicator may track the motion of the at least one athlete of interest, such that when the at least one athlete of interest moves on the display, the visual indicator moves with the at least one athlete of interest. The visual indicator may take many different forms. By way of example and not limitation, each visual indicator may comprise a halo, silhouette, shadow, arrow, text, helmet graphic, shoe graphic, uniform graphic, symbol, icon, glow, outline, shape, or other indicator usable to designate an athlete of interest. The visual indicators may comprise application of a color, hue, and/or intensity to a portion of the video content to designate the athletes of interest. For instance, in one specific example of a visual indicator, a helmet and/or uniform of an athlete may be made to appear a different color, hue, and/or intensity in order to stand out.

In addition to calling attention to athletes of interest, the visual indicators may be interactive. Thus, at 2614, the computing device may receive an input or selection of a visual indicator by the user. Selection of the visual indicator may cause one or more different operations. For instance, as shown at block 2616, selection of the visual indicator may cause display of a fantasy roster of the user that includes the athlete of interest with which the visual indicator is associated. In that case, the roster may be overlaid on top of the video content as a pop up window or graphic, or the roster may replace the video content on the display. In another example, shown at block 2618, selection of the visual indicator may cause presentation of a control interface usable to control playback of the video content. Graphical user interface 2508 is an example of such a control interface. By way of example and not limitation the control interface may include a camera angle control usable to select an alternate camera view of the events depicted in the video content, a zoom control usable to zoom in or out on the athlete associated with the visual indicator, a center control usable to center the view on the athlete associated with the visual indicator, a replay control to replay a portion of the video content (e.g., the last 5 seconds, 10 seconds, 30 seconds, etc.) in regular or slow motion, a skip control to skip to a previous portion (or subsequent in the case of pre-recorded video content) of the video content depicting a play or event for which the athlete of interest was awarded or decremented fantasy points, or otherwise control the playback of the video content. Such controls may allow the user to view video content of athletes on his or her fantasy roster(s) in ways never before possible. Such additional viewing options may improve the user's understanding of how his or her fantasy athletes are performing, which in turn allows the user to better manage his or her fantasy team(s).

At 2620, the computing device may receive selection of a control of the control interface and, at 2622, may modify the playback of the video content according to the received selection of the control.

Figure 27:
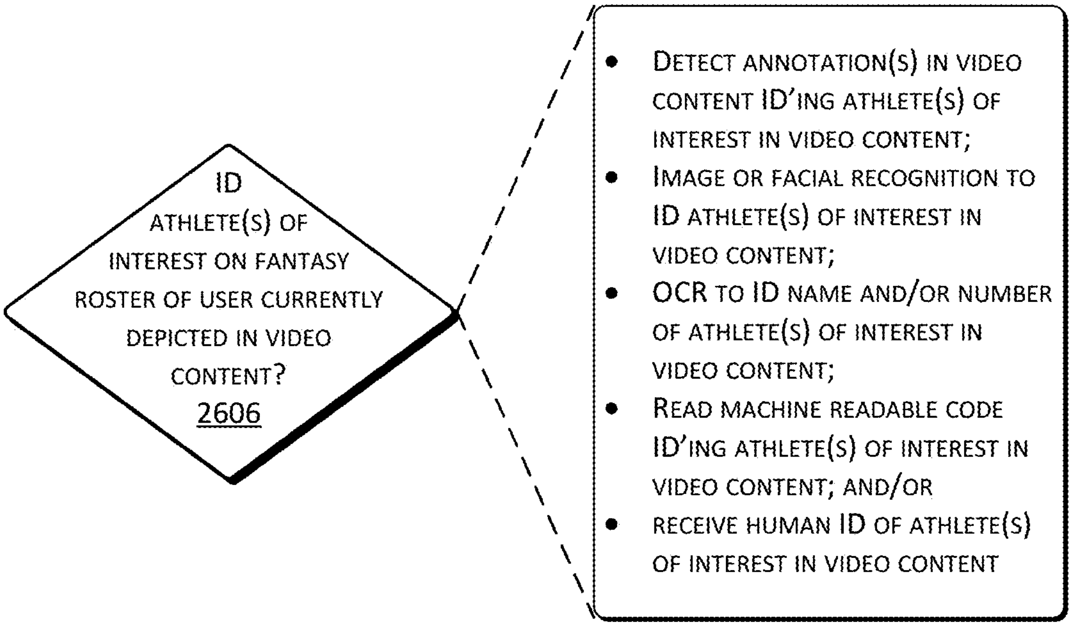
FIG. 27 illustrates example techniques for identifying or determining athletes of interest in the video content.

FIG. 27 illustrates example techniques for identifying or determining athletes of interest in the video content. As shown in FIG. 27, identification of athletes of interest in the video content may be performed by detecting one or more annotations in the video content identifying the at least one athlete of interest in the video content; using image recognition or facial recognition to identify the at least one athlete of interest in the video content; using optical character recognition to identify a name and/or number of the at least one athlete of interest in the video content; reading a machine readable code identifying the at least one athlete of interest in the video content; and/or receiving a human identification of the at least one athlete of interest in the video content.

While the method 2600 is described as being performed by a single computing device, in other examples, the method 2600 may be performed by multiple different computing devices (e.g., a client device, a content source, and/or an intermediary service).

Example Methods of Augmenting Video Content with Fantasy Information

Figure 28:
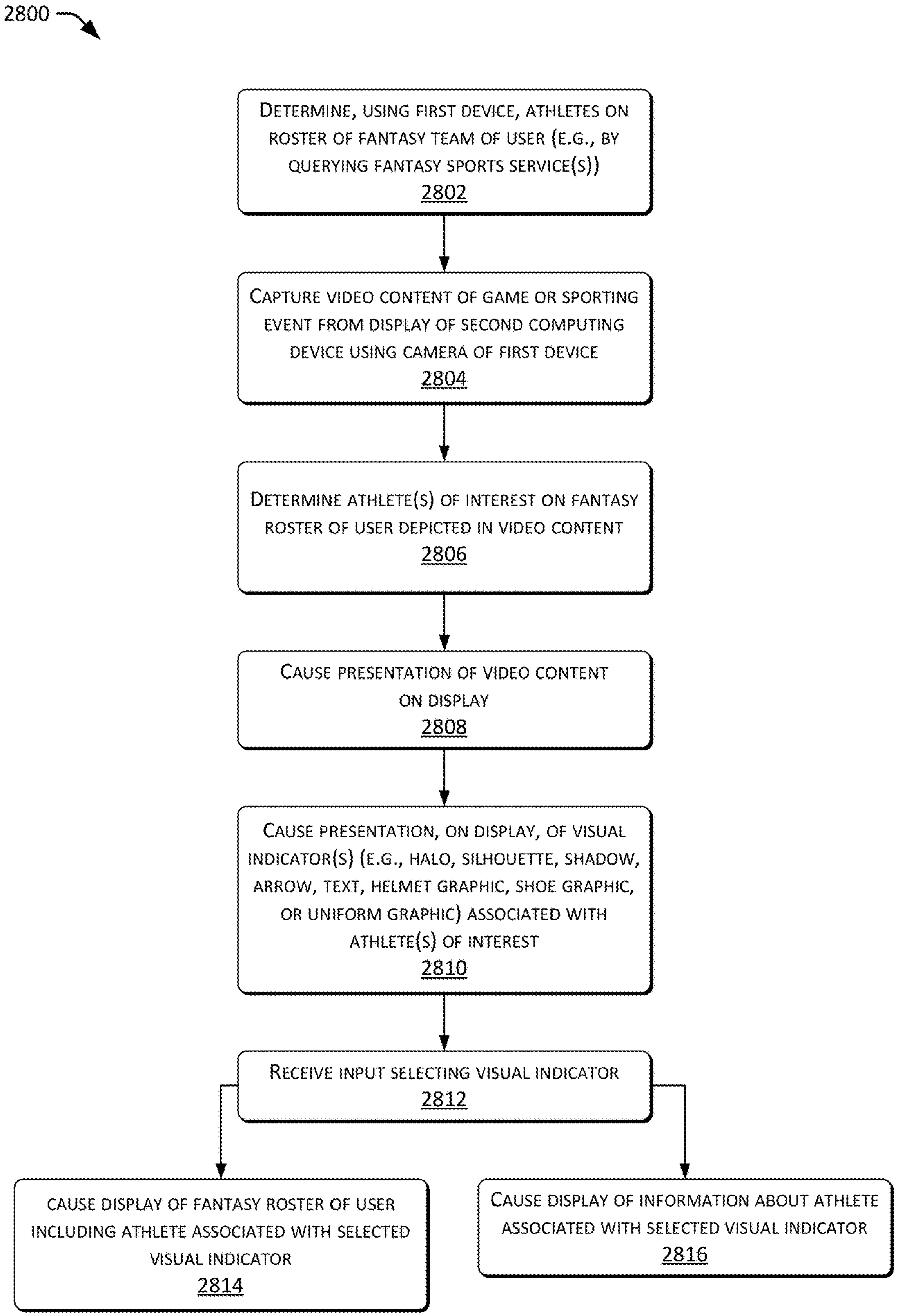
FIG. 28 is a flowchart illustrating an example method of augmenting video content with fantasy information.

FIG. 28 is a flowchart illustrating an example method 2800 of augmenting video content with fantasy information. The method 2800 may be performed by a tablet, mobile phone, or other client device having a camera. The method includes, at 2802, determining one or more athletes on a roster of a fantasy sports team of a user, or athletes otherwise of interest to the user. The client device may identify athletes on the roster of the fantasy sports team of the user by accessing roster information stored in memory or by querying a fantasy sports service provider with which the user has an account. At 2804, the client device captures video content of a game or sporting event from a display of another computing device using the camera. The video content of the game or sporting event may depict multiple athletes. At 2806, the client device identifies or determines at least one athlete of interest that is on the roster of the fantasy sports team of the user (or otherwise of interest to the user) and that is depicted in the video content of the game or sporting event on the display of the other device. The client device may identify or determine athletes of interest in the video content using any of the techniques described above.

At 2808, the computing device may cause presentation of the video content of the game or sporting event on a display of the client device (e.g., by reproducing the video content captured by the camera of the client device). At 2810, the client device may cause presentation, on the display of the client device, of a visual indicator associated with at least one athlete of interest. The visual indicator may augment the video content displayed on the display of the other device to clearly identify athletes that are on a fantasy roster of the user. As in the preceding section, the visual indicator may be presented at or proximate to a location on the display at which the athlete of interest is presented on the display and may track the motion of the athlete of interest, such that when the athlete of interest moves on the display, the visual indicator moves with the athlete of interest. The visual indicator may take the form of any of the visual indicators described in any of the preceding sections.

Using the techniques described in this section, the user may simply point a camera of his or her client device at a television or other display screen presenting conventional video content, and the client device may output augmented video content on a display of the client device that includes visual indicators to clearly designate the user's fantasy athletes. This makes it much easier for the user to keep track of the plays and movements of his or her fantasy athletes. Moreover, the user may interact with the visual indicators in order to view information about the athlete associated with the visual indicator and/or to cause display of a fantasy roster of the user that includes the athlete associated with the visual indicator. These techniques provide the user with greater access to information and provide the user with simpler access to manage fantasy rosters directly from within the video content viewing experience.

Example Methods of Annotating Video Content with User-Specific Fantasy Information FIG. 29 is a flowchart illustrating an example method 2900 of annotating video content with user-specific fantasy information. The method 2900 may be performed by a content source (e.g., broadcaster, distributor, cable provider, or the like) such as content source 2302.

The method 2900 includes, at 2902, receiving video content from one or more cameras depicting a game or sporting event. Each camera may record a separate video feed of the game or sporting event from a different angle or vantage point. At 2904, a computing device of the content source may determine one or more athletes on a roster of a fantasy team of a user. In some examples, the determination of athletes on the user's fantasy roster may be performed, at 2906, by querying a fantasy sports service provider with which the user has an account, and receiving a response from the fantasy sports provider indicating athletes on the roster of the user's fantasy sports team. In other examples, at 2908, the computing device of the content source may prompt the user to enter athletes on his or her fantasy sports rosters, and may receive user input by text, voice, selection, and/or gesture, indicating the athletes on the user's fantasy roster. In some examples, the prompt may be presented on a client device of the user and the input may be received via the user's client device and transmitted to the computing device of the content source.

At 2910, the computing device of the content source may identify at least one athlete of interest that is on the roster of the fantasy sports team of the user and is depicted in at least one video feed of the video content of the game or sporting event. At 2912, the computing device of the content source may annotate the video content of the game or sporting event to include a visual indicator of the at least one athlete of interest. The video content may be annotated automatically using any of the computerized techniques described herein, manually using any of the human based techniques described herein, or using a combination of computerized and manual techniques. In some examples, at 2914, annotating the video content may include modifying the video content such that the visual indicator will be displayed at or proximate a location on a display at which the athlete of interest will be displayed on the display. Additionally or alternatively, the annotation may configure the visual indicator to track a motion of the athlete of interest such that the visual indicator will move with the athlete of interest.

At 2918, the computing device of the content source may provide the annotated video content to a client device of the user (e.g., by transmitting the annotated video content to the client device via a network such as the Internet) for presentation on a display at the user's location.

Example Multi-Camera System

In some implementations, a single video feed may be provided by a network covering a particular sporting event (e.g., a football game). That feed may be segmented, the segmentations annotated with athlete performance and/or fantasy point information, and the segmentations may be transmitted to particular users based on an interleaver that considers fantasy information of each user.

In other implementations, a plurality of video feeds from a plurality of cameras may be provided by a network or other entity. The plurality of video feeds may include the output of a number of cameras that the network has available. Accordingly, a game broadcast by a network may include video selected from each of the number of cameras as the network switched between cameras. However, video from unselected cameras may include substantial content. This content may actually be valuable to show performances by athletes for which fantasy points may be awarded. Accordingly, video segments from several cameras may be concatenated together to fully illustrate an athletic performance of an athlete for which fantasy points may be awarded. Such concatenated segments may be sent to users that have an interest in the fantasy points or athletic performance shown.

In one example, a plurality of cameras at a sporting event may provide a plurality of different video feeds, and may show different players or locations. In the example of a football game, several of the cameras may provide different views as athlete(s) deliver performance(s) sufficient for the award of fantasy points. Content from the plurality of cameras may be segmented. Each segment may show all or part of a play, and may focus on one or more athletes or aspects of play. Segments from among the plurality of segments may be concatenated to provide a comprehensive account of a performance by an athlete sufficient for award of fantasy points. The views may include different camera angles, camera speeds, and/or different accompanying audio tracks. The concatenated segments may be transmitted to selected users. Users may be selected based in part on a user's fantasy team, fantasy league or opposing fantasy team.

Figure 30:
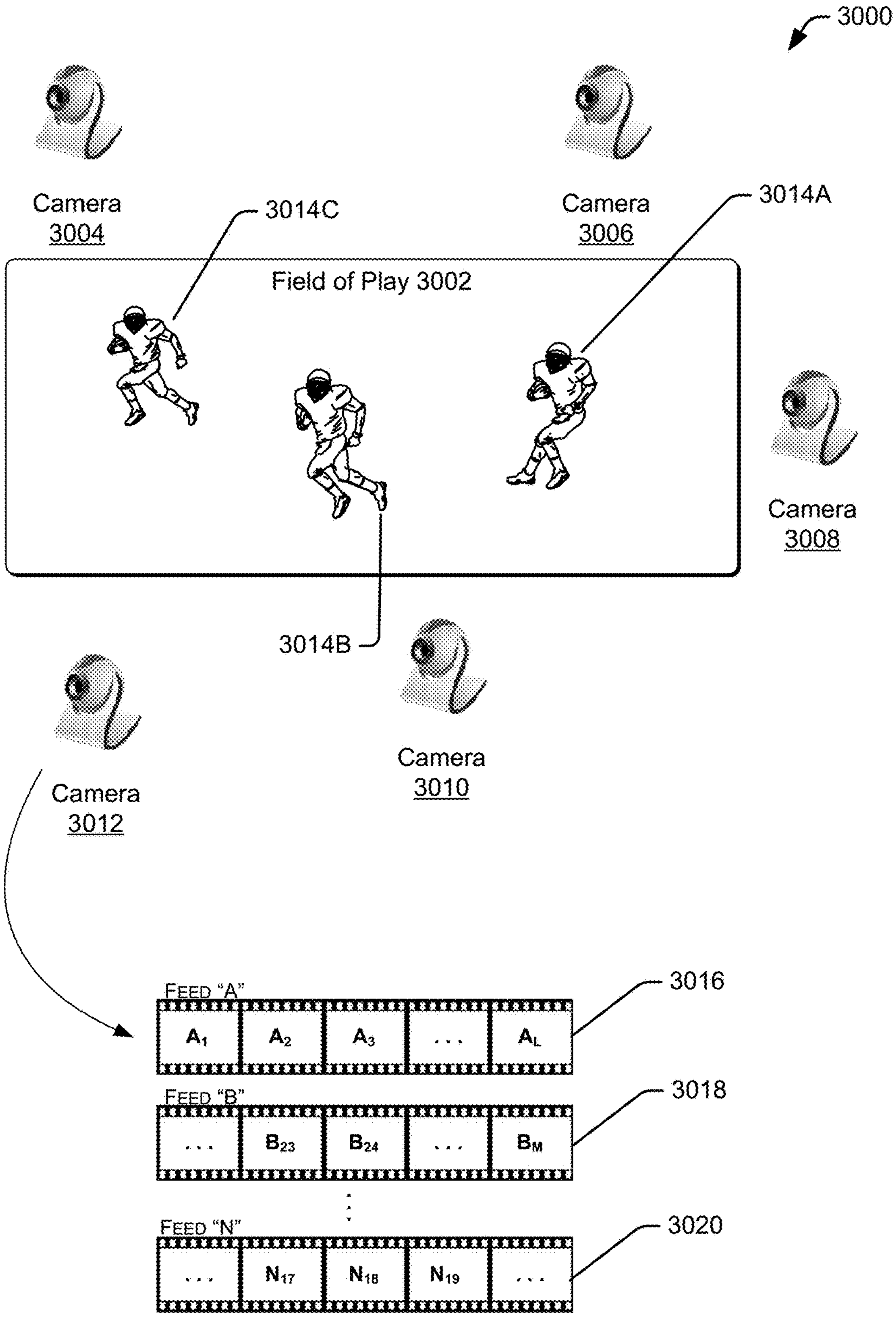
FIG. 30 is a diagram showing an example multi-camera system configured to provide a plurality of video feeds.

FIG. 30 shows an example implementation by which video output from multiple cameras may be utilized to provide a comprehensive description of an athlete's performance for which fantasy points may be awarded. A field of play 3002 (e.g., a football field, baseball diamond, etc.) is associated with a plurality of cameras. The number of cameras may vary between installations, but in the example shown camera 3004-3012 provide coverage of the game. A television network may utilize each camera, one at a time, during a broadcast. However, all of the camera may provide output in a continuous manner.

On the field of play 3002, one or more athletes may perform in a manner consistent with the award of fantasy points. The fantasy points may be awarded by a fantasy sports platform, the interleaver service 114 (FIG. 1) or other entity. In the example of FIG. 30, an athlete 3014 is shown in a sequence of positions 3014A, 3014B and 3014C. In each position, the athlete may be visible to a plurality of camera. However, in different locations on the field of play 3002, different video camera may be better suited to provide content to users. For example, at location 3014A, cameras 3006 and 3008 may provide preferred views, while at location 3014B camera 3010 provides a preferred view. A broadcast network may or may not use a camera which best shows any particular athlete, in part because they may be more concerned with an overall best view.

Each video camera provides a video feed as output. In the example shown, a plurality of video feeds 3016-3020 is shown. Each of the video feeds 3016-3020 may be used by a broadcast network, frequently or infrequently, during the course of a televised broadcast. However, unless a split picture is provided by the network, only one video feed is used at a time. Accordingly, a considerable unused content is potentially available.

Figure 31:
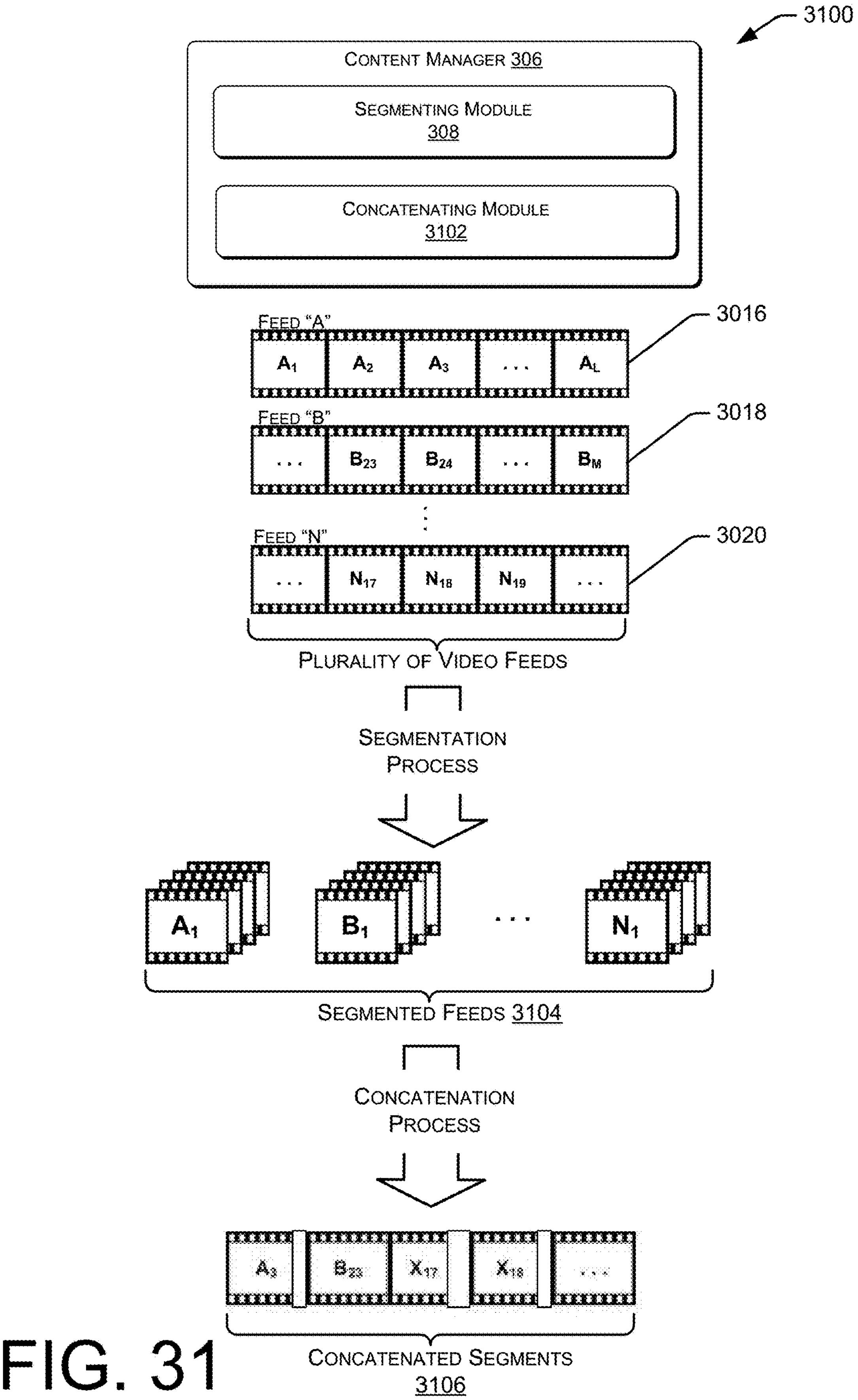
FIG. 31 is a diagram showing example techniques for content segmentation and concatenation.

FIG. 31 shows a version of the content manager (originally shown in FIG. 3) that is adapted to utilize the otherwise unused content provided by unused cameras. The content manager 306 may include a segmenting module 308 and a concatenating module 3102. The segmenting module 308 may be configured to segment content from the plurality of video feeds 3016-3020 into a plurality of segments. The segmentation may be made in a manner that segregates "plays" or other portions of a game into particular segments. In one example, the video feed 3016 has been segmented into segments A1, A2 through AL. Other segments 3018, 3020 are similarly segmented. The video feeds may be segmented according to "plays." However, some video feeds may be relevant for only one or more portions of a particular play, and segments may be made each of the relevant portions. Thus, the plurality of video feeds 3016-3020 undergoes a segmentation process to thereby create a plurality of segments 3104.

The concatenating module 3102 is configured to concatenate different segments from among the plurality of segments 3104, and to thereby create concatenated segments 3106. Accordingly, a plurality of different and/or complementary views (e.g., segments of the plurality of feeds 3016-3020) of an athlete's performance may be concatenated together. Some of the views may have been obtained from each of several different cameras, a single camera at several different times, or some combination of these. Thus, the concatenating module 3102 inputs segments 3104 obtained from a plurality of feeds 3016-3020 and outputs concatenated segments 3106.

FIG. 32 shows an example method by which content from a plurality of cameras may be segmented. The segments may correspond to "plays" or other portions of a game. A plurality of the segments may be concatenated together to provide a comprehensive account of a performance by an athlete, which may be consistent with the award of fantasy points. The concatenated segments may be sent to particular users, based upon an interest of the user in the athlete's performance and/or the award of fantasy points.

At block 3202, content may be segmented into a plurality of segments. The content may include a plurality of feeds associated with a plurality of video cameras. The video camera may show different views of a same sporting event.

At block 3204, segments may be concatenated to form a comprehensive account of an athlete's performance. The segments may be from among the plurality of segments, and may show a performance by an athlete sufficient for award of fantasy points.

At block 3206, the concatenated segments may be transmitted to particular users based at least in part on the athlete being on fantasy teams of interest to those particular users.

A method of providing data to clients may be performed under control of one or more processors configured with executable instructions. The content may be segmented into a plurality of segments. The segments may depict performance(s) related to awards of fantasy points. The content may include a plurality of feeds associated with a plurality of video cameras that show different views of a same sporting event. Once segmented, some of the plurality of segments may be concatenated. The concatenated segments show a performance by an athlete sufficient for award of fantasy points. This may includes a pass, a catch, a tackle or other performance. The concatenated segments may be transmitted to particular users based at least in part on the athlete being on fantasy teams of interest to the particular users. The segmenting the may be based at least in part on a play clock or a game clock. The segmenting the content may be based at least in part on recognition of a player formation, such as players lined up on the line of scrimmage, a pitcher holding the baseball on the mound, basketball players gathered for a jump ball, etc. The segmenting may associate an audio portion of a first segment with a second segment. For example, the audio of a less helpful video segment may be moved to a more helpful or illustrative video segment. The concatenating may include concatenating segments recorded at least partially at the same time. That is, various video cameras may be recording relevant information at the same time, and such content may be segmented and concatenated. The concatenating of the segments may include concatenating segments from at least two of the plurality of video cameras. The concatenating may included include or combine a slow-motion version of one of the plurality of segments to other segments. The concatenating may link two segments from among the plurality of segments, wherein an intervening period of time separates the creation or filming of the concatenated segments.

A system may be used to segment, concatenate and transmit a compound or concatenated segment to a plurality of users, based at least in part on an athletic performance sufficient to award fantasy points and fantasy teams, leagues, opponents, etc., of the users. A content manager in the system may segment content into a plurality of segments, wherein the content comprises a plurality of feeds associated with a plurality of cameras. The content manager may also concatenate segments from among the plurality of segments that show a performance of an athlete sufficient for award of fantasy points and that show a plurality of different camera angles of the performance. The system may include a serving module to transmit the concatenated segments to particular users based at least in part on fantasy team associations of the particular users. The system may recognizes a number of the fantasy team associations of the particular users, such as fantasy team rosters, fantasy sport leagues or fantasy team opponents. The system may include a content manager to segment the content based at least in part on input received from an operator. In an example, the operator would consider where to start and end segments made from the content of different video cameras. The content manager may segments the content based at least in part on automated techniques that show game play sufficient to award fantasy points. For example, the automated techniques may recognize changes in the scoreboard, the play clock, referee signals and other events to indicate a starting point and an ending point for various content segments. The content manager may sequentially order the concatenated segments with a segment used by broadcast TV first. The segment used in broadcast TV may have an audio track that provides a preferred description of the events, and may be used to put subsequent segments in context. The content selection module may concatenate segments of different length (duration in time) and/or camera angle. The content manager may concatenate segments to depict additional performances of the athlete sufficient for award of the fantasy points. Thus, after a currently performance is shown, other past performances may be shown. Such a grouping of present and past performances may provide users with more information regarding an athlete. Similarly, the content manager may create a concatenated segment for each of a plurality of performances of a plurality of athletes, each performance sufficient for award of fantasy points.

A further method may provide data to clients and may be performed under control of one or more processors configured with executable instructions. In an example, each of a plurality of feeds associated with a plurality of video cameras may be segmented. The segments may be selected to show different views of a performance by an athlete sufficient for award of fantasy points. The segments may be concatenated from among segments that show the performance from a plurality of camera angles. The concatenated segments may be transmitted to particular users based at least in part on the athlete being on particular fantasy teams or in particular fantasy leagues. The segmenting of each of the plurality of feeds may include segmenting portions of the plurality of feeds based at least in part on a particular play in a football game. The segmenting each of the plurality of feeds may include segmenting the feeds to highlight the performance of the athlete and to show different views of the sporting event that overlap in time. The concatenating of segments may include concatenating segments used by replay officials. Generally, content from any camera at the sporting event may be segmented, concatenated with other segments to form a concatenated segment that may be transmitted to users. The users to which the content is transmitted may be selected based on fantasy points, fantasy teams, fantasy leagues and/or fantasy opponents.

A method of providing data to clients, comprising: under control of one or more processors configured with executable instructions: segmenting content into a plurality of segments, wherein the content comprises a plurality of feeds associated with a plurality of video cameras that show different views of a same sporting event; concatenating segments from among the plurality of segments, wherein the concatenated segments show a performance by an athlete sufficient for award of fantasy points; and transmitting the concatenated segments to particular users based at least in part on the athlete being on fantasy teams of interest to the particular users. The method, wherein the segmenting the content comprises: segmenting the content based at least in part on a play clock or a game clock. The method, wherein the segmenting the content comprises: segmenting the content based at least in part on recognition of a player formation. The method, wherein the segmenting the content comprises: associating an audio portion of a first segment with a second segment. The method, wherein concatenating the segments comprises: concatenating segments recorded at least partially at the same time. The method, wherein concatenating the segments comprises: concatenating segments from at least two of the plurality of video cameras. The method, additionally comprising: concatenating a slow-motion version of one of the plurality of segments. The method, wherein concatenating the segments comprises: concatenating two segments from among the plurality of segments, wherein an intervening period of time separates the concatenated segments.

A system, comprising: a content manager to: segment content into a plurality of segments, wherein the content comprises a plurality of feeds associated with a plurality of cameras; and concatenate segments from among the plurality of segments that show a performance of an athlete sufficient for award of fantasy points and that show a plurality of different camera angles of the performance; and a serving module to transmit the concatenated segments to particular users based at least in part on fantasy team associations of the particular users. The system, wherein the fantasy team associations of the particular users comprise fantasy team rosters, fantasy sport leagues or fantasy team opponents. The system, wherein the content manager segments the content based at least in part on input received from an operator. The system, wherein the content manager segments the content based at least in part on automated techniques that show game play sufficient to award fantasy points. The system, wherein the content manager sequentially orders the concatenated segments with a segment used by broadcast TV first. The system, wherein the content selection module concatenates segments of different length and camera angle. The system, wherein the content manager concatenates segments to depict additional performances of the athlete sufficient for award of the fantasy points. The system, wherein the content manager creates a concatenated segment for each of a plurality of performances of a plurality of athletes, each performance sufficient for award of fantasy points.

A method of providing data to clients, comprising: under control of one or more processors configured with executable instructions: segmenting each of a plurality of feeds associated with a plurality of video cameras that show different views of a performance by an athlete sufficient for award of fantasy points; concatenating segments from among the plurality of segments to show the performance from a plurality of camera angles; and transmitting the concatenated segments to particular users based at least in part on the athlete being on particular fantasy teams or in particular fantasy leagues. The method, wherein the segmenting each of the plurality of feeds comprises: segmenting portions of the plurality of feeds based at least in part on a particular play in a football game. The method, wherein the segmenting each of the plurality of feeds comprises: segmenting the feeds to highlight the performance of the athlete and to show different views of the sporting event that overlap in time. The method, wherein concatenating segments comprises: concatenating segments used by replay officials.

A plurality of cameras at a sporting event may provide a plurality of different video feeds, and may show different players or locations. In the example of a football game, several of the cameras may provide different views as athlete(s) deliver performance(s) sufficient for the award of fantasy points. Content from the plurality of cameras may be segmented. Each segment may show all or part of a play, and may focus on one or more athletes or aspects of play. Segments from among the plurality of segments may be concatenated to provide a comprehensive account of a performance by an athlete sufficient for award of fantasy points. The views may include different camera angles, camera speeds, and/or different accompanying audio tracks. The concatenated segments may be transmitted to selected users. Users may be selected based in part on a user's fantasy team, fantasy league or opposing fantasy team.

Example Video Content Presentation Interface

Figure 33A:
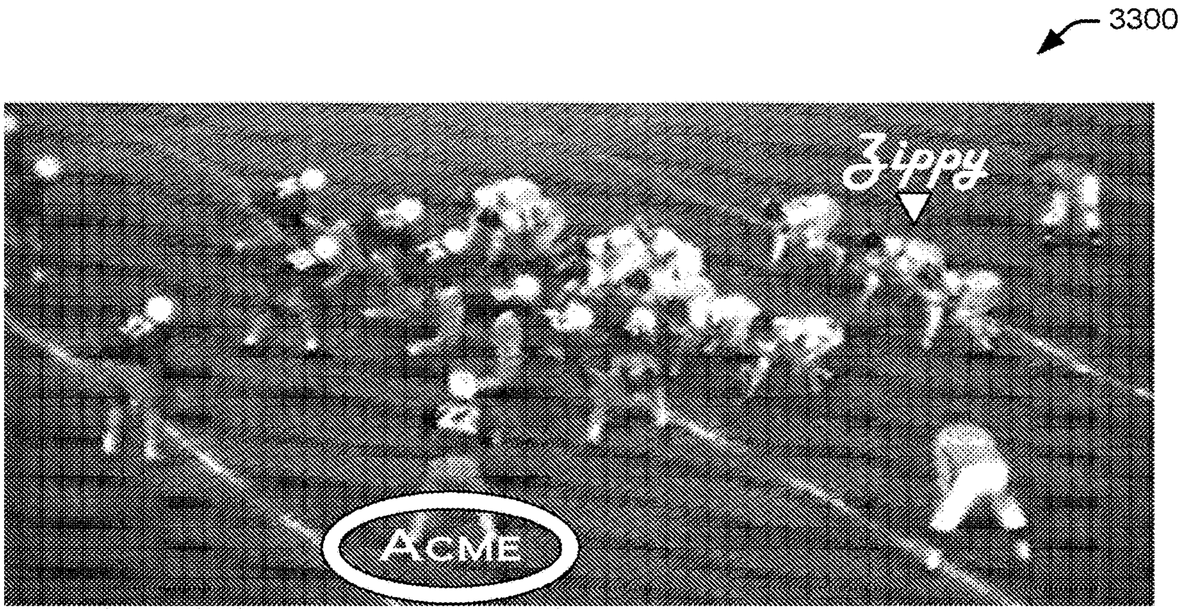
FIG. 33A is an example use interface depicting a visual indicator associated with an entity.

FIG. 33A illustrates an example user interface 3300 which can be presented on a display screen of a client device of a user, such as display 2310 or a display screen of one of client devices 118, for example. The user interface 3300 includes a display area for depicting video content of a game or sporting event. However, in other examples, other types of video content may be depicted. The video content in this example depicts multiple athletes. The video content may be received by the client device from one or more content sources (e.g., content sources 104 or 2302). In some examples, the video content of the game or sporting event may be a live broadcast, with or without a slight tape delay.

The client device (e.g., client device 118 or 2306) or a service or device remote from the display (e.g., interleaver service 114, content source 102 or 2302, data source 108, fantasy sports service 2308, etc.) determines athletes on a roster of a fantasy sports team of the user. In some examples, the athletes on the roster of the fantasy sports team of the user may be determined by querying one or more fantasy sports services with which the user has an account (e.g., Yahoo Fantasy Sports, ESPN Fantasy Sports, Fox Fantasy Sports, Draft Kings, Fan Duel, etc.) to obtain the user's fantasy roster information from the respective fantasy sports service(s). This may be accomplished by, for example, logging in to the fantasy sports service with the user's login credentials (e.g., user name and password), login credentials of another user in the user's fantasy league, an application programming interface (API) of the fantasy sports service, or the like. In other examples, the user may input or otherwise provide the list of athletes on the fantasy sports team(s) of the user. In still other examples, the user may identify one or more athletes of interest that are not on a roster of the user's fantasy sports team(s).

The client device may then identify at least one athlete that is depicted in the video content of the game or sporting event and is of interest to the user. An athlete may be of interest to the user because the athlete is on a roster of a fantasy sports team of the user, is on a roster of a fantasy sports team of an opponent or other member of a fantasy sports league in which the user participates, or because the user has indicated that the athlete is of interest (e.g., a favorite player), for example.

The client device may cause presentation of the video content of the game or sporting event on the display. Along with the video content of the game or sporting event, the client device may cause presentation on the display of visual indicators associated with the one or more athletes of interest to indicate that the athletes of interest are currently being depicted on the display. The visual indicator may indicate why the athlete is of interest to the user (e.g., that the athlete is on a roster of a fantasy sports team of the user, is on a roster of a fantasy sports team of an opponent or other member of a fantasy sports league in which the user participates, or because the user has indicated that the athlete is of interest, etc.). In some examples, the visual indicators are caused to be presented at or proximate to locations on the display at which the respective athletes of interest are presented on the display. In some examples, each visual indicators may track the motion or location of the respective athlete of interest on the display screen, such that as the athlete of interest moves, so does the visual indicator. The visual indicators may be constant (e.g., a constant shape, size, color, etc.) or may be dynamic or variable (e.g., changing in size, shape, color, intensity, etc.) over time. In one example, a visual indicator may appear to rotate or spin as it tracks the motion of the athlete of interest.

In some examples, the visual indicator comprises an identifier of an entity, such as a company or organization. For example, the identifier may comprise a logo, symbol, or text of the entity. In some examples, the identifier of the entity may comprise a name, symbol, or logo, or text identifying a company sponsoring the game or sporting event which is being presented, a fantasy sports provider with which the user has an account, or another company. The client device or other computing device may select a particular visual indicator (e.g., logo, symbol, text, name, etc.) to present as the visual indicator based at least in part on one or more preferences, interests, or actions of the user. For example, if the user has explicitly or implicitly expressed interest in a topic, the visual indicator may be chosen based at least in part on the topic. By way of example and not limitation, if the user has expressed an interest in purchasing a truck (e.g., by searching for the term "truck" or for a specific truck or type of truck using a search engine, by clicking on a link or advertisement for a truck, by watching a video about trucks or tagged with the term truck, by writing a post about trucks on a social networking site or micro blogging site, or the like), the visual indicator may be selected to be a company that sells trucks. In another example, if the user has previously ordered an item (e.g., pizza), the visual indicator may be associated with a pizza company (e.g., Zippy's pizza). In some examples, different visual indicators may be used to represent different athletes of interest. For instance, in FIG. 33A, a first athlete of interest is designated with a first visual indicator ("Zippy") and a second athlete of interest is designated with a second visual indicator ("Acme"). In some examples, the visual indicators may be of competitors (e.g., companies that sell similar or competing products). In other examples, multiple instances of a same visual indicator may be used to designate multiple different athletes of interest. The visual indicators may be sent to the client device by a content provider (e.g., content sources 102 or 2302), fantasy sports provider (e.g., fantasy sports service 2308), ad provider (e.g., ad source 112), or other service (e.g., interleaver 114). In some examples, the visual indicator may be designated by or appended to the video content itself (e.g., as metadata appended to the video content).

Figure 33B:
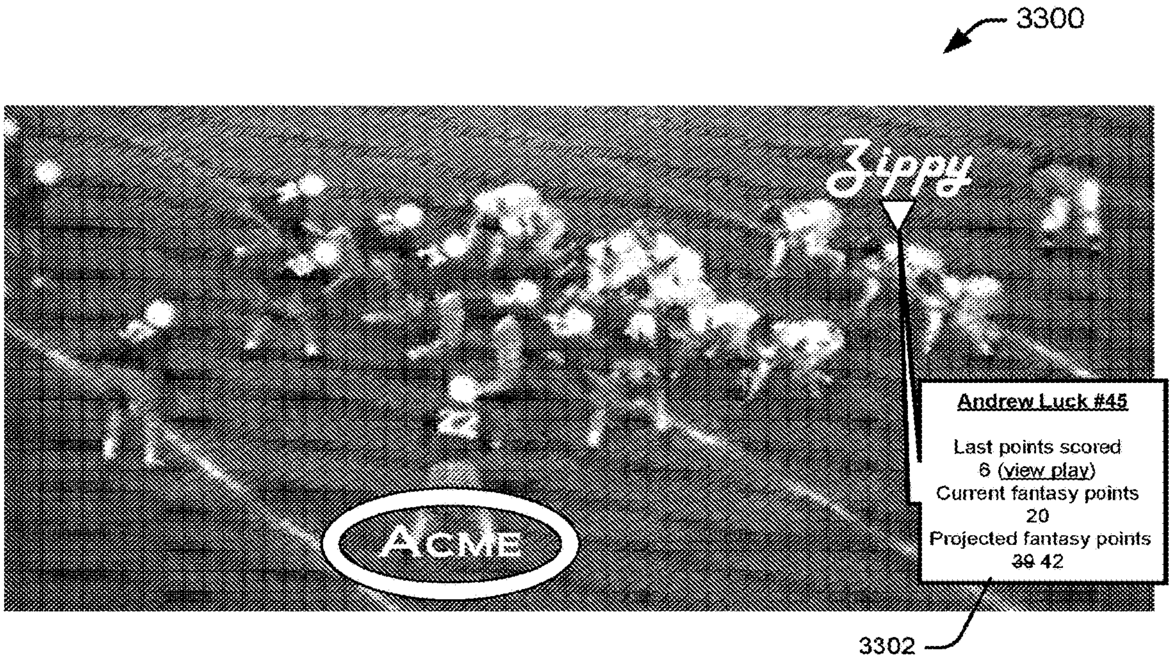
FIG. 33B is an example use interface depicting an interactive visual indicator that is selectable to present additional information about an athlete of interest.

In some examples, the visual indicators may be interactive. That is, by touching (e.g., using a touch screen), saying the name of (e.g., using voice input), looking at (e.g., using eye tracking input), gesturing (e.g., using a gesture input camera), or otherwise selecting a visual indicator, a user may invoke some action. For instance, in response to receiving an input selecting the visual indicator associated with an athlete of interest, the computing device may cause presentation of an updated projected fantasy score for the athlete of interest. The updated projected fantasy score may be based at least in part on a portion of the game or sporting event remaining. The updated projected fantasy score may be computed as described with respect to FIG. 11. FIG. 33B illustrates an example in which a user has selected the Zippy visual indicator and, in response to selection of the visual indicator, additional information 3302 about the athlete of interest is presented. In the example shown in FIG. 33B, the athlete of interest is Andrew Luck, and the additional information 3302 includes an indication of a last play for which Andrew Luck was awarded fantasy points (six points) and a link to view the last play, a current total fantasy points to this point in the game (20 points), an original projected number of fantasy points (30 points which is struck through), and an updated projected fantasy point total (42 points) based at least in part on a portion of the game remaining.

Figure 34A:
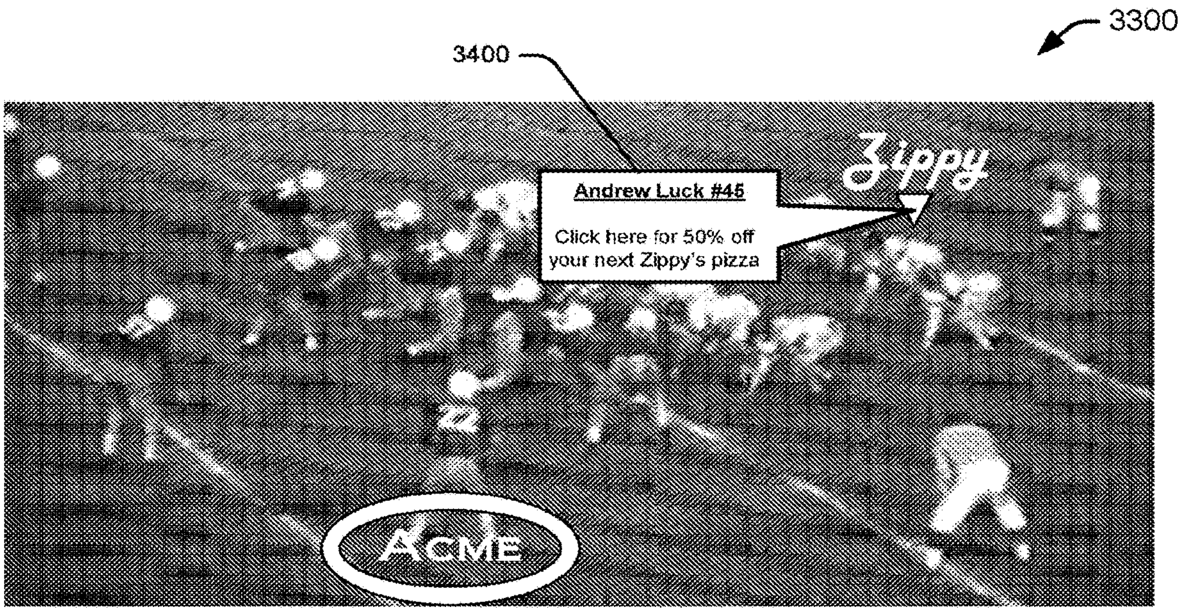
FIG. 34A is an example use interface depicting an interactive visual indicator that is selectable to present a coupon of an entity.
Figure 34B:
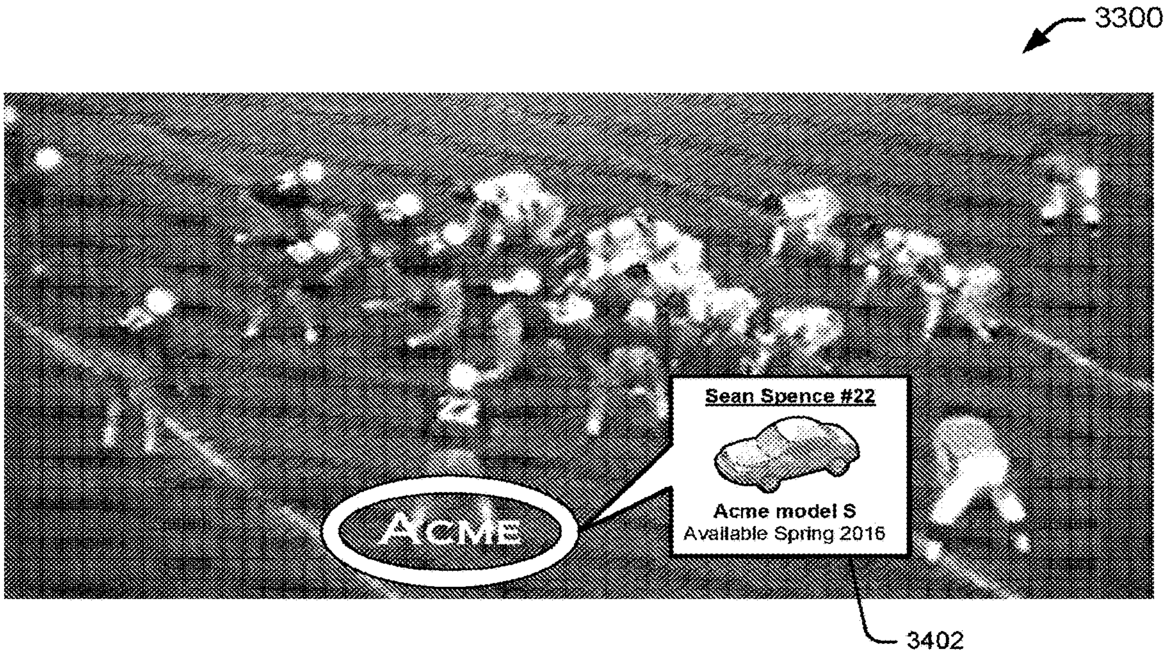
FIG. 34B is an example use interface depicting an interactive visual indicator that is selectable to present an ad for an entity.

In another example, in response to receiving an input selecting the visual indicator associated with an athlete of interest, the computing device may cause presentation of an advertisement for, or coupon redeemable at, an entity, such as a company sponsoring the game or sporting event, a fantasy sports provider, a maker of the client device, or another entity. FIG. 34A and FIG. 34B illustrate such examples. As shown in FIG. 34A, responsive to selection of the Zippy visual indicator, the client device causes presentation of the name of the athlete of interest, as well as a coupon 3400 for 50% off a pizza at Zippy's pizza. The user is invited to click on the coupon 3400 to place an order for Zippy's pizza using the coupon 3400. FIG. 34B illustrates an example in which, responsive to selecting the Acme visual indicator, an ad for an Acme product, the Acme Model S vehicle is caused to be presented to the user. In this example, the ad is overlaid on the video content as a popup or window. However, in other examples, the ad may be presented in other ways. For instance, the "Acme" visual indicator may transform into an image of the Acme Model S, which may be used to designate the athlete of interest.

Figure 35A:
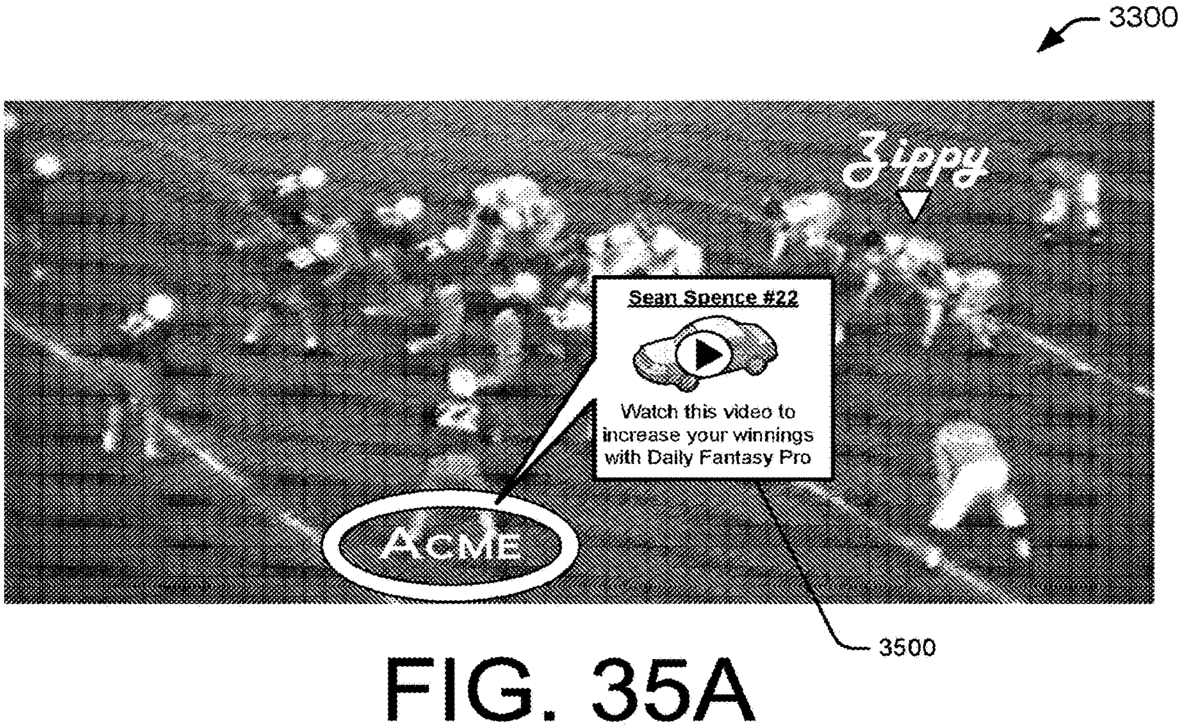
FIG. 35A is an example use interface depicting an interactive visual indicator that is selectable to present a video ad promotion usable to increase an award pot for a fantasy sports contest.

In another example, in response to receiving an input selecting the visual indicator associated with an athlete of interest, the computing device may cause presentation of an ad. FIG. 35A illustrates an example in which an ad 3500 for the Acme Model S is presented to the user. The ad includes an embedded video clip and an invitation to the user to view the video clip. In this example, the user is enticed to view the video by an offer to increase their potential winnings in a daily fantasy sports contest in which they are a participant. Specifically, in this example, the user is participating in a daily fantasy sports contest with a company called Daily Fantasy Pro. The winner of the daily fantasy sports contest wins a cash award or "pot." If the user watches the video of the Acme Model S, Acme has offered to increase the value of the pot. The increase may be an absolute dollar value (e.g., $5) or a multiplier of an already existing pot (e.g., double the pot). Thus, if the user clicks on the ad, the value of the pot will be increased. In some examples, the increase in the value of the pot is applicable only if the user wins the contest, not if another player wins the contest.

Figure 35B:
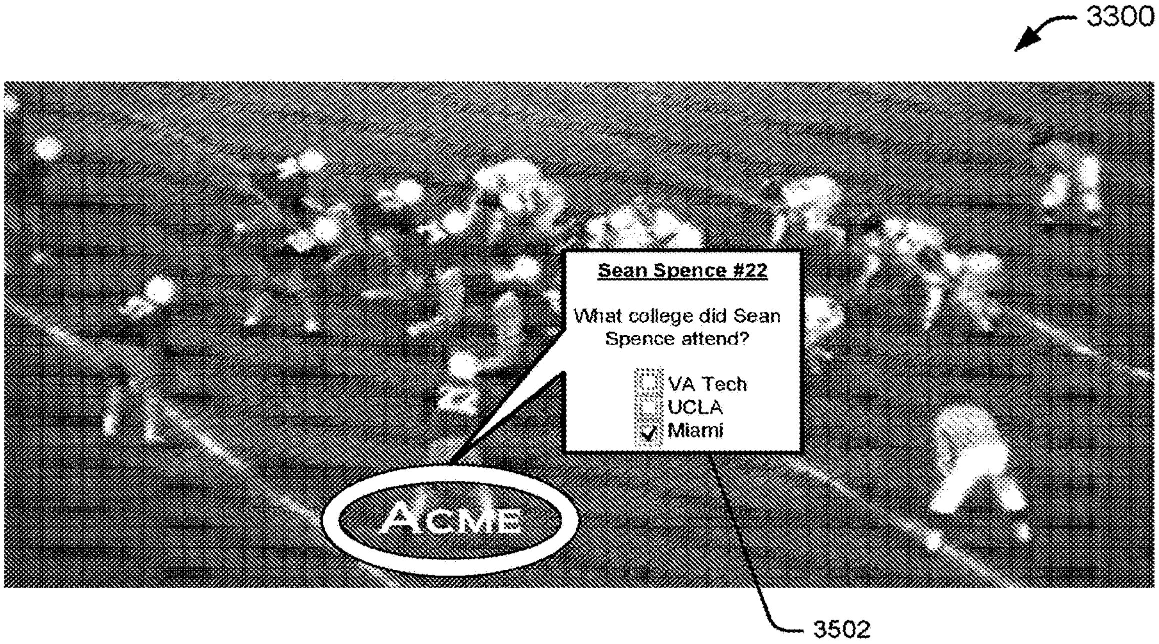
FIG. 35B is an example use interface depicting an interactive visual indicator that is selectable to present a trivia question.

In yet another example, in response to receiving an input selecting the visual indicator associated with an athlete of interest, the client device may cause presentation of a trivia question. In some examples, the trivia question may relate to the athlete of interest. FIG. 35B illustrates such an example. As shown in FIG. 35B, responsive to the user selecting the Acme visual indicator, the client device causes presentation of a trivia question regarding the athlete of interest associated with the visual indicator, namely Sean Spence in this example. The trivia question in this example is a multiple choice question having three potential answers. The user may select from among the potential answers. As shown, the user has selected the third potential answer. The client device receives a response to the trivia question. Throughout the game or sporting event, the user's answers to multiple trivia questions may be captured and the results may be provided to a fantasy sports provider or other service (e.g., interleaver service 114). Similarly, other members of the user's fantasy sports league may be presented with trivia questions regarding their athletes of interest. The answers of all the players may be tabulated and the users' scores may be provided. Thus, in addition to the underlying fantasy sports matchups, users may also compete in a trivia game with the other players in their fantasy sports league(s). In some examples, the trivia scores may be entirely separate from and may not impact the outcome of the fantasy sports contests. However, in other examples, the trivia scores may be added to, aggregated with, averaged with, or may otherwise impact the outcome of the fantasy sports contests. This adds another level of competition to the fantasy sports leagues. The trivia scores may be presented on a league home page or schedule. Additionally or alternatively, the trivia scores may be served to players as clips (e.g., by the interleaver).

Example Active Bench

Fantasy sports may involve selection of real-life athletes by each of several users of a website. During real life athletic events (e.g., football or baseball games) the athletes' accomplishments are awarded points, which are totaled by fantasy teams that associated with such athletes. Accordingly, each fantasy team is awarded points based on the accomplishments of the real life athletes on respective fantasy teams.

Before real-life games begin, fantasy sports "team owners," i.e., the users of fantasy sports website platforms, may set certain of their athletes on the "field of play" (e.g., above a line on their roster list) and other athletes on the bench (e.g., below the line or in a "grayed out" area below those on the field). The fantasy points awarded to athletes "on the field" are included in the user's team's point total, while the fantasy points awarded to athletes "on the bench" are not included in the user's point totals. In the example of fantasy football, users may rearrange athletes between field and bench, in preparation for games to be played over the weekend (e.g., Thursday night through Monday Night Football).

This application describes the structure and method of operation of example fantasy sports interleaver devices. In one example, the device performs audio/video segmentation, annotation and interleaving services to thereby make available appropriate video clips to respective users. In one example, the interleaver device segments one or more incoming video streams (e.g., football games or other sporting events) into segments (i.e., clips), annotates at least some of the clips according to achievements of the athletes in the clips and/or annotates according to fantasy point information. The interleaver device may then transmit, address, label or otherwise associate certain of the annotated clips with certain of the users, e.g., the particular users that want particular clips. Additionally or alternatively, unannotated clips may be associated with appropriate respective users according to the annotations, wherein all or part of the annotations may or may not be made part of each clip. The users may be users of a fantasy sports platform (e.g., as provided by Yahoo!, the NFL and others). The users may be provided with clips that are of interest to each user based on a user's fantasy team, fielded athletes, benched athletes, association with an opposing team, or other interest(s) of the user.

In a further example, the fantasy sports interleaver device supports fantasy sports (e.g., fantasy football) having an "active bench." In known fantasy sports (e.g., fantasy football), users set their teams before play begins. This may involve partitioning a fantasy team between athletes "on the field" and other athletes "on the bench." However, in an active bench version of fantasy sports, users may swap athletes between "on the field" status and "on the bench" status as play evolves in real-life games. Thus, a user may recognize that an athlete on their bench may have a better chance to score fantasy points than an athlete on the field. Accordingly, the user may switch the athletes, thereby putting the user's fantasy team in a potentially better position. For example, if the user recognizes that the user's quarterback does not have the ball (i.e., the quarterback's team's defense is on the field) the user may want to swap a backup quarterback from the user's bench, if that quarterback has the ball in his real-life game. Similarly, if the athlete who is the user's fantasy team's backup kicker is about to attempt a field goal, the user may swap that kicker off of the bench of the user's fantasy team and onto the field.

In the "active bench" example of fantasy sports (e.g., fantasy football with active bench) users (i.e., fantasy team "owners" using fantasy sports platforms or websites) have a great need for information over a course of many hours (e.g., Thursday night football, through Sunday and Sunday night games, and Monday Night Football). The information may include audio/video (hereinafter, "video") clips that keep the user up-to-date on any information that would be of assistance in swapping athletes between on-the-field and on-the-bench of the user's fantasy sports team. To provide that information, a fantasy sports interleaver device may segment all relevant game feeds, annotate the segments (i.e., the "clips") and provide the annotated clips that are relevant to each user from among a plurality of users. In one example, the annotations may include an athlete's name. More extensive annotations may describe the athlete's achievement (e.g., scored a touchdown or hit a home run). Still further annotations may indicate how many fantasy points the user's fantasy league awards for the athlete's achievement. Annotations that may assist the user in determining if the user should swap athletes between field and bench may indicate possession of the ball, location on the field (e.g., "red zone" or within field goal range). The users, after receiving and viewing the clips sent by the fantasy sports interleaver, may then consider benching certain athlete(s) on their fantasy teams, and promoting certain benched athletes to take positions "on the field of play." The clips may be informational in nature, and may or may not include a video component. For example, the clip may inform the user that "the San Francisco 49ers have possession of the football." This information may be conveyed by showing the 49ers intercepting the ball, or returning a punt. The information may alternatively be provided in text and/or audio, to alert the user. The user may utilize that information to make substitutions, if advantageous substitutions are available (e.g., if the SF quarterback is on the bench, and should be on the field.)

Such fantasy sports play, with an active bench, may require constant or frequent attention by users to information from a number of athletic games. Such information may be provided by an active bench enabled fantasy sports platforms and/or an interleaver service or device. The users may depend heavily on clips provided by the interleaver service that are relevant to each user's particular circumstances and/or interests. In many instances, a large number of games are played simultaneously, and each user may have athletes in several of those games that are on the user's fantasy team. Accordingly, without an interleaver service to provide the relevant clips (and any other clips desired by the user), the user may be unable to effectively and knowledgably move athletes between the field and the bench of the user's fantasy team. The interleaver service may be particularly important to users having more than one fantasy team (e.g., in leagues with school friends and leagues with co-workers). Such users may view a number of clips so that they may repeatedly and intelligently move athletes between field and bench based on information in the clips provided by the fantasy sports interleaver.

In a further example, a fantasy sports platform (e.g., host of fantasy leagues and teams), a gaming (gambling) website and/or a fantasy sports interleaver service (provider of clips to plural users based on respective needs)—or an entity having two or more of such functions—may present users with an opportunity to make "side bets" on the outcome of certain events in certain games. Such events may include whether a football team with possession of the football inside the opponent's 20-yard line will score, whether a field goal attempt will score, whether a baseball pitcher with the bases loaded will lose a run, etc. Such side bets may be considered to be on "the side" of an overall bet that may have been placed on one user's fantasy team points versus another user's points. In such an environment, a fantasy sports interleaver may provide clips to users so that they recognize the potential side bet event, which may otherwise have gone by unnoticed (e.g., if the user is not watching a video feed of the game upon which the side bet is associated). Accordingly, while an interleaver service may present particular video clips to particular users based on factors such as: athletes on the users' fantasy team, favorite athletes of the users, athletes on opponents' fantasy team, etc., the interleaver service may also provide clips related to side bets, which the user may optionally consider taking.

Example Interleaver Service to Support "Active Bench." In an example environment including an interleaver service, fantasy sports platform, gaming site and a plurality of users. Two or more of the interleaver, platform and/or gaming side may be combined into a single entity. A plurality of incoming feeds may contain athletic games and/or related discussion, and may be received by one or more of the interleaver service, the fantasy sports platform and/or the gaming site.

The fantasy sports interleaver service may provide a plurality of potentially different combinations of clips to a number of different respective users. In an example, the interleaver service may include a number of components, which may be arranged, combined, supplemented or eliminated depending on specific applications.

A video segmenting device may be used to create a plurality of video clips. The video clips may depict athletes in a one or more games, which may be concurrently played.

A clip annotator may be used to associate the plurality of video clips with achievements of athletes and/or potential achievements of athletes. The achievements may be associated with specific fantasy points values, although since this is subjectively based on different fantasy league's opinions, the clips may have default or no fantasy point values. The clip annotator may also recognize when an athlete may be about to perform in a way that results in an award of fantasy points. For example, a kicker may be about to kick a field goal. Accordingly, the clip annotator may be configured to recognize when an athlete, which may be on the bench of a fantasy team of one or more of the plurality of users, should be considered for movement from the "bench" of the user's fantasy team to the "field" of that team. (Notice that all "field" athletes may not actually be on the field of play, due to ball possession, injury, etc. However, if they score fantasy points, because they are "fielded" athletes of the user, the user will gain those scored fantasy points.

An updated roster of a fantasy team of each of the plurality of users may be used to indicate which the user's fantasy team athletes are currently on the field, and which are on the bench. Thus, the updated roster shows, updated movement of athletes between fielded and benched. The updated roster also shows a record of the user's movement of athletes from bench to field in hopes that they will score more fantasy points than the athletes moved from field to bench. Accordingly, the skill of the users, based in part on information obtained from clips from the interleaver, may be used to move athletes between bench and field, and to thereby increase a total fantasy points of each user.

An interleaver may be used to associate at least some of the plurality of video clips with each of a plurality of users. The clips associated with each user may be based in part on at least one of fantasy team(s) of each respective user and the updated roster of the fantasy team of each respective user. The clips associated with each user may include fielded athletes and benched athletes of the fantasy team of the user. Clips associated with fielded athletes tend to report fantasy points achieved by such athletes, while clips associated with benched athletes may report game situations that an astute user may recognize as an opportunity of one of the user's benched athletes. Additionally, clips associated with benched athletes may show the user his/her benched athletes scoring fantasy points that are not (because the athlete was benched) awarded to the user's fantasy team.

A packet transmitter may be used to transmit clips to each of the plurality of users. The transmitted packets may include clips of fantasy points being earned by athletes on the user's fantasy team, and may also clips that show an astute user circumstances wherein benched athletes may potentially achieve/earn fantasy points.

Example Method to Support "Active Bench." In an example, audio/video feed is segmented into clips. The clips may correspond roughly to play(s) in a football game, pitches or at-bats in a baseball game, etc.

The clips may be annotated with information. The information may indicate activity of athlete(s) that were sufficient for the award of fantasy sports points. The information may additionally indicate athlete(s) populating a user's fantasy team bench that are in a position to possibly score fantasy points. Such clips may indicate to an astute user that a fielded athlete should be benched and a benched athlete should be fielded, to thereby position the newly fielded athlete in position to win fantasy points.

A roster of the user's fantasy team may be updated to reflect the changes made by the user. Accordingly, clips indicating that the newly benched athlete may score fantasy points may be sent to the user.

The user may watch clips indicating the activity of the user's fielded and benched athletes and move athletes between field and bench in a manner, and according to the user's skill, that will result in accumulation of a greater number of fantasy points.

Figure 39:
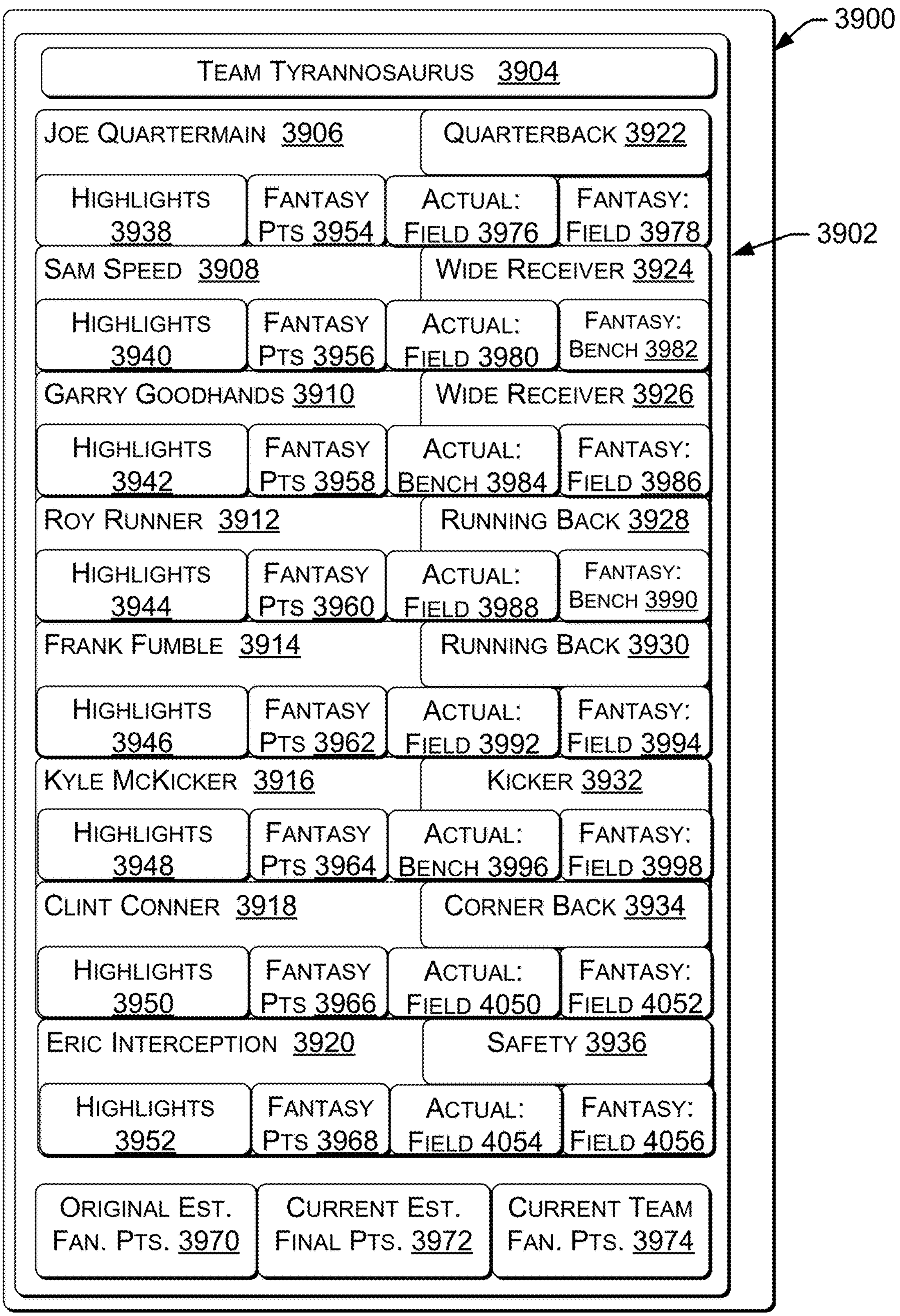
FIG. 39 shows an example user interface showing a listing of a fantasy team of a user, and for each athlete shown, an indicator of whether the athlete is on the bench or field in an actual (non-fantasy) game, and an indicator of whether the athlete is on the bench or field in the fantasy team of the user.

FIG. 39 shows an example user interface showing a listing of a fantasy team of a user, and for each athlete shown, an indicator of whether the athlete is on the bench or field in an actual (non-fantasy) game, and an indicator of whether the athlete is on the bench or field in the fantasy team of the user.

FIG. 39 shows an example device 3900 of a user, which displays an example user interface 3902. The device may be a cell phone, tablet, laptop, etc. The user interface 3902 displays the team name 3904 and a list of players. The list is shown in a somewhat simplified form, to illustrate concepts. An actual fantasy team may include more athletes; however, the concepts illustrated herein are applicable by extension to any sized teams. The user interface 3902 shows players, including Joe Quartermain 3906 and other athletes 3908 through 3920. Joe Quartermain is shown as the quarterback 3922, and other players also have positions labeled at 3924 through 3936. The user interface 3902 allows the user to request video clips of each player. As an example, by clicking on highlights 3938, the athletic accomplishments of quarterback Joe Quartermain, particularly those resulting in the award of fantasy points, may be viewed. The highlights 3940 through 3952 of other athletes may be similarly viewed. The number of fantasy points currently scored by each player may also be displayed. Joe Quartermain's fantasy points are displayed at location 3954, and the fantasy points awarded to other athletes are displayed at locations 3956 through 3958. The original (before the games began) estimated fantasy points for the entire team 3904 is displayed at location 3970. After play starts, and as time goes by, the original estimated score may be supplemented by a current estimated final point score 3972. Also, the actual current point score 3974 is shown. At location 3976, the user interface 3902 reports that quarterback Joe Quartermain is actually on the field. That is, the actual athlete is on the football field in some city, playing a game, and is not sitting on the bench. Similarly, at location 3978, the user interface indicates that Joe is also on the field in for the fantasy team 3904. To clarify, only the athletes on the field for a fantasy team can score fantasy points. In contrast, a fantasy team is not awarded fantasy points for achievements of athletes on the bench of the fantasy team. Thus, there is an incentive to move players between the fantasy team bench and the fantasy team field so that athletes are on the fantasy teams field, not bench, when the athlete actually does something for which fantasy points are awarded. Accordingly, when a user sees that an athlete is actually playing, it is advantageous to move the athlete from fantasy bench to fantasy field, so that if the athlete does something for which fantasy points are awarded, those points will accrue to the fantasy team of the user. The user interface 3902 reports that other athletes on the actual field/bench and fantasy field/bench at locations 3980-3998 and 4050 through 4056.

Figure 40:
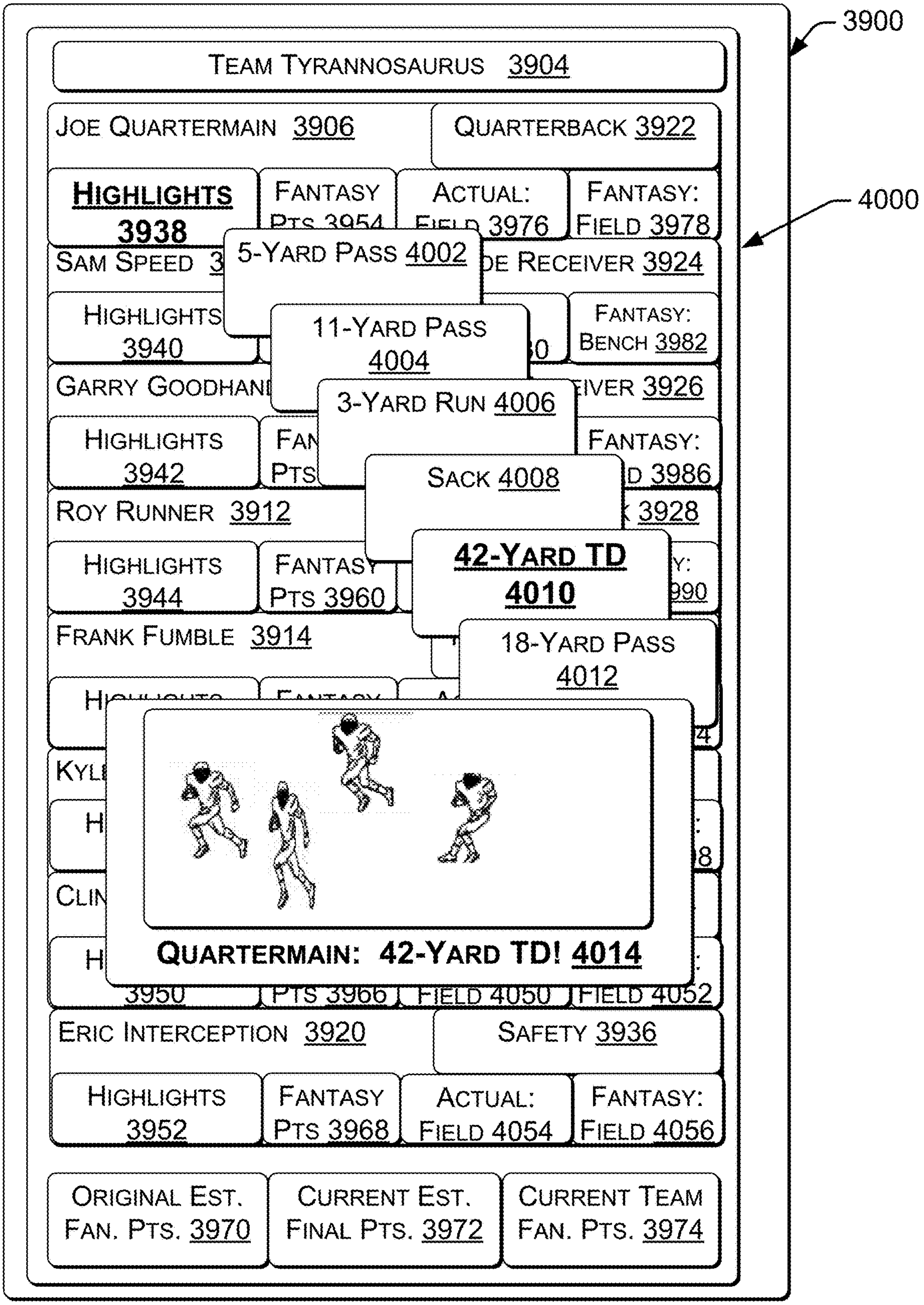
FIG. 40 shows an example user interface wherein athletic achievements resulting in award of fantasy points are listed for each athlete, and wherein links to video clips of the athletic achievements are displayed.

FIG. 40 shows the device 4000 of the user displaying an example user interface 4000 wherein athletic achievements resulting in award of fantasy points are listed for each athlete, and wherein links to video clips of the athletic achievements are displayed. In the example shown, the user has selected location 3938, in effort to view the highlights of Joe Quartermain. In response the user interfaced 4000 has displayed the events that are significant and/or that resulted in fantasy points, such as the 5-yard pass 4002, the 11-yard pass 4004, etc., through event 4012. The user had then selected the 42-yard touchdown 4010. In response, the user interface 4000 has displayed the video clip 4014, showing Joe Quartermain, the touchdown, and video support of why team tyrannosaurus 3904 was awarded fantasy points.

Figure 41:
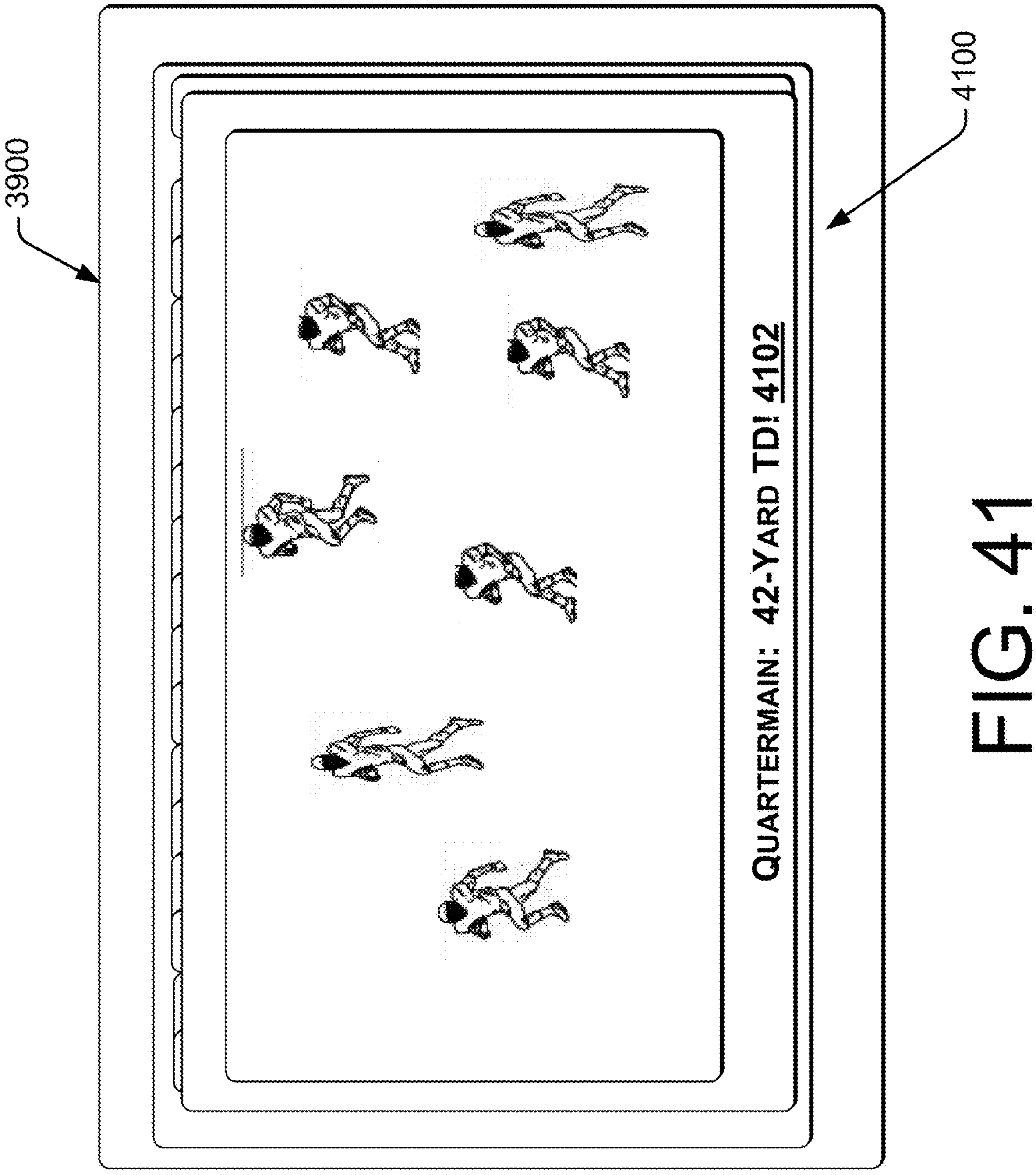
FIG. 41 shows an example user interface wherein a video clip of a performance by an athlete, which may have result in an award of fantasy points, is shown.

FIG. 41 shows an example user interface 4100 displayed in the device 3900 of the user. This user interface results when the user rotates the device 3900 by 90-degrees, thereby invoking wide-screen mode. Thus, a wide-screen version 4102 of Joe Quartermain's touchdown is shown.

Figure 42:
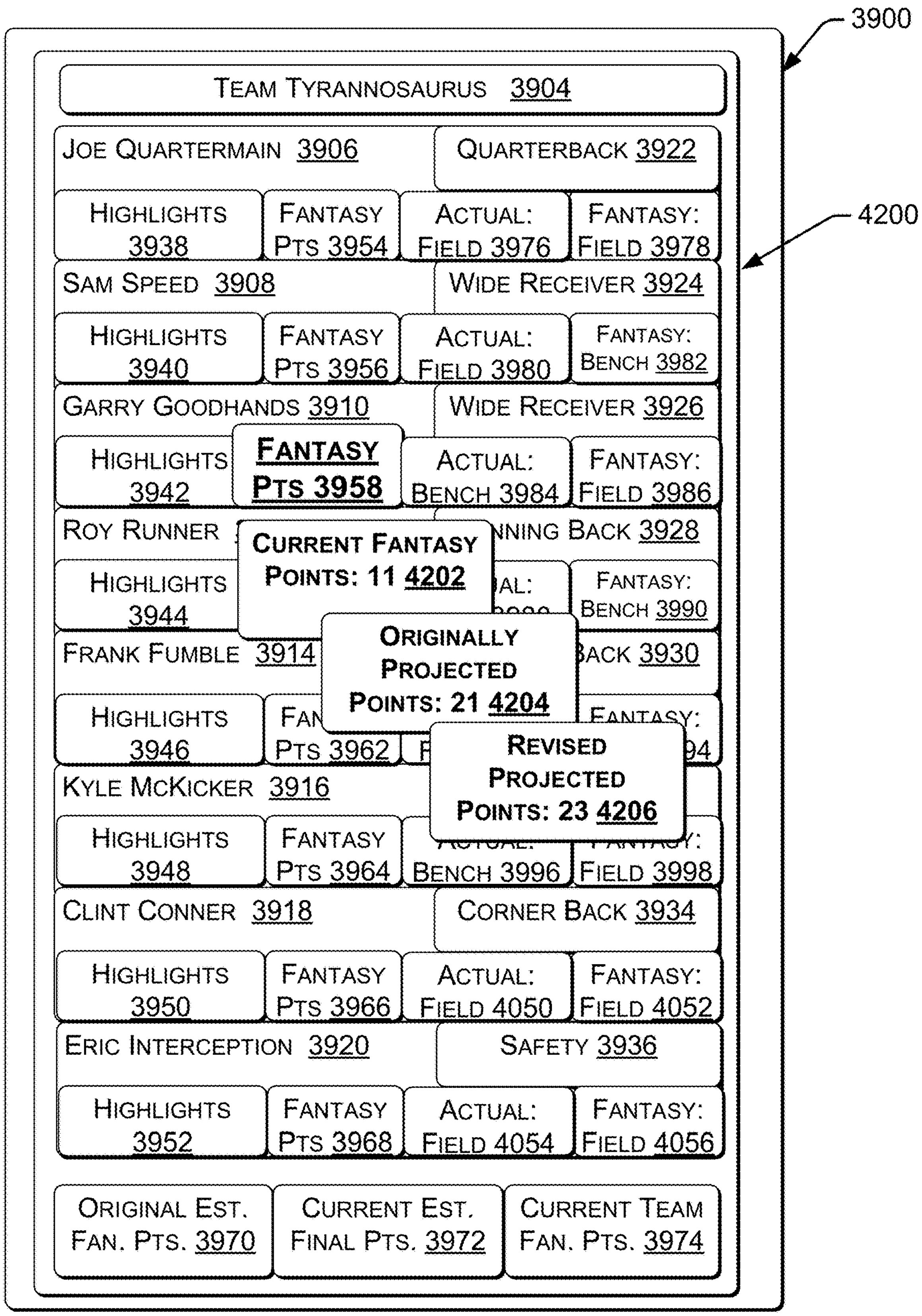
FIG. 42 shows an example user interface wherein original projected fantasy points, revised projected fantasy points and/or actual fantasy points for athlete(s) and/or a fantasy team is shown.

FIG. 42 shows an example user interface 4200 displayed on the device 3900 of the user, wherein original projected fantasy points, revised projected fantasy points and/or actual fantasy points for athlete is shown. Referring to the figure, the user has selected the fantasy points 3958 of the user's wide receiver, Garry Goodhands. In response, the user interface 4200 has displayed the current fantasy points 4202 (11 points) the originally projected (entire game) fantasy points 4204 (21 points) and the revised projected fantasy points 4206 (23 points). Since the original projection was for 21 points, and the revised projection is for 23 points, it seems that Garry is doing slightly better, at this stage of the game, than was originally (before the game started) projected to do.

Figure 43:
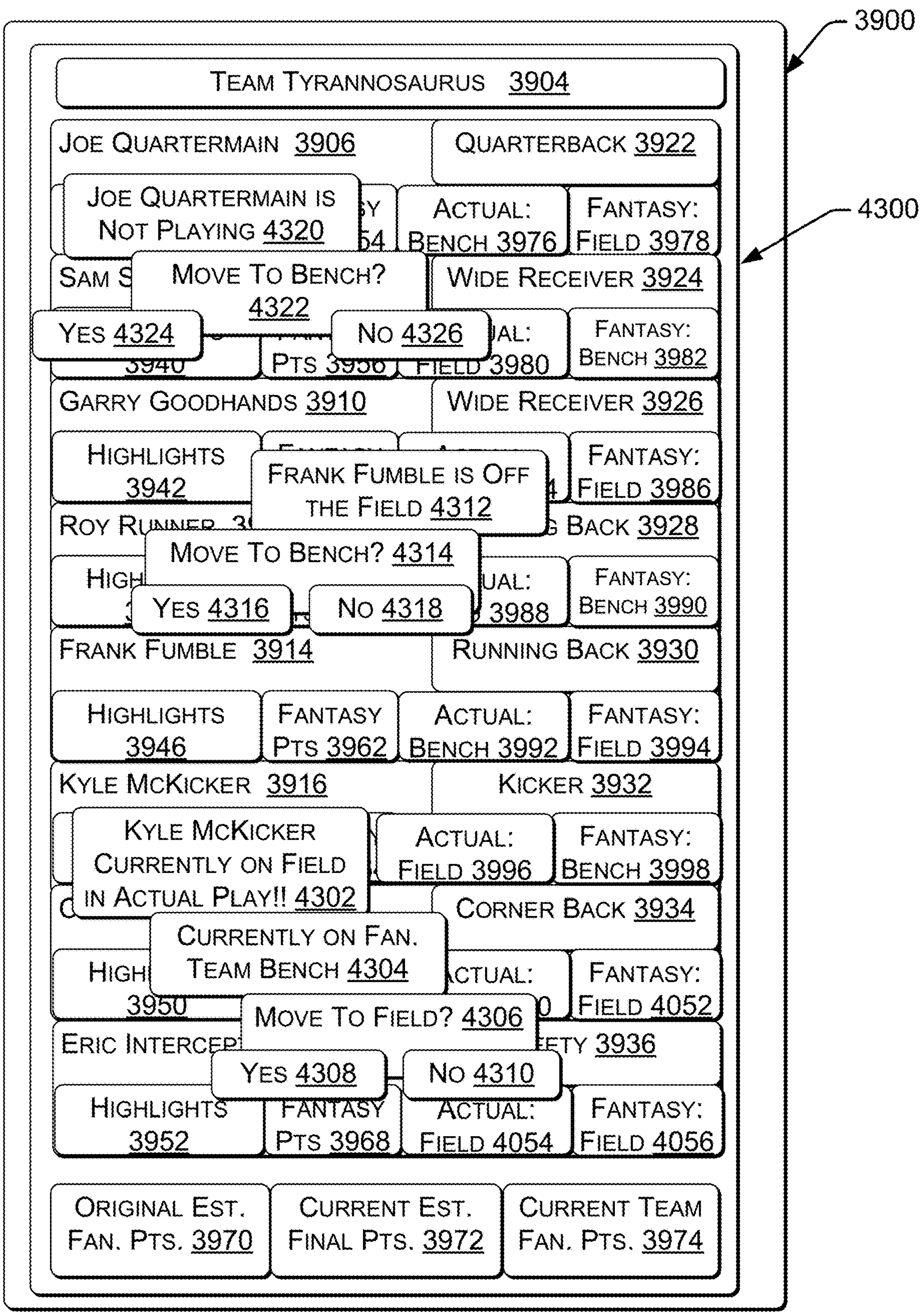
FIG. 43 shows an example user interface showing benched and fielded athletes in non-fantasy games, and showing benched and fielded athletes on a user's fantasy team, and showing tool(s) enabling a user to move athletes between a benched status and a fielded status during play of real life (i.e., non-fantasy games).

FIG. 43 shows an example user interface 4300 displayed on the device 3900 of the user, wherein a player on the fantasy team of the user is actually (in a real, not fantasy, game) on the field. Accordingly, the user interface 4300 has displayed an alert 4302 saying that athlete Kyle McKicker is on the field in actual play. An alert 4304 reminds the user that Kyle is on the bench of the fantasy team of the user. A dialog box 4306 asks the user if the user would like to move Kyle from the fantasy bench to the fantasy field, yes 4308 or no 4310. If the user responds "yes," such a move may require a player to be moved from the fantasy field to the fantasy bench. (All athletes on the fantasy team cannot be on the field at the same time, or else no user interaction is required, and it's not a game.) Accordingly, the user interface 4300 suggests that Frank Fumble is off the field (in reality) and asks the user at 4314 if Frank should be moved to the bench, yes 4316 or no 4318. Similarly, the user interface 4300 suggests that Joe Quartermain is not playing 4320, and asks the user at 4322 if Joe should be moved to the bench, yes 4324 or no 4326.

FIG. 44 shows an example flow diagram showing an example method 4400 by which a user interface may be managed to thereby provide the user with an interactive fantasy sports experience.

At block 4402, data is sent to a device of a user, wherein the data comprises a listing of athletes on a fantasy team of the user. At block 4404, the listing may distinguish between fielded and benched athletes in non-fantasy games. At block 4406, the listing may distinguish fielded and benched athletes based on the fantasy team of the user.

At block 4408, data is received from the user, the data indicating movement of athletes associated with the fantasy team of the user between a benched status and a fielded status on the fantasy team of the user while the non-fantasy games are being played.

At block 4410, data is sent to the device of the user to update the listing of athletes. At block 4412, the update may be required due to movement of athletes in non-fantasy games, between field and bench. At block 4414, the update may also be required due to movement of athletes between the benched status and the fielded status of the fantasy team of the user.

FIG. 45 shows an example flow diagram showing an example method 4500 by which an interactive fantasy sports experience may be provided to a remote user, and by which content producers (e.g., creators of incoming audio/video feeds of non-fantasy games), fantasy sports platform(s), and/or user interfaces provided to a plurality of users may be managed.

At block 4502, a listing of athletes on a fantasy team of a user is displayed in the user interface, wherein the listing identifies each athlete on the fantasy team of the user, including fielded athletes and benched athletes, as being either fielded athletes or benched athletes in non-fantasy games.

At block 4504, data is received from the user indicating desired movement of athletes between a benched status and a fielded status on the fantasy team of the user while the non-fantasy games are being played.

At block 4506, data is received from a remote server updating the listing of athletes, according to movement of athletes in non-fantasy games, between field and bench.

At block 4508, an updated listing of athletes on the fantasy team of the user is displayed that is consistent with movement of athletes in non-fantasy games between field and bench.

Active Bench Examples

In one example, a user interface may be configured to support "active bench" concepts in fantasy sports, such as fantasy football. While conventional fantasy football does not allow athletes to be moved between "bench" and "field" after non-fantasy games have started, allowing such movement of athletes introduces another dimension to fantasy sports, and allows user to act more like a sports coach, who constantly moves athletes onto the field (fielded athletes) and off the field (benched athletes). Moreover, the active bench concepts provide users with many opportunities to test their skill, to recognize opportunities for various of their fantasy athletes, and to "out coach" other players in their league.

In an example, a user interface may be configured to provide a user with a listing of athletes on a fantasy team of a user. The listing may provide considerable information, including means to distinguish between fielded and benched athletes in non-fantasy games. That is, the listing tells the user, in real time, which athletes are actually playing, and which are on the bench. Additionally, the listing may be configured to distinguish between fielded and benched athletes based on the fantasy team of the user. Fantasy sports commonly allow users to have a "bench" of athletes, which may be used to replace other athletes in the event of an injury, a bye week, a slump, etc.

An example user interface may provide a tool to the user to move athletes between a benched status and a fielded status on the fantasy team of the user while the non-fantasy games are being played. The actual appearance of the tool is not critical; however, the tool should be intuitive and effective. In an example, the tool may be configured to move athletes in pairs, i.e., move one athlete from bench to field and another athlete from field to bench. This would avoid problems associated with too many or too few athletes being on the field.

The user interface may update the listing of athletes according to a number of actors, such as movement of athletes in non-fantasy games, between field and bench, and athletes moved between the benched status and the fielded status of the fantasy team of the user. Thus, as athletes move on and off the field in real lift, and as athletes move between bench and field on the fantasy team of the user, such movements are noted and updated in the user interface.

In an example, the user interface distinguishes between fielded and benched athletes in actual games in real time. Thus, different colors, symbols, words, etc., can be used by the user interface to convey to the user which athletes are on the field and on the bench in non-fantasy games and with respect to the fantasy team of the user. In a particular example, the user is frequently interested in moving athletes off the bench and onto the field when the athletes are actually on the field in non-fantasy games. This allows the user to enjoy fantasy points related to any athletic accomplishment of athletes in non-fantasy games. Accordingly, in an example, the user interface allows the user to move an athlete from benched status to fielded status on the fantasy team of the user at a time when the athlete is on the field in an actual game. Thus, by repeated reference to the user interface, the user is able to better keep the athletes that are actually fielded on the field of the fantasy team, and keep the athletes that are actually benched on the bench of the fantasy team.

In a further example, the user interface may distinguish between fielded and benched athletes in actual games using color codes, shading, location within the list, highlights or other means. Similarly, the user interface may distinguish between fielded and benched athletes on the fantasy team of the user by any of a variety of techniques. The user interface is configured to conveniently convey the information to the user that an athlete benched on the fantasy team of the user is fielded in a non-fantasy (actual) game, and that the user may want to put this athlete on the field and put a different athlete on the bench.

In a further example, the user interface provides the user with information about fantasy sports point scoring opportunities of athletes on the fantasy team of the user that are currently fielded in actual games. The user interface may beep of flash diodes on the user's phone or other device, or may send the user a text message, announcing the information. In some example, adverting may be presented by the user interface, and may accompany such texts.

In a further example, the user interface may provide data for changes to a roster of athletes in a fantasy sports account of the user on a remote server of a fantasy sports platform. The fantasy sports platform may calculate the fantasy points of each user within many fantasy sports leagues. Thus, the fantasy sports platform may manage and control the user interface provided to the user. The user interface may be an application operating on the user's device, or it may be a website maintained by the fantasy sports platform.

In a further example, the user interface may be responsive to input from a remotely located server (such as a fantasy sports platform, like Yahoo! or the NFL.com). The interface may also be responsive to input from the user, such as input via touch screen, keyboard, mouse, voice, etc.

In a further example, the user interface may provide output to a remotely located server that directs changes to a roster of athletes in a fantasy sports account of the user; and output to a remote server that directs selection of video clips, made available to the user, based at least in part on movement of athletes between a benched status and a fielded status on the fantasy team of the user while the non-fantasy games are being played.

In a further example, one or more processors may be used to control and execute instructions stored in memory, and performing operations to provide an interactive fantasy sports experience. Data may be sent to a device of a user. Such the data may include a listing of athletes on a fantasy team of the user. The listing may distinguish between fielded and benched athletes in non-fantasy games. Also, the listing distinguishes fielded and benched athletes based on the fantasy team of the user. Data may be received from the user, indicating, for example, movement of athletes associated with the fantasy team of the user between a benched status and a fielded status on the fantasy team of the user while the non-fantasy games are being played. Also, data may be sent to the device of the user to update the listing of athletes. The data may be sent according to movement of athletes in non-fantasy games, between field and bench, and movement of athletes between the benched status and the fielded status of the fantasy team of the user.

In a further example, data may be stored (e.g., at a server, remote from the user) indicating which athletes are fielded and which athletes are benched in non-fantasy games as those games progress. A subset of the stored data may be sent (e.g., from the remote server) to each of a plurality of users, based at least in part on a roster of athletes on the fantasy team of each respective user.

In a further example, video clips may be provided to the user. The video clips provided to the user may be based in part on information useful to the user to make decisions to move athletes between the benched status and the fielded status on the fantasy team of the user while the non-fantasy games are being played.

In a further example, the user interface may cause visual indicia to be displayed on a user interface on the device of the user, including the visual indicia to indicate a first athlete who is in the benched status on the fantasy team of the user and who is in the fielded status in non-fantasy games. In a continuing example, the user interface may receive input from the user effective to move the first athlete from the benched status to the fielded status on the fantasy team of the user; and receive input from the user moving a second athlete from the fielded status to the benched status on the fantasy team of the user, to thereby maintain a standardized number of athletes in the fielded status.

In a further example, the user interface may receive data from the user indicating movement of athletes between the benched status and the fielded status. Such movement may result in a different number of fantasy points awarded to the fantasy team of the user than would have been the case without the move between the benched status and the fielded status.

In a further example, a notification may be provided to the user when athletes in benched status in the fantasy team of the user are in a fielded status in non-fantasy games. In some example, the user interface may provide an advertisement to the user. Such advertisements may be displayed in small portions of the screen, and may include a logo, trademark and/or image of a product.

In a further example, a notification may be provided to the user when athletes in benched status in the fantasy team of the user, and in a fielded status in non-fantasy games, are in a position to score fantasy points. In an example, some users are particularly interested in the "red zone," i.e., when the offence is within 20 years of the opposing team's goal line. Accordingly, a notification may be sent when an athlete on the fantasy team of the user, particularly of the athlete is on the bench of the fantasy team, and the user should consider moving the athlete to the field.

In a further example, video clips may be provided to the user when athletes in benched status in the fantasy team of the user, and in a fielded status in non-fantasy games, are in circumstances of increased likelihood to score fantasy points.

In an example performed under control of one or more processors executing instructions stored in memory to operate a user interface, the example may include displaying a listing of athletes on a fantasy team of a user in the user interface, wherein the listing identifies each athlete on the fantasy team of the user, including fielded athletes and benched athletes, as being either fielded athletes or benched athletes in non-fantasy games. The example may further include receiving data from the user indicating desired movement of athletes between a benched status and a fielded status on the fantasy team of the user while the non-fantasy games are being played. The example may further include receiving data from a remote server updating the listing of athletes, according to movement of athletes in non-fantasy games, between field and bench. The example may further include displaying an updated listing of athletes on the fantasy team of the user that is consistent with movement of athletes in non-fantasy games between field and bench.

In a further example, data may be stored (e.g., on the device of the user and/or a remote server such as a fantasy sports platform) indicating which athletes are fielded and which athletes are benched in non-fantasy games as those games progress, and a subset of the stored data may be sent to the user interface of each user, based at least in part on a roster of athletes on the fantasy team of the respective user.

In a further example, video clips may be sent to the user. Such video clips may be selected to assist in decisions to move athletes between the benched status and the fielded status on the fantasy team of the user while the non-fantasy games are being played.

In a further example, data input by the user—indicating movement of the first athlete from the benched status to the fielded status on the fantasy team of the user—may be received by the user interface. Additionally, the user interface may receive input from the user moving a second athlete from the fielded status to the benched status on the fantasy team of the user, to thereby maintain a threshold number of athletes in the fielded status.

In a further example, a notification may be provided to the user when athletes in a benched status of the fantasy team of the user are in a fielded status in non-fantasy games. Such a notification is particularly useful to the user, since the user will typically desire to have any athlete of the fantasy team on the field when the athletes are on the field in non-fantasy games. This will result in the user actually receiving fantasy points based on the athletes achievements.

Side Interaction

Participants in conventional fantasy sports contests typically set their lineup and then periodically check to see how the athletes on their fantasy team are performing in the real sporting events. This model results in very limited periods of engagement. Fantasy sports participants desire more and different ways of engaging in fantasy sports. This application describes techniques for increasing engagement of fantasy sports participants by, among other things, presenting them with queries or prompts to participate in side interactions. In some examples, the queries or prompts may be presented as popup windows, notifications, emails, text messages, or other interfaces. In some examples, the queries or prompts may be interleaved with content being consumed by the user, such as between clips of a custom content stream, during commercials in live or pre-recorded television (e.g., as backfill content), as or in connection with a visual indicator overlaid or appended to a live sporting event, or the like. In some examples, the query or prompt may be related to content being consumed by the user or an event, object, location or person depicted in the content being consumed by the user. For instance, the query or prompt may relate to a past present or future play or other portion of a sporting event, the query or prompt may relate to actions of an athlete or other person being depicted in the content, the query or prompt may relate to a location or object that is depicted in the content, etc. In some examples, the query or prompt may include facts or contextual information associated with a topic of the prompt or query. In some examples, the query or prompt may solicit information from the user (e.g., a survey question), request an answer to a question (e.g., a trivia question), invite the user to engage in a game, invite the user to place a wager or bet.

In some examples, the query or prompt may further allow the user to place a bet on the outcome of the future event. In that case, the prompt or query may further include estimated odds of the future outcome occurring. Bets may be placed in points (which may or may not have monetary value), credits, or currency (including currency of a country, digital currency such as bitcoin, or the like). The query or prompt may have a time limit. In that case, the query or prompt may include a clock or counter. If the user desires to submit a response or place a bet, he or she must do so before the clock or counter expires. The query or prompt may be removed and/or the control usable to place the bet or otherwise respond may be greyed out upon expiration of the clock or counter to prevent the user from responding once the clock or counter expires. This ensures that the response and/or bet will be received before the occurrence of the future event.

The bets may be submitted electronically to a fantasy sports service (e.g., Yahoo!, Draft Kings, Fan Duel, etc.), sports book, casino, bookie, or other gaming service. At the time a bet is placed, funds may be withdrawn from an account of a user (e.g., an account with a fantasy sports service, gaming service, sports book, casino, bookie, bank account, credit card, etc.) and held until occurrence of the future event. Upon occurrence of the future event, it may be determined which users won and which users lost, and funds may be dispersed electronically to accounts of the winners based on the odds at the time of occurrence.

In one example, a user may be viewing a custom content stream comprised of segments of sporting events. A prompt or query may be presented in between segments. In another example, a user may be viewing a live or substantially live sporting event. A query or prompt may be presented along with the sporting event. The prompt or query may be overlaid on a portion of the sporting event (e.g., as a window, ticker, banner, popup, etc.), or may be presented during or in lieu of a commercial (e.g., as backfill content). In some examples, the prompt or query may be presented in response to selection by the user of a visual indicator on the screen. The prompt or query may comprise a description of a previous segment, statistics of an athlete's performance in a current sporting event and/or historical performance, or other information. The prompt or query may additionally or alternatively include a future event and a control usable by the user to make a prediction of the outcome of the future event. The future event may include a score of a game, a number of total points scored by opposing teams in a next or future period, a number of yards that will be gained by a particular player, a number of tackles made by a player, a number of strikeouts of a player, a number of home runs, a winner of a future round of a fight, or any other future event the outcome of which is unknown at the time of the prompt or query.

Figure 36:
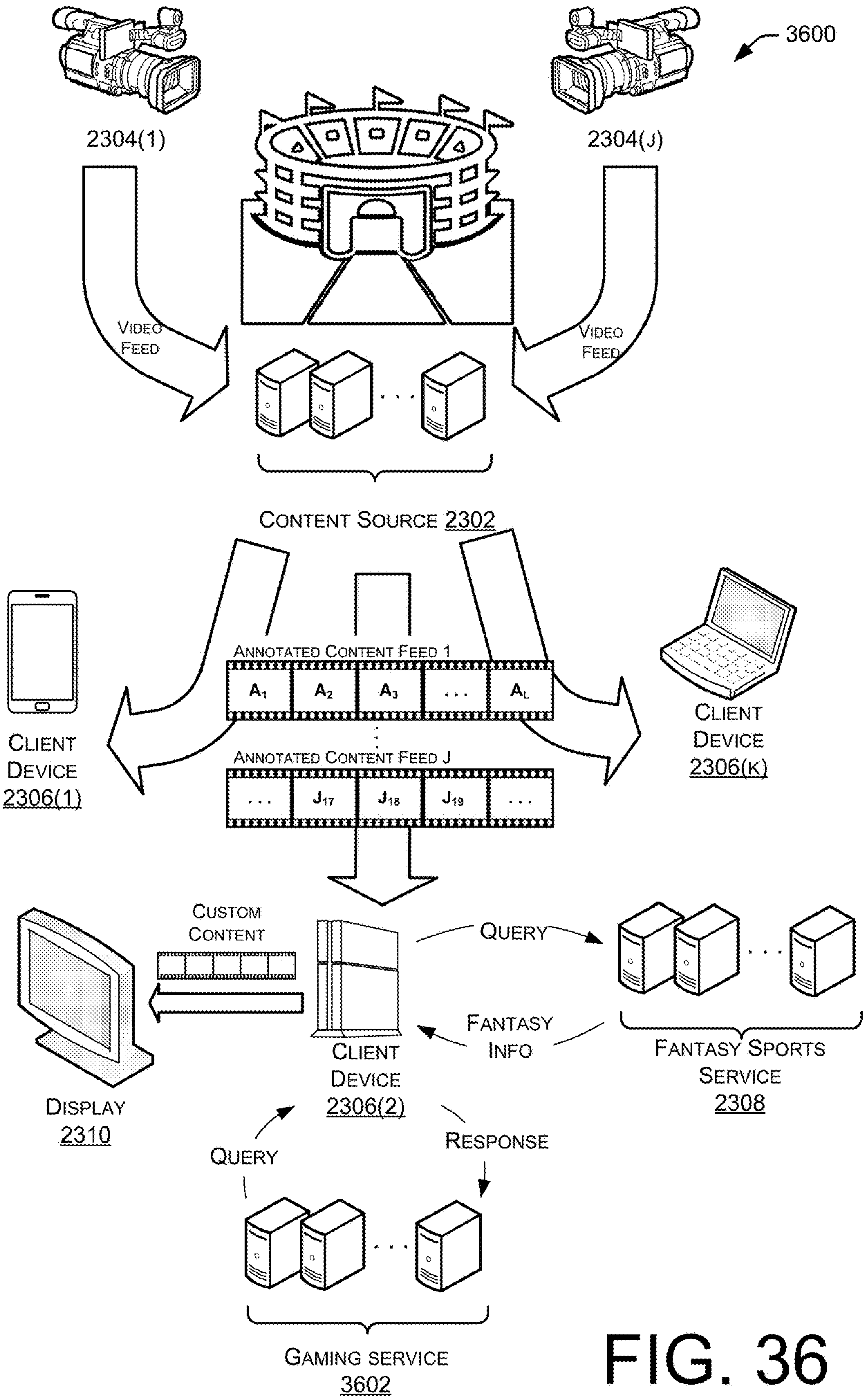
FIG. 36 is a schematic diagram of an example architecture usable to facilitate side interaction with sporting events and/or fantasy sports.

FIG. 36 is a schematic diagram of an example architecture 3600 usable to facilitate side interaction with sporting events and/or fantasy sports. The architecture 3600 in this examples it the same as that depicted in FIG. 23, except for the addition of a gaming service 3602. The gaming service may comprise one or more servers or other computing devices, including memory and processors. The gaming service may send a query or prompt to the user's client device, such as client device 2306(2), for presentation to the user. The query or prompt may comprise any of the types of queries or prompts described herein. The gaming service may then receive a response to the query or prompt, which may include an answer to a question (survey or trivia), a prediction or bet regarding the outcome of a future event, and/or an amount of currency or points the users wishes to bet. The user may have an account with the gaming service, which account information may be stored in memory of the client device 2306, the content source 2302, an interleaver service such as that shown in FIGS. 1-3, or the like.

FIG. 37 is a schematic diagram of an example user interface 3700 of a client application for consuming custom content, such as a custom content stream from an interleaver service, such as the interleaver service 114. In some examples, in addition to the custom content stream, the interleaver service 114 may send a query or prompt 3702. In other examples, the query or prompt 3702 may be served by a fantasy sports service, such as fantasy sports service 2308, or a gaming service, such as gaming service 3602. Regardless of its source, the query or prompt 3702 in this example includes a description of an athlete (Marshawn Lynch in this example) and events involving the athlete (current rushing yardage in an ongoing sporting event). The query or prompt 3702 also includes a time remaining in the ongoing sporting event, and a question about the athlete (will Marshawn rush for over 100 yards in the game?). The query or prompt 3702 also includes controls usable to submit an answer to the question (yes and no buttons in this example), a control usable to submit a bet (a text box in this example), and a counter indicating a time remaining to submit an answer to the question and/or a bet.

Figure 38:
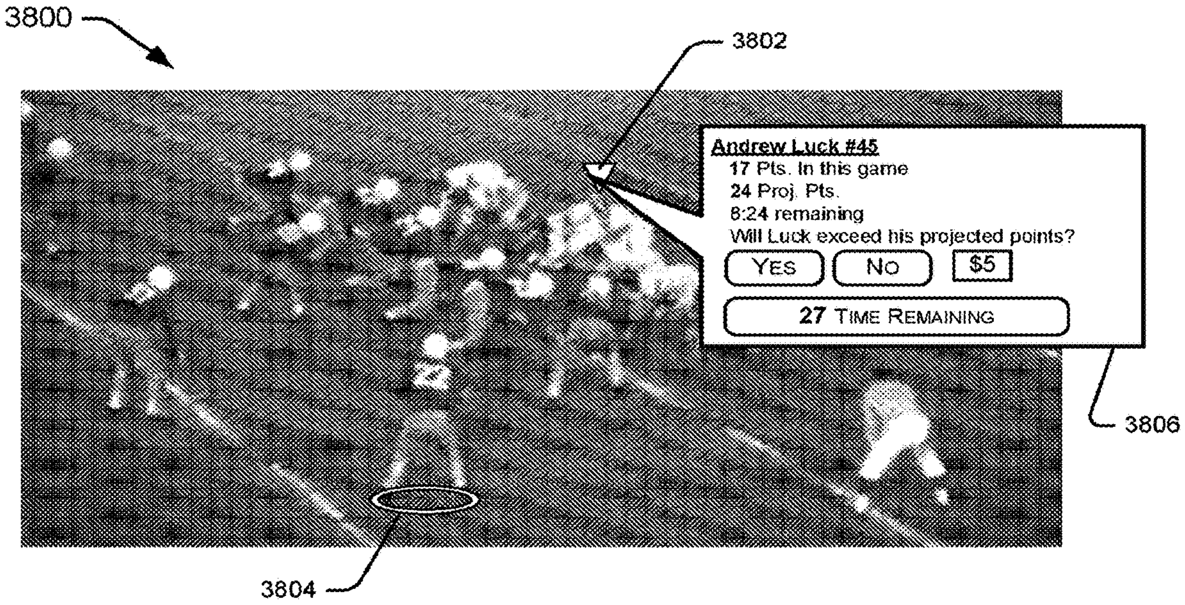
FIG. 38 illustrates an example user interface of live or substantially live video content that may be presented by a client device.

FIG. 38 illustrates an example user interface 3800 of live or substantially live video content that may be presented by a client device. Overlaid on the video content are multiple visual indicators (3802 and 3804 in this example), designating athletes that are on a fantasy roster of a user of the client device that is presenting the video content. Both visual indicators, 3802 and 3804, are located proximate to the respective athlete to whom they are associated. In this example, the triangular visual indicator 3802 is located above a head of one athlete, while the halo 3804 is located around the feet of a second athlete. Responsive to user selection of the triangle visual indicator 3802 a query or prompt 3806 may be presented by a client device, such as client device 2306 or a content source, such as content source 2302. The query or prompt 3806 in this example includes fantasy point information of an athlete associated with the visual indicator 3802 (Andrew Luck in this example). The query or prompt 3806 also includes a time remaining in the ongoing sporting event, and a question about the athlete (will Luck exceed his projected point?). The query or prompt 3806 also includes controls usable to submit an answer to the question (yes and no buttons in this example), a control usable to submit a bet (a text box in this example), and a counter indicating a time remaining to submit an answer to the question and/or a bet.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

A module may provide one or more functions, and may be configured in software executed by one or more processors (e.g., central processing units, graphics processing units, etc.), configured in hardware, such as an application specific integrated circuit (ASIC) or field programmable gate array (FPGA), or may be configured in a combination of software and hardware. A module defined in software may be a subroutine or a stand-alone application. In a data center or cloud environment, a module may be configured using an arbitrary number of servers or other processing devices. A module may be an arbitrary grouping of techniques and/or functionality, based on particular design goals or resource availability.

While various modules, services, devices, managers, etc., have been discussed, it should be realized that these examples are representative of more general techniques. Accordingly, the techniques and concepts discussed herein could be performed by other functional blocks in a manner that group functions and techniques differently. Accordingly, the structures, techniques and methods described herein are intended to be representative of a set of functions and may be performed using more, less or different modules, managers, methods, etc.

Additionally, a number of related topics are described herein. These topics may be performed individually, or grouped with others, as desired to achieve particular design goals. 1. A fantasy sports interleaver, comprising: a video segmenting device to create a plurality of video clips; a clip annotator to associate the plurality of video clips with at least one of achievements of athletes and potential achievements of athletes; an updated roster of a fantasy team of each of the plurality of users, wherein updated rosters show updated movement of athletes between fielded and benched; an interleaver to associate at least some of the plurality of video clips with each of a plurality of users, wherein clips associated with each user are based in part on at least one of a fantasy team of each respective user and the updated roster of the fantasy team of each respective user, wherein the clips associated with each user include fielded athletes and benched athletes of the fantasy team of the user; a packet transmitter to transmit clips to each of the plurality of users, wherein transmitted packets include clips potential achievements of benched athletes of a fantasy team of the user based at least in part on updated roster. 2. A method comprising, under control of one or more processors executing instructions stored in memory, performing operations comprising: determining, by the one or more processors, athletes on a roster of a fantasy sports team of a user; receiving video content of a game or sporting event, the video content of the game or sporting event depicting multiple athletes; and identifying, by the one or more processors, at least one athlete of interest that is on the roster of the fantasy sports team of the user, and depicted in the video content of the game or sporting event; causing, by the one or more processors, presentation of the video content of the game or sporting event on a display; causing, by the one or more processors, presentation, on the display, of a visual indicator associated with the at least one athlete of interest to indicate that the athlete of interest is on the roster of the fantasy sports team of the user, receiving selection of the visual indicator; and causing presentation of a prompt including a control usable to submit a prediction regarding a future event the outcome of which is unknown at the time the prompt is presented.

What is claimed is:

1. A method comprising:

under control of one or more processors executing instructions stored in memory, performing operations comprising:

accessing multiple concurrently airing broadcasts of a first and second sporting event, wherein the first sporting event is distinct from the second sporting event;

segmenting the accessed multiple concurrently airing broadcasts into one or more video clips for the first and second sporting events, wherein each video clip is associated with an individual play related to their respective sporting event;

determining whether the one or more video clips includes a player of interest; and in response to determining that a subset of video clips, from the one or more video clips, includes a player of interest:

annotating the subset of video clips with the player of interest;

interleaving score-impacting wagered clips with fantasy sports clips to increase a frequency of the subset of video clips in response to a selection of a visual indicator;

accepting a wager amount received within a time period for a query prompted by the selection; and causing the display of the interleaved subset of video clips on a user interface.

2. The method of claim 1, wherein the subset of video clips displayed on the user interface include video clips from the first and the second sporting event.

3. The method of claim 1, further comprising:

accessing a plurality of video segments from the aired broadcast of the first sporting event that are captured from different cameras;

identifying a subset of video segments, from the plurality of accessed video segments, that include the player of interest; and concatenating the subset of video segments that include the player of interest.

4. The method of claim 3, further comprising transmitting the concatenated subset of video segments that include the player of interest to a user device associated with a user having an interest in monitoring performance of the player of interest.

5. The method of claim 3, further comprising transmitting the concatenated subset of video segments that include the player of interest to a group of user devices that are associated with a fantasy league that includes the player of interest.

6. The method of claim 3, wherein the concatenated subset of video segments is associated with a same play in the first sporting event displayed from different camera angles.

7. The method of claim 3, wherein the concatenated subset of video segments is associated with a same play in the first sporting event displayed at a different camera speed.

8. The method of claim 1, further comprising, causing a display of a visual indicator associated with the player of interest when displaying the subset of video clips on a user interface.

9. The method of claim 8, wherein the visual indicator is displayed proximate to the player of interest.

10. The method of claim 8, wherein the visual indicator is an interactive visual indicator.

11. A system comprising:

one or more processors; and memory communicatively coupled to the one or more processors, the memory storing instructions that when executed by the one or more processors configure to perform operations comprising:

accessing multiple concurrently airing broadcasts of a first and second sporting event, wherein the first sporting event is distinct from the second sporting event;

segmenting the accessed multiple concurrently airing broadcasts into one or more video clips for the first and second sporting events, wherein each video clip is associated with an individual play related to their respective sporting event;

determining whether the one or more video clips includes a player of interest; and in response to determining that a subset of video clips, from the one or more video clips, includes a player of interest:

annotating the subset of video clips with the player of interest;

interleaving score-impacting wagered clips with fantasy sports clips to increase a frequency of the subset of video clips in response to a selection of a visual indicator;

accepting a wager amount received within a time period for a query prompted by the selection; and causing the display of the interleaved subset of video clips on a user interface.

12. The system of claim 11, wherein the subset of video clips displayed on the user interface include video clips from the first and the second sporting event.

13. The system of claim 11, the operations further comprising:

accessing a plurality of video segments from the aired broadcast of the first sporting event that are captured from different cameras;

identifying a subset of video segments, from the plurality of accessed video segments, that include the player of interest; and concatenating the subset of video segments that include the player of interest.

14. The system of claim 13, the operations further comprising transmitting the concatenated subset of video segments that include the player of interest to a user device associated with a user having an interest in monitoring performance of the player of interest.

15. The system of claim 13, the operations further comprising transmitting the concatenated subset of video segments that include the player of interest to a group of user devices that are associated with a fantasy league that includes the player of interest.

16. The system of claim 13, wherein the concatenated subset of video segments is associated with a same play in the first sporting event displayed from different camera angles.

17. The system of claim 13, wherein the concatenated subset of video segments is associated with a same play in the first sporting event displayed at a different camera speed.

18. The system of claim 11, the operations further comprising, causing a display of a visual indicator associated with the player of interest when displaying the subset of video clips on a user interface.

19. The system of claim 18, wherein the visual indicator is displayed proximate to the player of interest.

20. The system of claim 18, wherein the visual indicator is an interactive visual indicator.

* * * * *